United States Patent
Jinbo et al.

(10) Patent No.: US 11,360,590 B2
(45) Date of Patent: Jun. 14, 2022

(54) FUNCTIONAL PANEL, DEVICE, AND DATA PROCESSOR

(71) Applicant: SEMICONDUCTOR ENERGY LABORATORY CO., LTD., Atsugi (JP)

(72) Inventors: Yasuhiro Jinbo, Kanagawa (JP); Akio Endo, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 0 days.

(21) Appl. No.: 16/366,315

(22) Filed: Mar. 27, 2019

(65) Prior Publication Data
US 2019/0220128 A1  Jul. 18, 2019

Related U.S. Application Data

(63) Continuation of application No. 14/877,436, filed on Oct. 7, 2015, now Pat. No. 10,331,247.

(30) Foreign Application Priority Data

Oct. 10, 2014 (JP) .............................. JP2014-208884

(51) Int. Cl.
*G06F 1/16* (2006.01)
*G06F 3/041* (2006.01)
*G06F 3/044* (2006.01)

(52) U.S. Cl.
CPC ............ *G06F 3/0412* (2013.01); *G06F 1/163* (2013.01); *G06F 1/1616* (2013.01); *G06F 1/1626* (2013.01); *G06F 1/1641* (2013.01); *G06F 1/1652* (2013.01); *G06F 1/1681* (2013.01); *G06F 3/0446* (2019.05); *G06F 2203/04102* (2013.01); *G06F 2203/04103* (2013.01)

(58) Field of Classification Search
CPC ...... G06F 1/1616; G06F 1/163; G06F 1/1641; G06F 1/1681
See application file for complete search history.

(56) References Cited

U.S. PATENT DOCUMENTS

| 8,047,442 | B2 | 11/2011 | Yamazaki et al. |
| 8,597,965 | B2 | 12/2013 | Hatano et al. |
| 8,787,016 | B2 * | 7/2014 | Rothkopf .............. G06F 1/1681 361/679.55 |
| 8,917,516 | B2 | 12/2014 | Kim |

(Continued)

FOREIGN PATENT DOCUMENTS

| EP | 2573644 A | 3/2013 |
| JP | 2003-280548 A | 10/2003 |

(Continued)

*Primary Examiner* — Abhishek M Rathod
*Assistant Examiner* — Keith DePew
(74) *Attorney, Agent, or Firm* — Nixon Peabody LLP; Jeffrey L. Costellia

(57) ABSTRACT

A novel functional panel, a novel device, or a novel data processor is provided. A structure in which a first plane, a second plane that is opposite the first plane, and a neutral plane between the first plane and the second plane are provided and a portion of a functional layer having a thickness greater than or equal to half of the thickness of the functional layer is in a region between the first plane and the neutral plane was conceived.

12 Claims, 27 Drawing Sheets

(56) References Cited

U.S. PATENT DOCUMENTS

| | | | |
|---|---|---|---|
| 8,958,201 B2 * | 2/2015 | Leung | G06F 1/1626 361/679.27 |
| 8,976,517 B2 | 3/2015 | Chen et al. | |
| 9,013,884 B2 * | 4/2015 | Fukuma | G06F 1/1652 361/749 |
| 9,088,006 B2 | 7/2015 | Yamazaki et al. | |
| 9,176,535 B2 * | 11/2015 | Bohn | H04M 1/0268 |
| 9,276,055 B1 * | 3/2016 | Son | H01L 27/323 |
| 9,291,842 B2 | 3/2016 | Yang et al. | |
| 9,348,362 B2 * | 5/2016 | Ko | G06F 1/1626 |
| 9,385,175 B2 * | 7/2016 | Son | H01L 27/1225 |
| 9,490,312 B2 * | 11/2016 | Lee | H01L 51/0097 |
| 9,733,671 B2 | 8/2017 | Lee et al. | |
| 9,811,119 B2 * | 11/2017 | Seo | G06F 1/1681 |
| 10,707,429 B2 * | 7/2020 | Jin | H01L 27/3276 |
| 2001/0028103 A1 | 10/2001 | Usami | |
| 2002/0008091 A1 | 1/2002 | Brandinger et al. | |
| 2008/0055831 A1 * | 3/2008 | Satoh | H05K 1/0281 361/600 |
| 2012/0217516 A1 | 8/2012 | Hatano et al. | |
| 2012/0262870 A1 * | 10/2012 | Leung | G06F 1/1626 361/679.27 |
| 2012/0307423 A1 * | 12/2012 | Bohn | G06F 1/1652 361/679.01 |
| 2013/0010405 A1 * | 1/2013 | Rothkopf | H05K 5/0226 361/679.01 |
| 2013/0258565 A1 | 10/2013 | Nishi | |
| 2013/0299789 A1 * | 11/2013 | Yamazaki | H01L 27/322 257/40 |
| 2014/0078046 A1 * | 3/2014 | Seo | G06F 1/1626 345/156 |
| 2014/0226275 A1 * | 8/2014 | Ko | G06F 1/1681 361/679.27 |
| 2014/0232956 A1 * | 8/2014 | Kwon | H01L 27/3276 349/12 |
| 2015/0049428 A1 * | 2/2015 | Lee | G06F 1/1652 361/679.27 |
| 2015/0102298 A1 * | 4/2015 | Namkung | H01L 51/0097 257/40 |
| 2015/0227172 A1 * | 8/2015 | Namkung | G06F 1/1652 345/173 |
| 2016/0087024 A1 * | 3/2016 | Son | H01L 51/0097 257/40 |

FOREIGN PATENT DOCUMENTS

| | | |
|---|---|---|
| JP | 2006-287982 A | 10/2006 |
| JP | 2012-190794 A | 10/2012 |
| JP | 2013-068719 A | 4/2013 |
| JP | 2013-210491 A | 10/2013 |
| JP | 2014-519626 | 8/2014 |
| JP | 2014-182306 A | 9/2014 |
| WO | WO-2012/167204 | 12/2012 |
| WO | WO-2014/087951 | 6/2014 |

* cited by examiner

FIG. 14

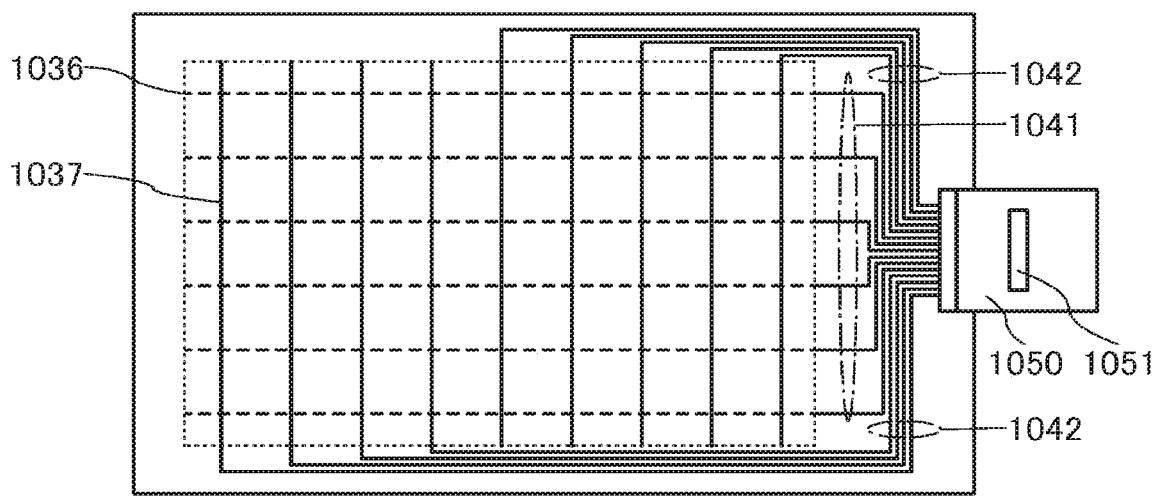
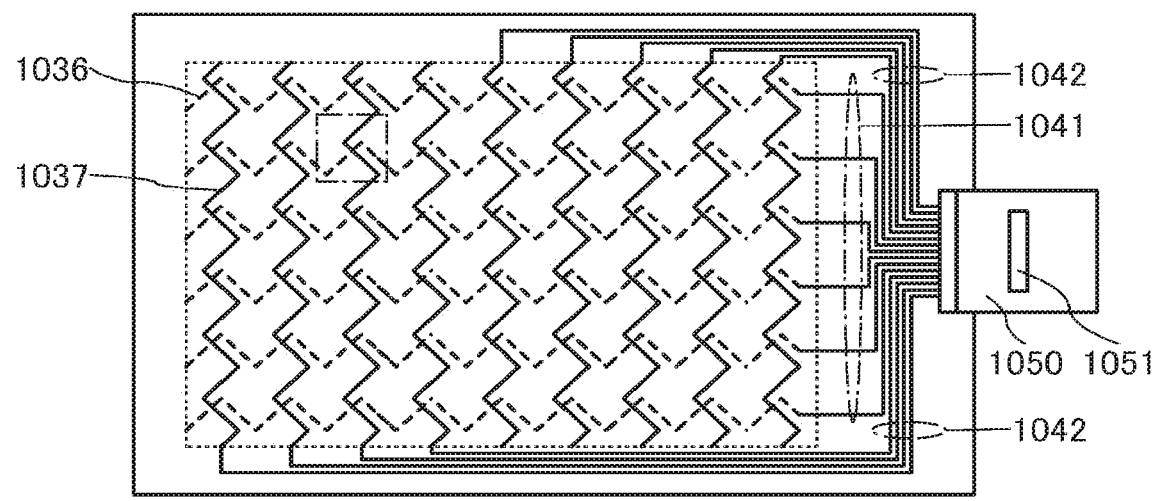
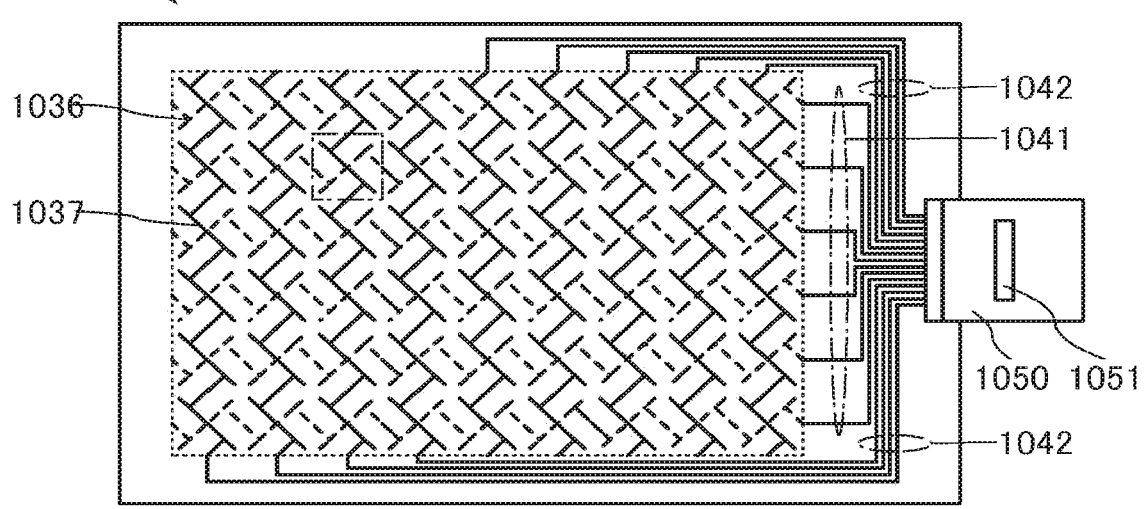

writing period 2510
2511 detecting period 2510
2511

FUNCTIONAL PANEL, DEVICE, AND DATA PROCESSOR

BACKGROUND OF THE INVENTION

1. Field of the Invention

One embodiment of the present invention relates to a functional panel, a device, or a data processor.

Note that one embodiment of the present invention is not limited to the above technical field. The technical field of one embodiment of the invention disclosed in this specification and the like relates to an object, a method, or a manufacturing method. In addition, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method for driving any of them, and a method for manufacturing any of them.

2. Description of the Related Art

The social infrastructures relating to means for transmitting information have advanced. This has made it possible to acquire, process, and send out many pieces and various kinds of information with the use of a data processor not only at home or office but also at other visiting places.

With this being the situation, portable data processors are under active development.

For example, portable data processors are often used while being carried around by a user, and force might be accidentally applied, by dropping, to the data processors and display devices included in them. As an example of a display device that is not easily broken, a display device having high adhesiveness between a structure body by which a light-emitting layer is divided and a second electrode layer is known (Patent Document 1).

REFERENCE

Patent Document

[Patent Document 1] Japanese Published Patent Application No. 2012-190794

SUMMARY OF THE INVENTION

An object of one embodiment of the present invention is to provide a novel functional panel that is highly convenient or reliable. Another object of one embodiment of the present invention is to provide a novel device that is highly convenient or reliable. Another object of one embodiment of the present invention is to provide a novel functional panel, a novel device, or a novel semiconductor device.

Note that the descriptions of these objects do not preclude the existence of other objects. In one embodiment of the present invention, there is no need to achieve all the objects. Other objects will be apparent from and can be derived from the description of the specification, the drawings, the claims, and the like.

One embodiment of the present invention is a functional panel including a first plane, a second plane that is opposite the first plane, a neutral plane in a region between the first plane and the second plane, a functional layer at least a portion of which is in a region between the first plane and the neutral plane, and a support capable of supporting the functional layer. The portion of the functional layer has a thickness greater than or equal to half of the thickness of the functional layer.

In the functional panel of one embodiment of the present invention described above, the portion of the functional layer having a thickness greater than or equal to half of the thickness of the functional layer is positioned in the region between the first plane and the neutral plane. With this structure, the functional panel can be bent with the first plane inside such that compressive stress is applied to the portion of the functional layer. Thus, a novel functional panel can be provided.

Another embodiment of the present invention is the above functional panel further including a first region that overlaps with the portion of the functional layer and a second region that is adjacent to the first region. The support includes a first member in a region between the second plane in the first region and the functional layer and a second member in a region between the second plane in the second region and the functional layer. The first member has a higher rigidity than the second member.

The functional panel of one embodiment of the present invention described above includes the first region where the portion of the functional layer having a thickness greater than or equal to half of the thickness of the functional layer is positioned in the region between the first plane and the neutral plane, and the second region adjacent to the first region. The support includes the second member that is positioned between the second plane in the second region and the functional layer and the first member that has a higher rigidity than the second member and is positioned between the second plane in the first region and the functional layer. With this structure, the functional panel can be bent with the first plane inside such that compressive stress is applied to the portion of the functional layer in the first region. Thus, a novel functional panel can be provided.

Another embodiment of the present invention is a functional panel including a first plane, a second plane that is opposite the first plane, a middle plane in a middle of a region between the first plane and the second plane, a functional layer at least a portion of which is in a region between the first plane and the middle plane, and a support capable of supporting the functional layer. The portion of the functional layer has a thickness greater than or equal to half of the thickness of the functional layer. A portion of the functional panel in the region between the first plane and the middle plane has a rigidity approximately equal to that of a portion of the functional panel in a region between the second plane and the middle plane.

In the functional panel of one embodiment of the present invention described above, the portion of the functional layer having a thickness greater than or equal to half of the thickness of the functional layer is positioned in the region between the first plane and the middle plane. With this structure, the functional panel can be bent with the first plane inside such that compressive stress is applied to the portion of the functional layer. Thus, a novel functional panel can be provided.

Another embodiment of the present invention is the above functional panel further including a first region that overlaps with the portion of the functional layer and a second region that is adjacent to the first region. The support includes a first member in a region between the second plane in the first region and the functional layer and a second member in a region between the second plane in the second region and the functional layer. The first member is thicker than the second member.

The functional panel of one embodiment of the present invention described above includes the first region where the portion of the functional layer having a thickness greater than or equal to half of the thickness of the functional layer is positioned in the region between the first plane and the middle plane, and the second region adjacent to the first region. The support includes the second member that is positioned between the second plane in the second region and the functional layer and the first member that is thicker than the second member and is positioned between the second plane in the first region and the functional layer. With this structure, the functional panel can be bent with the first plane inside such that compressive stress is applied to the portion of the functional layer in the first region. Thus, a novel functional panel can be provided.

Another embodiment of the present invention is a functional panel described above in which the functional layer includes a display element.

Another embodiment of the present invention is a functional panel described above in which the functional layer includes a sensor element.

Another embodiment of the present invention is a device including the above functional panel and a frame capable of supporting the functional panel. The frame is capable of putting the functional panel into a bent state with the first plane inside.

Another embodiment of the present invention is a device including the above functional panel and a frame capable of supporting the functional panel. The frame is capable of putting the functional panel into a bent state with the first plane inside in such a manner that a fold having a curvature radius greater than or equal to a first curvature radius is formed. In addition, the frame is capable of putting the functional panel into a bent state with the second plane inside in such a manner that a fold having a curvature radius greater than the first curvature radius is formed.

The device of one embodiment of the present invention described above includes the functional panel and the frame capable of putting the functional panel into a bent state with the first plane inside. With this structure, the functional panel can be bent with the first plane inside. Thus, a novel device can be provided.

Another embodiment of the present invention is a device including the above functional panel and a frame capable of supporting the functional panel. The frame is capable of putting the functional panel into a bent state with the first plane inside in such a manner that a fold is formed in the first region.

Another embodiment of the present invention is a device including the above functional panel and a frame capable of supporting the functional panel. The frame is capable of putting the functional panel into a bent state with the first plane inside in such a manner that a fold having a curvature radius greater than or equal to a first curvature radius is formed in the first region. In addition, the frame is capable of putting the functional panel into a bent state with the second plane inside in such a manner that a fold having a curvature radius greater than the first curvature radius is formed in the first region.

The device of one embodiment of the present invention described above includes the functional panel and the frame capable of putting the functional panel into a bent state with the first plane inside in such a manner that a fold is formed in the first region. With this structure, the functional panel can be bent with the first plane inside in such a manner that a fold is formed in the first region. Thus, a novel device can be provided.

Another embodiment of the present invention is a data processor including the above device and at least one of a microphone, an antenna, a battery, an operation switch, and a housing.

The data processor of one embodiment of the present invention described above includes the functional panel and the frame capable of putting the functional panel into a bent state with the first plane inside. With this structure, the functional panel can be put into a folded state or an unfolded state. Thus, a novel data processor can be provided.

In this specification, a device includes the following in its category: a module to which a connector such as a flexible printed circuit (FPC) or a tape carrier package (TCP) is attached; a module having a TCP provided with a printed wiring board at the end thereof; and a substrate over which an integrated circuit (IC) is mounted by a chip on glass (COG) method and a light-emitting element is formed.

One embodiment of the present invention can provide a novel functional panel that is highly convenient or reliable. Another embodiment of the present invention can provide a novel device that is highly convenient or reliable. Another embodiment of the present invention can provide a novel data processor that is highly convenient or reliable. Another embodiment of the present invention can provide a novel functional panel, a novel device, a novel data processor, or a novel semiconductor device.

Note that the description of these effects does not preclude the existence of other effects. One embodiment of the present invention does not necessarily achieve all the effects listed above. Other effects will be apparent from and can be derived from the description of the specification, the drawings, the claims, and the like.

BRIEF DESCRIPTION OF THE DRAWINGS

In the accompanying drawings:

FIGS. 9A-1, 9A-2, 9B-1, 9B-2, 9C, 9D-1, 91D-2, 9E-1, and 9E-2 are schematic views illustrating a manufacturing process of a stack of one embodiment;

FIGS. 10A-1, 10A-2, 10B-1, 10B-2, 10C, 10D-1, 10D-2, 10E-1; and 10E-2 are schematic views illustrating a manufacturing process of a stack of one embodiment;

FIGS. 11A-1, 11A-2, 11B, 11C, 11D-1, 11D-2, 11E-1, and 11E-2 are schematic views illustrating a manufacturing process of a stack of one embodiment;

FIGS. 12A-1, 12A-2, 12B-1, 12B-2, 12C-1, 12C-2, 12D-1, and 12D-2 are schematic views illustrating manufacturing processes of stacks, each having an opening portion in a support, of embodiments;

FIGS. 13A-1, 13A-2, 13B-1, and 13B-2 are schematic views illustrating structures of processed members of embodiments;

FIG. 14 illustrates an input/output device of one embodiment;

FIGS. 16A-1, 16A-2, 16A-3, 16B-1, 16B-2, 16C-1, and 16C-2 are projection views illustrating structures of data processors of embodiments;

FIGS. 20A to 20C each illustrate structures of electrodes of a sensor panel of one embodiment;

DETAILED DESCRIPTION OF THE INVENTION

Figure 1A:
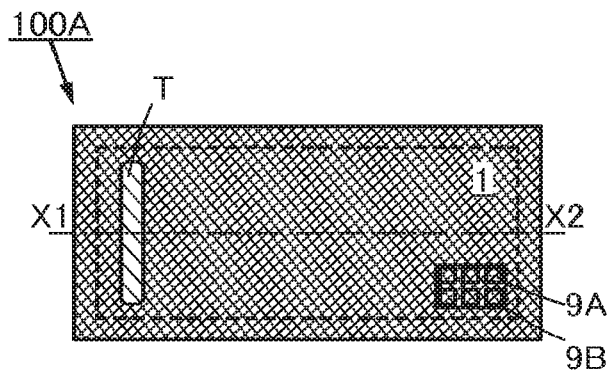
FIGS. 1A to 1D each illustrate a functional panel of one embodiment.

A functional panel of one embodiment of the present invention includes a first plane, a second plane that is opposite the first plane, and a neutral plane between the first plane and the second plane. A portion of a functional layer having a thickness greater than or equal to the thickness of the functional layer is in a region between the first plane and the neutral plane.

With this structure, the functional panel can be bent with the first plane inside such that compressive stress is applied to the portion of the functional layer. Thus, a novel functional panel, a novel device, or a novel data processor can be provided.

Note that the terms "film" and "layer" can be interchanged with each other according to the case or circumstances. For example, the term "conductive layer" can be changed into the term "conductive film" in some cases. Also, the term "insulating film" can be changed into the term "insulating layer" in some cases.

Embodiments will be described in detail with reference to the drawings. However, the present invention is not limited to the description below, and it is easily understood by those skilled in the art that various changes and modifications can be made without departing from the spirit and scope of the present invention. The present invention therefore should not be interpreted as being limited to the content of the embodiments below. Note that in the structures of the invention described below, the same portions or portions having similar functions are denoted by the same reference numerals in different drawings, and description of such portions is not repeated.

Embodiment 1

In this embodiment, the structure of a functional panel of one embodiment of the present invention will be described with reference to FIGS. 1A to 1D, FIGS. 2A and 2B, FIGS. 3A and 3B, and FIGS. 4A and 4B.

Figure 1B:
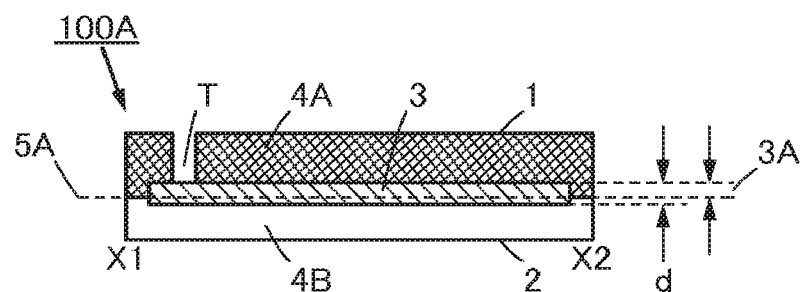

FIGS. 1A to 1D illustrate the structures of functional panels of embodiments of the present invention. FIG. 1A is a top view of a functional panel 100A of one embodiment of the present invention, and FIG. 1B is a cross-sectional view taken along the line X1-X2 in FIG. 1A.

Figure 1C:
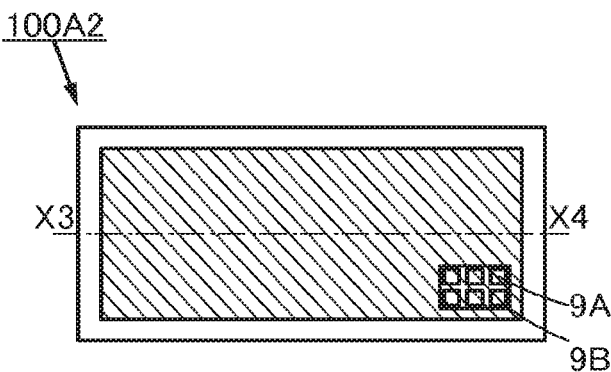
Figure 1D:
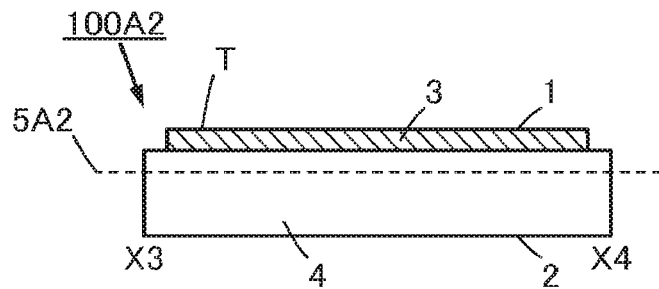

FIG. 1C is a top view of a functional panel 100A2 of one embodiment of the present invention, and FIG. 1D is a cross-sectional view taken along the line X3-X4 in FIG. 1C.

Structural Example 1 of Functional Panel

The functional panel 100A described in this embodiment includes a first plane 1, a second plane 2 that is opposite the first plane 1, a neutral plane 5A in a region between the first plane 1 and the second plane 2, a functional layer 3 at least a portion 3A of which is in a region between the first plane 1, and the neutral plane 5A, and a support (a member 4A and a member 4B) that supports the functional layer 3 (see FIGS. 1A and 1B). The thickness of the portion 3A of the functional layer 3 is greater than or equal to half of the thickness d of the functional layer 3.

In the functional panel 100A described in this embodiment, the portion 3A of the functional layer 3, which has the thickness greater than or equal to half of the thickness d of the functional layer 3, is positioned in the region between the first plane 1 and the neutral plane 5A.

With this structure, the functional panel 100A can be bent with the first plane 1 inside such that compressive stress is applied to the portion 3A of the functional layer 3. Thus, a novel functional panel can be provided.

The functional layer 3 can be provided with a display element 9A (see FIG. 1A).

The functional layer 3 can be provided with a sensor element 9B.

The functional panel 100A can have an opening portion. For example, the functional panel 100A can have an opening portion that has a region overlapping with a terminal T provided over the functional layer 3.

A modification example of the functional panel is shown in FIGS. 1C and 1D. A functional panel 100A2 shown in FIGS. 1C and 1D is different from the functional panel 100A described with reference to FIGS. 1A and 1B in that one side of a functional layer 3 is exposed on a first plane 1, and the other side of the functional layer 3 is in contact with one side of a support 4.

Individual components included in the functional panel 100A will be described below. Note that these components cannot be clearly distinguished and one component also serves as another component or include part of another component in some cases.

<<Structure of Functional Panel>>

The functional panel 100A described in this embodiment includes the first plane 1, the second plane 2, the neutral plane 5A, the functional layer 3, or the support (the member 4A or the member 4B).

<<First Plane, Second Plane, and Neutral Plane>>

The functional panel 100A can have a variety of outside shapes. For example, the functional panel 100A can have a plate-like shape or a sheet-like shape.

The first plane 1 or the second plane 2 is included in a surface of the functional panel 100A, and the first plane 1 or the second plane 2 can have a variety of shapes. For example, the first plane 1 can be square, polygonal, or circular.

The first plane 1 or the second plane 2 may include a portion of a surface of the support or a portion of a surface of the functional layer 3.

The neutral plane 5A is a plane that hardly expands or contracts when the functional panel 100A is bent with the first plane 1 inside. Specifically, a change in size of the neutral plane 5A caused when the functional panel 100A is bent with the first plane 1 inside is −15 ppm to +15 ppm inclusive, preferably −10 ppm to +10 ppm inclusive.

Note that using a variety of different structures for the functional panel 100A can change the position of the neutral plane 5A.

For example, when a member that is less rigid than a member used in a region between the second plane 2 and the neutral plane 5A (e.g., the member 4B) is used in a region between the first plane 1 and the neutral plane 5A (e.g., the member 4A), the neural plane 5A can be closer to the second plane 2.

For example, when a member that is thinner than a member used in a region between the second plane 2 and the functional layer 3 is used in a region between the first plane 1 and the functional layer 3, the neutral plane 5A can be closer to the second plane 2.

<<Support>>

A single member or a plurality of members can be used as the support. For example, the member 4A and the member 4B can be used as the support. Specifically, the plate-like, sheet-like, or film-like members 4A and 4B can be attached to each other to be used as the support.

An inorganic material, an organic material, or a composite material of an inorganic material and an organic material, for example, can be used for the support.

The support has heat resistance high enough to withstand a manufacturing process and the thickness and size that are appropriate for manufacturing apparatus.

An organic material such as a resin, a resin film, or plastic, for example, can be used for the member 4A or the member 4B. Specifically, a thin film or plate containing polyester, polyolefin, polyamide, polyimide, polycarbonate, or an acrylic resin can be used.

An inorganic material such as glass, ceramic, or metal, for example, can be used for the member 4A or the member 4B. Specifically, a plate containing non-alkali glass, soda-lime glass, potash glass, crystal glass, or the like can be used. Specifically, a metal foil or metal plate containing stainless steel (SUS), aluminum, magnesium, or the like can be used.

An inorganic oxide, an inorganic nitride, or an inorganic oxynitride, for example, can be used for the member 4A or the member 4B. Specifically, a thin film containing silicon oxide, silicon nitride, silicon oxynitride, alumina, or the like can be used.

A single material or a composite material of a plurality of materials, for example, can be used for the member 4A or the member 4B. Specifically, it is possible to use a composite material in which a plurality of materials are stacked or a composite material in which a fibrous or particulate material is dispersed in another material. For example, a composite material including an insulating layer, a resin film, and a resin layer attaching the insulating layer to the resin film can be used for the member 4A.

A material in which a base and an insulating layer that prevents the diffusion of impurities contained in the base are stacked, for example, can be used for the member 4A or the member 4B. Specifically, it is possible to use a material in which glass and one or more of materials that prevent the diffusion of impurities contained in the glass, e.g., silicon oxide, silicon nitride, or silicon oxynitride, are stacked. It is also possible to use a material in which a resin and one or more of materials that prevent the diffusion of impurities passing through the resin, such as silicon oxide, silicon nitride, and silicon oxynitride, are stacked.

A composite material such as a resin film or the like to which a metal plate, a thin glass plate, or a film of an inorganic material is attached, for example, can be used for the member 4A or the member 4B.

If a composite material in which an inorganic film with a thickness of several μm or less and a resin film with a thickness of ten and several to several hundred micrometers are attached is used, the composite material that can be bent with a curvature radius of 5 mm or more, preferably 4 mm or more, more preferably 3 mm or more, and particularly preferably 1 mm or more can be used for the member 4A or the member 4B.

<<Functional Layer>>

A functional circuit, a functional element, an optical element, a functional film, or a layer including a plurality of elements selected from these, for example, can be used as the functional layer 3.

A layer including a single functional element or a plurality of different functional elements can be used as the functional layer 3. For example, a layer in which a plurality of functional elements are arranged in a matrix can be used.

An electric element or a biochip, for example, can be used as the functional element. Specifically, a transistor, a capacitor, a resistor, a memory element, a light-emitting element, a display element, or the like can be used.

A functional element and a functional circuit for driving the functional element, for example, can be included in the functional layer 3.

A film that suppresses the diffusion of impurities, for example, can be included in the functional layer 3.

An optical element such as a coloring layer or a light-blocking layer, for example, can be included in the functional layer 3.

<<Display Element>>

The display element 9A, a pixel circuit for driving the display element 9A, or a driver circuit for driving the pixel circuit, for example, can be included in the functional layer 3. Further, a color filter that has a region overlapping with the display element 9A or a layer that prevents the diffusion of impurities into the display element can be included in the functional layer 3 (see FIG. 1A).

A light-emitting element, for example, can be used as the display element 9A. Specifically, an organic electroluminescent element can be used as the display element 9A.

With such a structure, a functional panel that can be used as a display panel can be provided.

<<Sensor Element>>

The sensor element 9B, for example, can be included in the functional layer 3. Specifically, a proximity sensor can be used as the sensor element 9B. A capacitor, for example, can be used as the sensor element 9B (see FIG. 1A).

With such a structure, a functional panel that can be used as a touch panel can be provided.

Structure Example 2 of Functional Panel

Another structure of a functional panel of one embodiment of the present invention will be described with reference to FIGS. 2A and 2B.

Figure 2A:
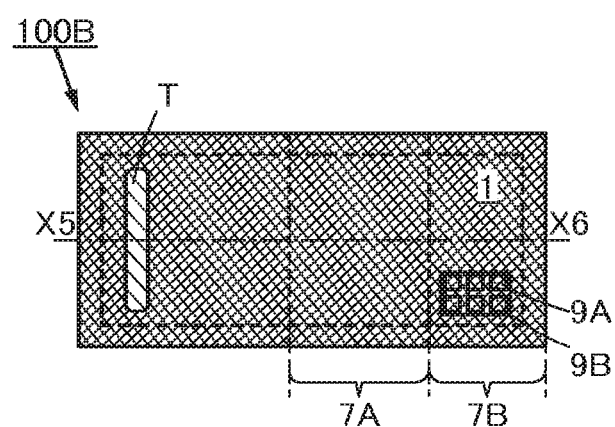
FIGS. 2A and 2B each illustrate a functional panel of one embodiment.
Figure 2B:
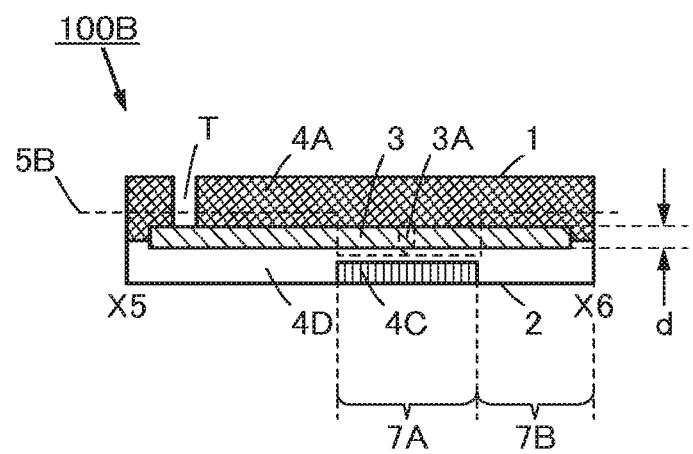

FIGS. 2A and 2B illustrate the structure of a functional panel of one embodiment of the present invention. FIG. 2A is a top view of a functional panel 100B of one embodiment of the present invention, and FIG. 2B is a cross-sectional view taken along the line X5-X6 in FIG. 2A.

The functional panel 100B described in this embodiment includes a first region 7A that overlaps with a portion 3A of a functional layer 3 and a second region 7B adjacent to the first region 7A (see FIGS. 2A and 2B). A support includes a first member 4C in a region between a second plane 2 in the first region 7A and the functional layer 3 and a second member 4D in a region between the second plane 2 in the second region 7B and the functional layer 3. The first member 4C has a higher rigidity than the second member 4D.

The functional panel 100B described in this embodiment includes the first region 7A where the portion 3A of the functional layer 3 having a thickness greater than or equal to half of the thickness of the functional layer 3 is positioned in a region between the first plane 1 and a neutral plane 5B, and the second region 7B adjacent to the first region 7A. The support includes the second member 4D positioned between the second plane 2 in the second region 7B and the functional layer 3 and the first member 4C positioned between the second plane 2 in the first region 7A and the functional layer 3. The first member 4C has a higher rigidity than the second member 4D. With this structure, the functional panel 100B can be bent with the first plane inside such that compressive stress is applied to the portion 3A of the functional layer 3 in the first region. Thus, a novel functional panel can be provided.

The functional panel 100B is different from the functional panel 100A described with reference to FIGS. 1A and 1B in that the support includes the second member 4D and the first member 4C having a higher rigidity than the second member 4D. Different structures will be described in detail below, and the above description is referred to for the other similar structures.

<<Support>>

A single member or a plurality of members can be used as the support. For example, a member 4A, the first member 4C, and the second member 4D can be used as the support.

A member having a shape that follows a portion to be bent (e.g., a belt-like shape) and a rigidity higher than that of the second member 4D is used as the first member 4C. Specifically, a member having a rigidity 3% or more higher, preferably 5% or more higher, than that of the second member 4D is used as the first member 4C. With this structure, the distance between the neutral plane 5B and the second plane 2 can be shorter in the first region 7A than in the second region 7B.

Materials that satisfy the above conditions may be selected, from the materials that can be used for the functional panel 100A, to be used for the functional panel 100B, for example.

Specifically, it is possible to use a resin film as the second member 4D and a metal plate with a rigidity 3% or more higher, preferably 5% or more higher, than that of the second member 4D as the first member 4C.

Note that it is also possible to employ a structure in which a member that is less rigid than the member 4A is positioned between the neutral plane 5B in the first region 7A and the first plane 1.

Structural Example 3 of Functional Panel

Another structure of a functional panel of one embodiment of the present invention will be described with reference to FIGS. 3A and 3B.

Figure 3A:
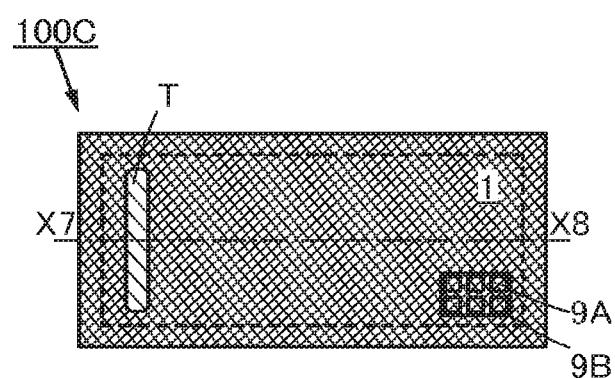
FIGS. 3A and 3B each illustrate a functional panel of one embodiment.
Figure 3B:
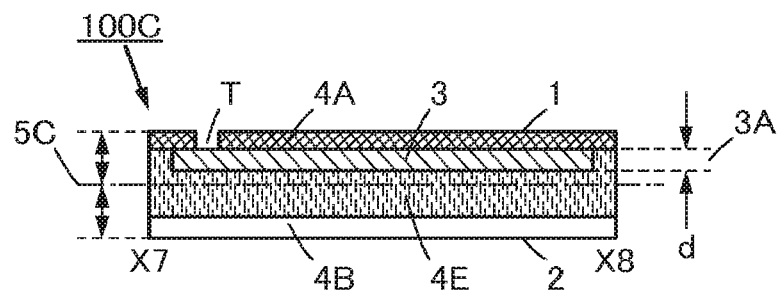

FIGS. 3A and 3B illustrate a structure of a functional panel 100C of one embodiment of the present invention. FIG. 3A is a top view of the functional panel 100C of one embodiment of the present invention, and FIG. 3B is a cross-sectional view taken along the line X7-X8 in FIG. 3A.

The functional panel 100C described in this embodiment includes a first plane 1, a second plane 2 that is opposite the first plane 1, a middle plane 5C located in the middle of a region between the first plane 1 and the second plane 2, a functional layer 3 at least a portion 3A of which is in a region between the first plane 1 and the middle plane 5C, and a support (a member 4A, a member 4B, and a member 4E) that supports the functional layer 3 (see FIGS. 3A and 3B). The thickness of the portion 3A is greater than or equal to half of the thickness d of the functional layer 3. A portion of the functional panel 1000 in the region between the first plane 1 and the middle plane 5C has a rigidity approximately equal to that of a portion of the functional panel 100C in a region between the second plane 2 and the middle plane 5C. Note that the portion of the functional panel 100C in the region between the first plane 1 and the middle plane 5C includes the whole of the member 4A, the portion 3A of the functional layer 3, and a portion of the member 4E, and the portion of the functional panel 100C in the region between the second plane 2 and the middle plane 5C includes the whole of the member 4B and a portion of the member 4E.

Note that in the case where the flexural rigidity of one support is greater than or equal to 85% and less than or equal to 115%, preferably greater than or equal to 90% and less than or equal to 110%, of the flexural rigidity of the other support, this specification describes it as the rigidity of the one support being approximately equal to the rigidity of the other support. In addition, $N \cdot m^2$ can be used as a unit for flexural rigidity.

In the functional panel 1000 described in this embodiment, the portion 3A of the functional layer 3, which has a thickness greater than or equal to half of the thickness d of the functional layer 3, is positioned in the region between the first plane 1 and the middle plane 5C. With this structure, the functional panel 100C can be bent with the first plane 1 inside such that compressive stress is applied to the portion 3A of the functional layer 3. Thus, a novel functional panel can be provided.

The functional layer 3 can be provided with a display element 9A (see FIG. 3A).

The functional layer 3 can be provided with a sensor element 9B.

The functional panel 100C can have an opening portion. For example, the functional panel 1000 can have an opening portion that has a region overlapping with a terminal T provided over the functional layer 3.

The functional panel 100C is different from the functional panel 100A described with reference to FIGS. 1A and 1B in that the portion in the region between the first plane 1 and the middle plane 5C has a rigidity approximately equal to that of the portion in the region between the second plane 2 and the middle plane 5C. Different structures will be described in detail below, and the above description is referred to for the other similar structures.

<<Structure of Functional Panel>>

The functional panel 1000 described in this embodiment includes the first plane 1, the second plane 2, the middle plane 5C, the functional layer 3, or the support (the member 4A, the member 4B, and the member 4E).

<<First Plane, Second Plane, and Middle Plane>>

The functional panel 100C can have a variety of outside shapes. For example, the functional panel 100C can have a plate-like shape or a sheet-like shape.

The first plane 1 or the second plane 2 is included in a surface of the functional panel 1000, and the first plane 1 or the second plane 2 can have a variety of shapes.

For example, the first plane 1 can be square, polygonal, or circular.

The first plane 1 or the second plane 2 may include a portion of a surface of the support or a portion of a surface of the functional layer 3.

The middle plane 5C lies midway between the first plane 1 and the second plane 2 that is opposite the first plane 1.

<<Support>>

The support supports the functional layer 3. A plurality of members can be used as the support. For example, the member 4A, the member 4B having a rigidity and a thickness approximately equal to those of the member 4A, and the member 4E that attaches the member 4A to the member 4B can be used as the support. With this structure, the rigidity of the region between the first plane 1 and the middle plane 5C and the rigidity of the region between the second plane 2 and the middle plane 5C can be approximately equal.

Materials that satisfy the above conditions may be selected, from the materials that can be used for the functional panel 100A, to be used for the functional panel 1000, for example.

Specifically, it is possible to use a resin film as the member 4A, a resin film having a rigidity and a thickness approximately equal to those of the member 4A as the member 4B, and an adhesive layer to attach the member 4A to the member 4B as the member 4E.

Structural Example 4 of Functional Panel

Another structure of a functional panel of one embodiment of the present invention will be described with reference to FIGS. 4A and 4B.

Figure 4A:
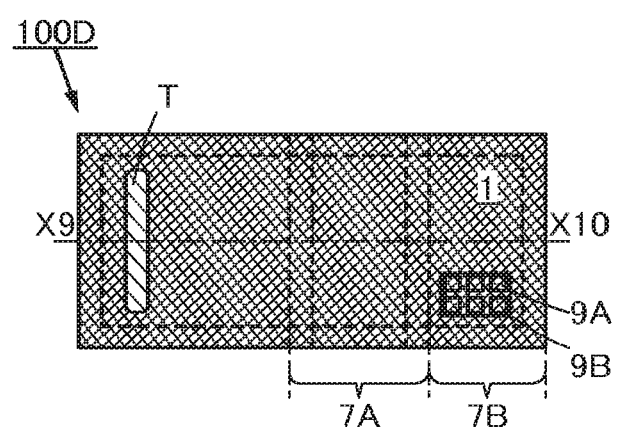
FIGS. 4A and 4B each illustrate a functional panel of one embodiment.
Figure 4B:
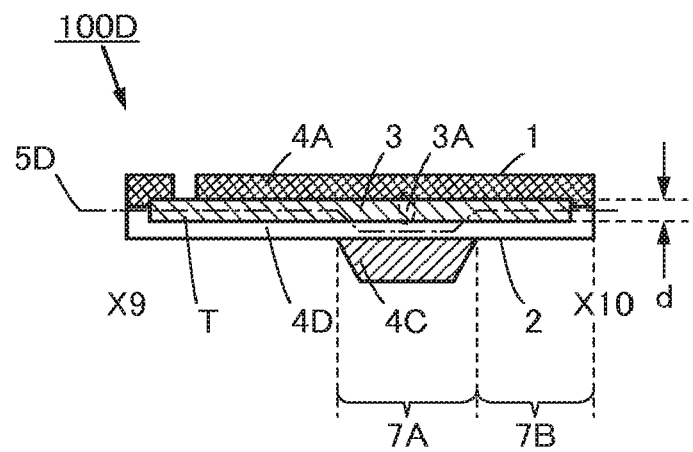

FIGS. 4A and 4B illustrate the structure of a functional panel of one embodiment of the present invention. FIG. 4A is a top view of a functional panel 100D of one embodiment of the present invention, and FIG. 4B is a cross-sectional view taken along the line X9-X10 in FIG. 4A.

The functional panel 100D described in this embodiment includes a first region 7A that overlaps with a portion 3A of a functional layer 3 and a second region 7B adjacent to the first region 7A. A support includes a first member 4C in a region between a second plane 2 in the first region 7A and the functional layer 3 and a second member 4D in a region between the second plane 2 in the second region 7B and the functional layer 3. The first member 4C is thicker than the second member 4D.

The functional panel 100D described in this embodiment includes the first region 7A in which the portion 3A of the functional layer 3 having a thickness greater than or equal to half of the thickness d of the functional layer 3 is positioned in a region between a first plane 1 and a middle plane 5D, and the second region 7B adjacent to the first region 7A. The support includes the second member 4D that is positioned between the second plane 2 in the second region 7B and the functional layer 3 and the first member 4C that is thicker than the second member 4D and is positioned between the second plane 2 in the first region 7A and the functional layer 3. With this structure, the functional panel 100D can be bent with the first plane inside such that compressive stress is applied to the portion 3A of the functional layer 3 in the first region. Thus, a novel functional panel can be provided.

The functional panel 100D is different from the functional panel 100B described with reference to FIGS. 2A and 2B in that the support includes the second member 4D and the first member 4C that is thicker than the second member 4D. Different structures will be described in detail below, and the above description is referred to for the other similar structures.

<<Support>>

A single member or a plurality of members can be used as the support. For example, a member 4A, the member 4D, and the member 4C that makes the thickness of the first region 7A greater than that of the second region 7B can be used as the support.

A member having a shape that follows a portion to be bent (e.g., a belt-like shape) is used as the first member 4C. With this structure, the distance between the middle plane 5D and the second plane 2 can be longer in the first region 7A than in the second region 7B.

Materials that satisfy the above conditions may be selected, from the materials that can be used for the functional panel 100A, to be used for the functional panel 100D, for example.

Specifically, it is possible to use a resin film as the member 4A, another resin film as the member 4D, and a material processed into a belt-like shape as the member 4C. A belt-like resin film, a belt-like resin coating, or a metal plate can be used as the member 4C, for example.

This embodiment can be combined with any of the other embodiments in this specification as appropriate.

Embodiment 2

In this embodiment, the structure of a device of one embodiment of the present invention will be described with reference to FIGS. 5A to 5D. FIGS. 6A to 6D, FIGS. 7A to 7C, and FIGS. 8A to 8D.

Figure 5A:
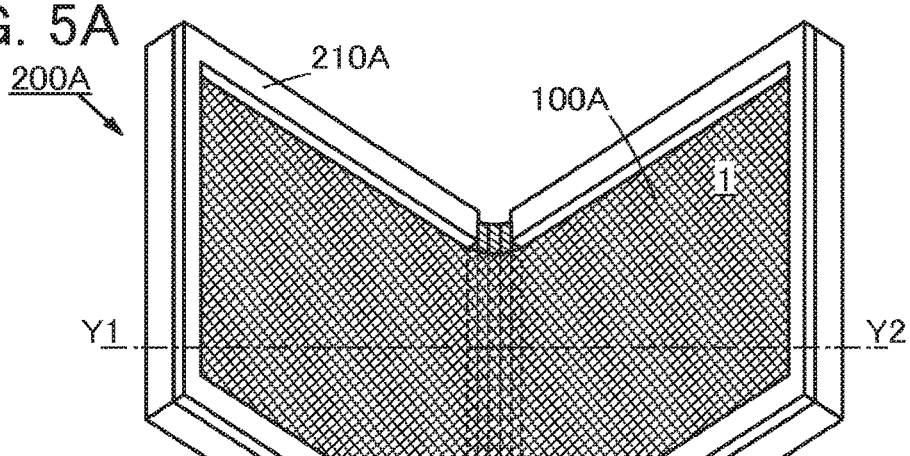
FIGS. 5A to 5D each illustrate a device of one embodiment.
Figure 5B:
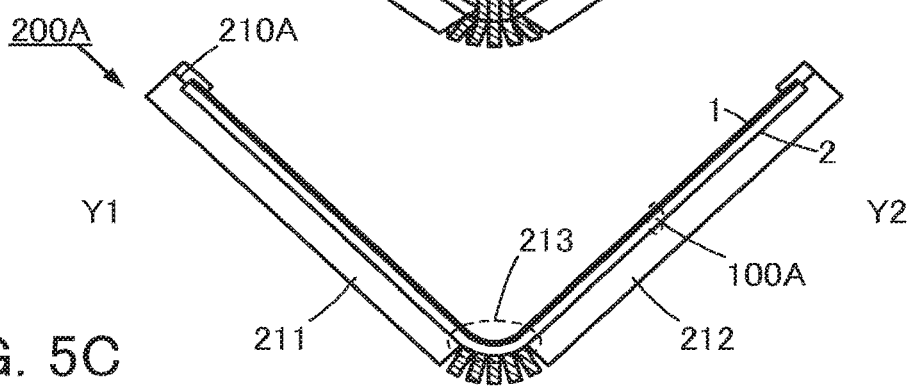
Figure 5C:
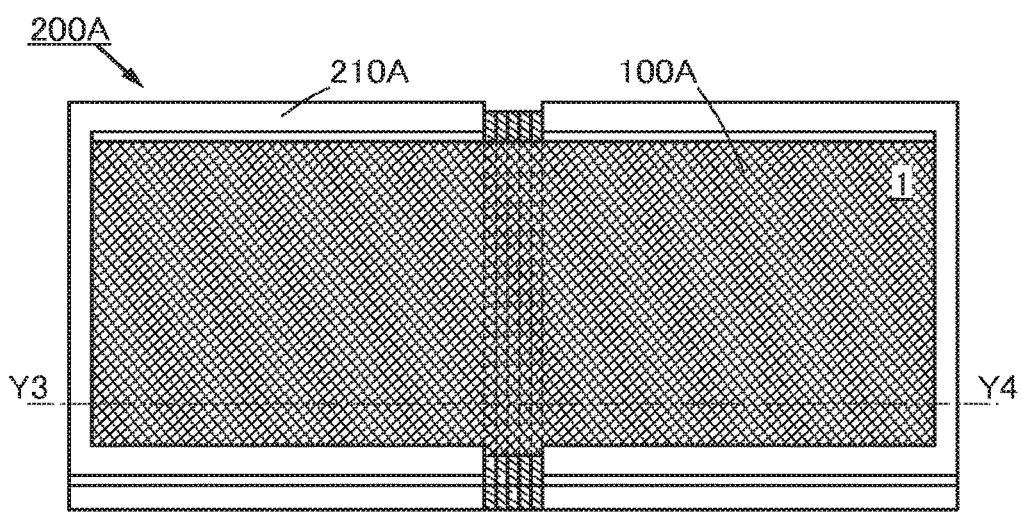
Figure 5D:
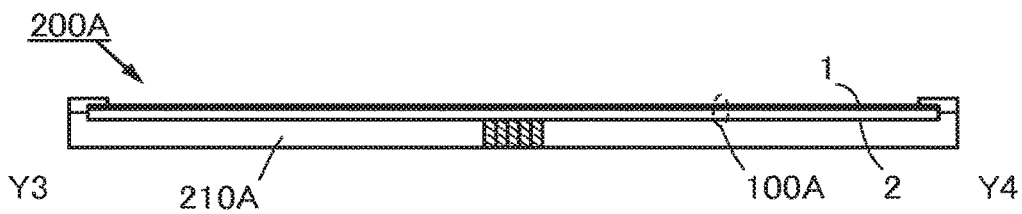

FIGS. 5A to 5D illustrate the structure of a device of one embodiment of the present invention. FIG. 5A is a projection view illustrating a device 200A of one embodiment of the present invention which is bent, and FIG. 5B is a cross-sectional view taken along the line Y1-Y2 in FIG. 5A. FIG. 5C is a projection view illustrating the device 200A of one embodiment of the present invention which is unbent, and FIG. 5D is a cross-sectional view taken along the line Y3-Y4 in FIG. 5C.

Figure 6A:
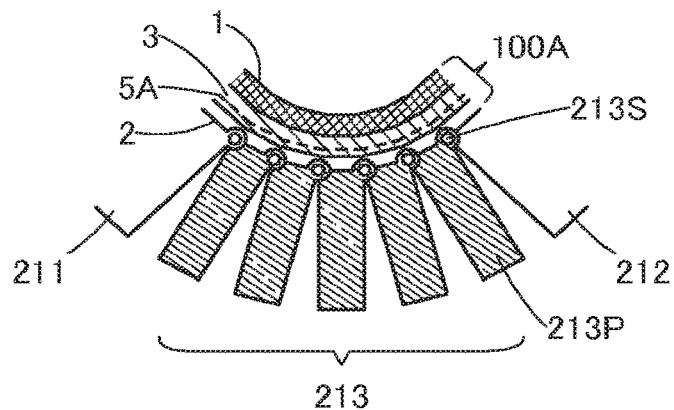
FIGS. 6A to 6D each illustrate a device of one embodiment.
Figure 6B:
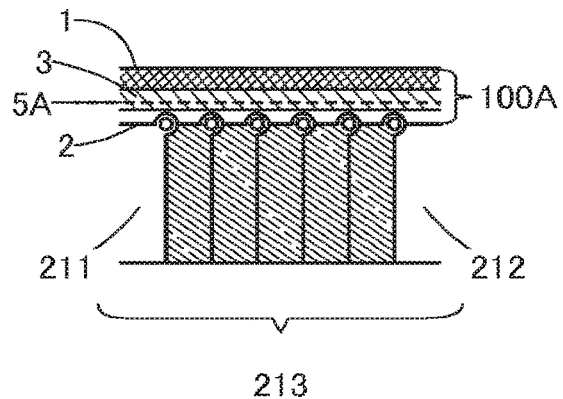

FIGS. 6A to 6D illustrate a hinge portion that can be used in the device of one embodiment of the present invention. FIG. 6A is a side view illustrating the structure of a hinge portion 213 in a bent state, and FIG. 6B is a side view illustrating the structure of the hinge portion 213 in an unbent state.

Structural Example 1 of Device

The device 200A described in this embodiment includes the functional panel 100A described in Embodiment 1 and a frame 210A that supports the functional panel 100A. The frame 210A has a function of putting the functional panel 100A into a state in which the functional panel 100A is bent with the first plane 1 inside (see FIGS. 5A and 5B).

The device 200A described as an example in this embodiment includes the functional panel 100A described in Embodiment 1 and the frame 210A having a function of putting the functional panel 100A into a bent state with the first plane 1 inside. Thus, the functional panel can be bent with the first plane inside, and a novel device can be provided accordingly.

Individual components of the device 200A will be described blow. Note that these components cannot be clearly distinguished and one component also serves as another component or include part of another component in some cases.

<<Structure of Device>>

The device 200A described in this embodiment includes the functional panel 100A or the frame 210A.

<<Structure of Frame>>

The frame 210A includes the hinge portion 213, a first guide portion 211 connected to the hinge portion 213, and a second guide portion 212 connected to the hinge portion 213. The hinge portion 213 has a function of rotatably connecting the second guide portion 212 to the first guide portion 211 (see FIG. 5B).

A variety of structures can be used as the hinge portion 213. For example, a structure including a rotation axis 213S and a plurality of parts 213P connected to each other with the use of the rotation axis 213S can be used (see FIG. 6A).

The hinge portion 213 with the plurality of parts 213P connected to each other in such a manner that the parts 213P spread like a fan can be used, for example. With the hinge portion 213, the second guide portion 212 can move rotationally with respect to the first guide portion 211. Specifically, the second guide portion 212 can move rotationally from the state shown in FIG. 6B to the state shown in FIG. 6A.

Although the second guide portion 212 can move rotationally with respect to the first guide portion 211 from the state shown in FIG. 5B to the state shown in FIG. 5D, when the part 213P comes in contact with the adjacent part as shown in FIG. 6B, the second guide portion 212 cannot go further. The hinge portion 213 thus allows the functional panel 100A to be bent only toward one side.

A structure that is less likely to be bent than the hinge portion 213 can be used as the first guide portion 211. For example, a box-like structure, a plate-like structure, or a sheet-like structure with a thickness of greater than or equal to 0.2 mm, preferably greater than or equal to 1 mm, can be used as the first guide portion 211. A structure similar to the first guide portion 211 can be used as the second guide portion 212.

In addition, an adhesive layer that attaches the functional panel 100A to the first guide portion 211 can be provided on the side of the first guide portion 211 that faces the functional panel 100A.

In addition, a structure that allows the functional panel 100A to slide along the first guide portion 211 as the hinge portion 213 is bent can be used. For example, the first guide portion 211 having a groove that holds an edge of the functional panel 100A in a region overlapping with the edge of the functional panel 100A can be used.

An inorganic material such as metal, glass, or ceramic, an organic material such as resin, or a natural material can be used for the frame 210A, for example.

Specifically, engineering plastic or silicone rubber can be used. Stainless steel, aluminum, magnesium alloy, or the like can also be used for the frame 210A.

<<Functional Panel>>

The functional panels described in Embodiment 1, for example, can be used. Specifically, the functional panel 100A, the functional panel 100A2, the functional panel 100B, the functional panel 100O, the functional panel 100D, or the like can be used.

Figure 6C:
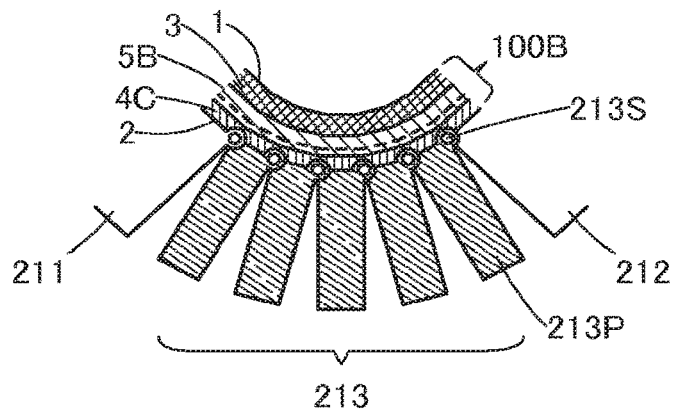

In the case where the functional panel 100B is used, the functional panel 100B is positioned such that the first region 7A of the functional panel 100B (the region in which the member 4C is positioned) overlaps with the hinge portion 213 of the frame 210A (see FIG. 6C).

Figure 6D:
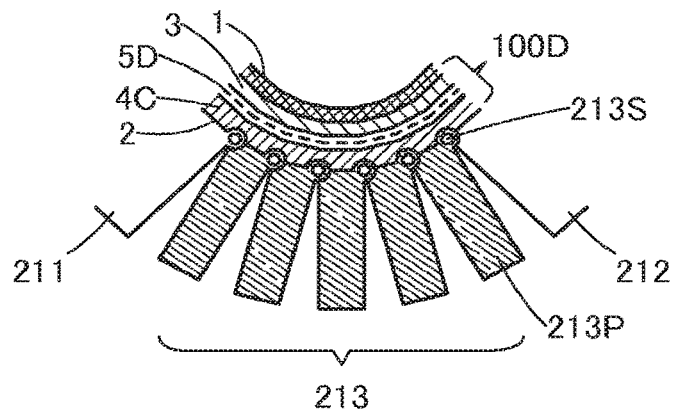

In the case where the functional panel 100D is used, the functional panel 100D is positioned such that the first region 7A of the functional panel 100D (the region in which the member 4C is positioned) overlaps with the hinge portion 213 of the frame 210A (see FIG. 6D).

Structural Example 2 of Device

Another structure of a device of one embodiment of the present invention be described with reference to FIGS. 7A to 7C.

Figure 7A:
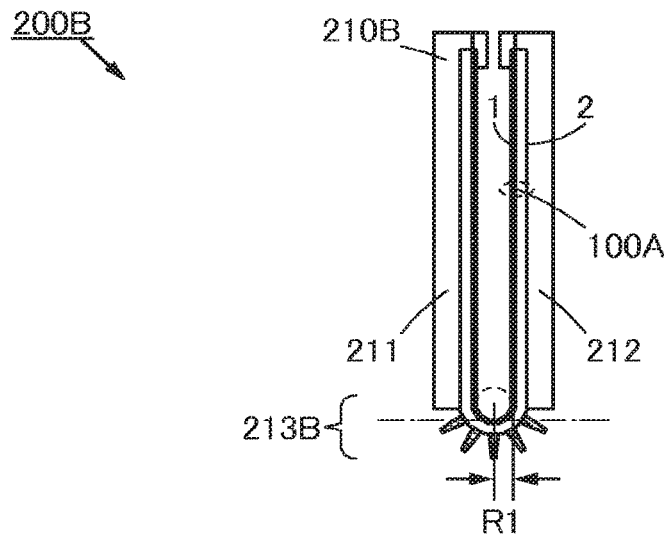
FIGS. 7A to 7C each illustrate a device of one embodiment.
Figure 7B:
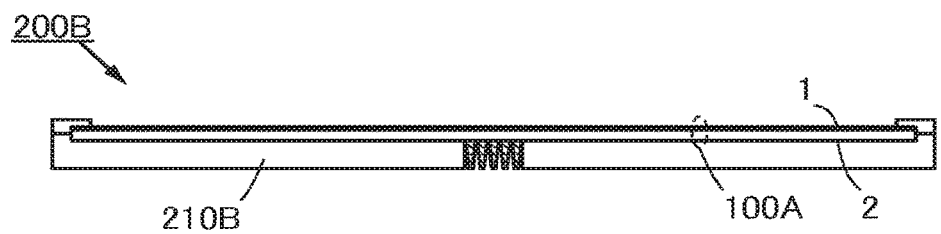
Figure 7C:
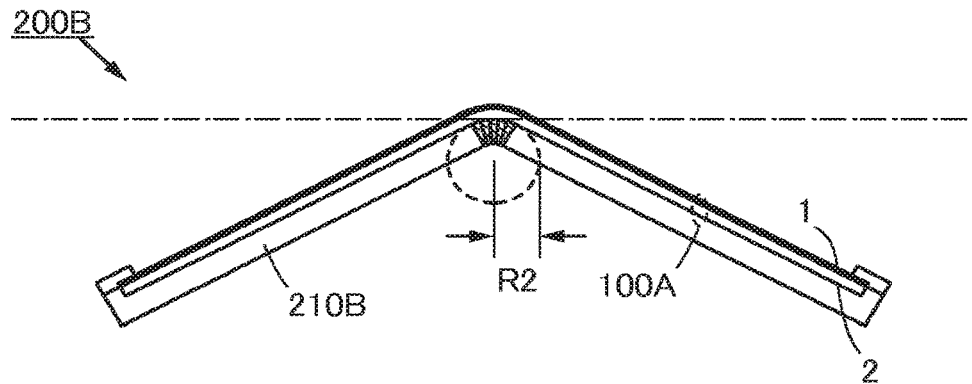

FIGS. 7A to 7C illustrate the structure of a device of one embodiment of the present invention. FIG. 7A is a cross-sectional view illustrating a device 200B of one embodiment of the present invention which is folded. FIG. 7B is a cross-sectional view illustrating the device 200B of one embodiment of the present invention which is unfolded, and FIG. 7C is a cross-sectional view illustrating the device 200B of one embodiment of the present invention which is bent toward the side opposite to that toward which the device 200B is folded in FIG. 7A.

The device 200B described in this embodiment includes the functional panel 100A described in Embodiment 1 and a frame 210B that supports the functional panel 100A. The frame 210B has a function of putting the functional panel 100A into a state in which the functional panel 100A is bent with the first plane 1 inside in such a manner that a fold with a curvature radius that is greater than or equal to a first curvature radius R1 is formed, and a function of putting the functional panel 1004 into a state in which the functional panel 100A is bent with the second plane 2 inside in such a manner that a fold with a curvature radius R2 that is greater than the first curvature radius R1 is formed (see FIGS. 7A to 7C).

The device 200B described as an example in this embodiment includes the functional panel 100A described in Embodiment 1 and the frame 210B having a function of putting the functional panel 1004 to a bent state with the first plane 1 inside. Thus, the functional panel can be bent with the first plane inside, and a novel device can be provided accordingly.

The device 200B is different from the device 200A described with reference to FIGS. 5A to 5D in that the frame 210B has a function of putting the functional panel 100A into a state in which the functional panel 100A is bent with the first plane 1 inside in such a manner that a fold with a curvature radius that is greater than or equal to the first curvature radius R1 is formed, and a function of putting the functional panel 100A into a state in which the functional panel 100A is bent with the second plane 2 inside in such a manner that a fold with the curvature radius R2 that is greater than the first curvature radius R1 is formed. Different structures will be described in detail below, and the above description is referred to for the other similar structures.

<<Structure of Device>>

The device 200B described in this embodiment includes the functional panel 100A or the frame 210B.

<<Structure of Frame>>

The frame 210B includes a hinge portion 213B, a first guide portion 211 connected to the hinge portion 213B, and a second guide portion 212 connected to the hinge portion 213B. The hinge portion 213B has a function of rotatably connecting the second guide portion 212 to the first guide portion 211 (see FIGS. 7A to 7C).

A variety of structures can be used as the hinge portion 213B. For example, a structure including a rotation axis 213S and a plurality of parts 213PB connected to each other with the use of the rotation axis 213S can be used (see FIG. 8A).

The hinge portion 213B with the plurality of parts 213PB connected to each other in such a manner that the parts 213PB spread like a fan can be used, for example. With the hinge portion 213B, the second guide portion 212 can move rotationally with respect to the first guide portion 211. Specifically, the second guide portion 212 can move rotationally from the state shown in FIG. 8A to the state shown in FIG. 8B.

Figure 8A:
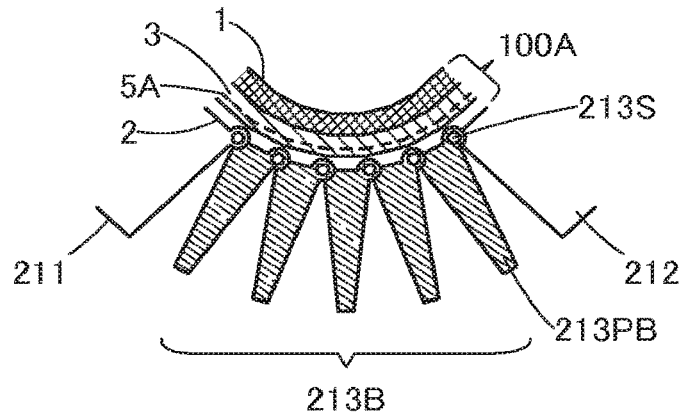
FIGS. 8A to 8D each illustrate a device of one embodiment.
Figure 8B:
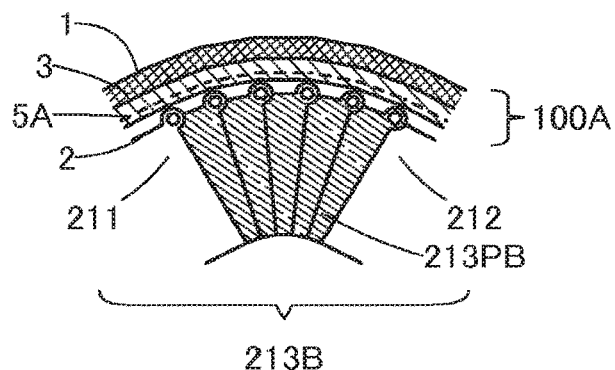

Although the second guide portion 212 can move rotationally with respect to the first guide portion 211 from the state shown in FIG. 7A through the state shown in FIG. 7B to the state shown in FIG. 7C, when the part 213PB comes in contact with the adjacent part as shown in FIG. 8B, the second guide portion 212 cannot go further. The hinge portion 213B thus allows the functional panel 100A to be bent largely toward one side and limits bending of the functional panel 100A toward the opposite side.

A member selected from the structures that can be used as the frame 210A to satisfy the above conditions can be used as the frame 210B.

<<Functional Panel>>

The functional panels described in Embodiment 1, for example, can be used. Specifically, the functional panel 100A, the functional panel 100A2, the functional panel 100B, the functional panel 100C, the functional panel 100D, or the like can be used.

Figure 8C:
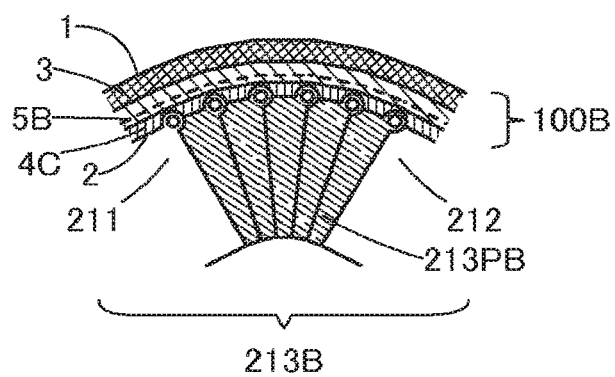

In the case where the functional panel 1009 is used, the functional panel 1009 is positioned such that the first region 7A of the functional panel 100B (the region in which the member 4C is positioned) overlaps with the hinge portion 213 of the frame 210B (see FIG. 8C).

Figure 8D:
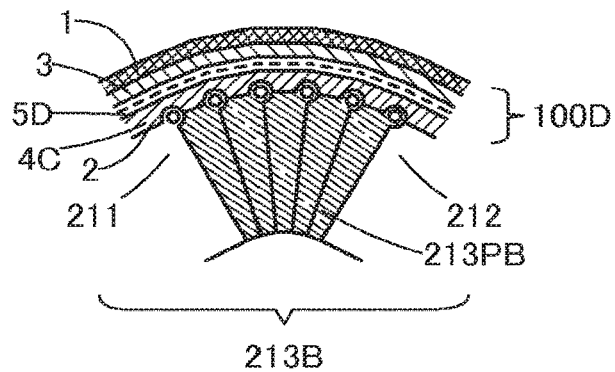

In the case where the functional panel 100D is used, the functional panel 100D is positioned such that the first region 7A of the functional panel 100D (the region in which the member 4C is positioned) overlaps with the hinge portion 213 of the frame 210B (see FIG. 8D).

This embodiment can be combined with any of the other embodiments in this specification as appropriate.

Embodiment 3

In this embodiment, a method of manufacturing a stack that can be used in the manufacture of the functional panel of one embodiment of the present invention will be described with reference to FIGS. 9A-1 and 9A-2, FIGS. 9B-1 and 9B-2, FIG. 9C, FIGS. 9D-1 and 9D-2, and FIGS. 9E-1 and 9E-2.

FIGS. 9A-1 to 9E-2 are schematic views illustrating a process of manufacturing the stack. Cross-sectional views illustrating structures of a processed member and the stack are shown on the left side of FIGS. 9A-1 to 9E-2, and top views corresponding to the cross-sectional views except FIG. 9C are shown on the right side.

<Method of Manufacturing Stack>

A method of manufacturing a stack 81 from a processed member 80 will be described with reference to FIGS. 9A-1 to 9E-2.

Figures 1, 9A:
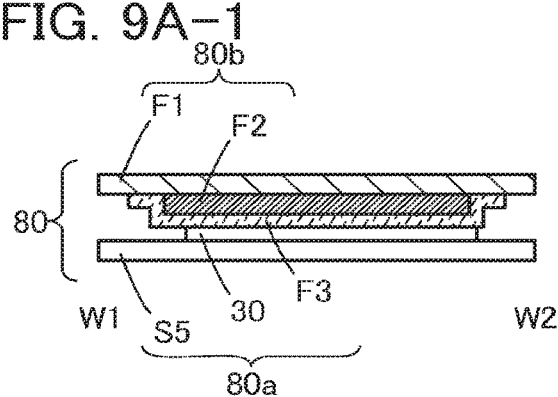
Figures 2, 9A:
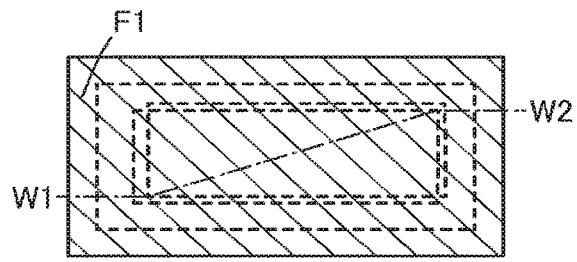

The processed member 80 includes a first substrate F1, a first separation layer F2 on the first substrate F1, a first layer F3 to be separated whose one surface is in contact with the first separation layer F2, a bonding layer 30 whose one surface is in contact with the other surface of the first layer F3 to be separated, and a base S5 in contact with the other surface of the bonding layer 30 (see FIGS. 9A-1 and 9A-2).

Note that the detailed structure of the processed member 80 will be described in Embodiment 5.

<<Formation of Separation Starting Points>>

The processed member 80 in which separation starting points F3s are formed in the vicinity of edges of the bonding layer 30 is prepared.

The separation starting point F3s is formed by separating part of the first layer F3 to be separated, from the first substrate F1.

Part of the first layer F3 to be separated can be separated from the separation layer F2 by inserting a sharp tip into the first layer F3 to be separated, from the first substrate F1 side, or by a method using a laser or the like (e.g., a laser ablation method). Thus, the separation starting point F3s can be formed.

<<First Step>>

Figures 1, 9B:
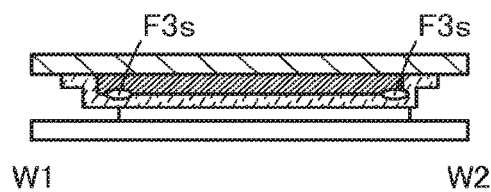
Figures 2, 9B:
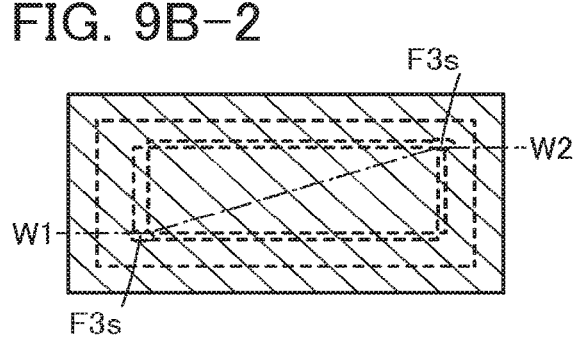
Figure 9C:
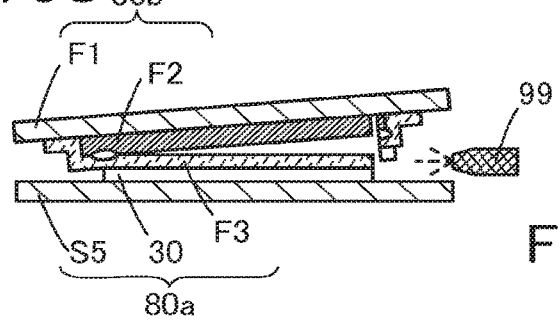
Figures 1, 9D:
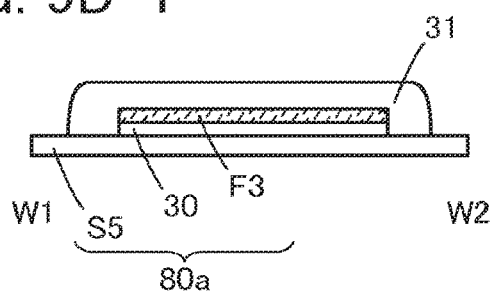
Figures 2, 9D:
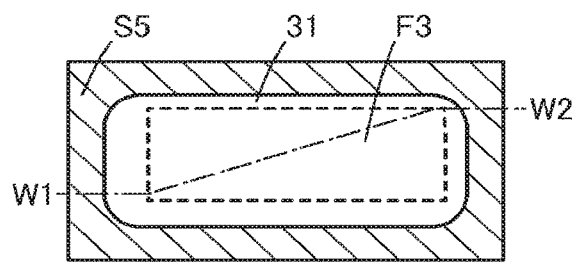

The processed member 80 in which the separation starting points F3s are formed in the vicinity of the edges of the bonding layer 30 in advance is prepared (see FIGS. 9B-1 and 9B-2).

<<Second Step>>

One surface layer 80b of the processed member 80 is separated. As a result, a first remaining portion 80a is obtained from the processed member 80.

Specifically, from the separation starting point F3s formed in the vicinity of the edge of the bonding layer 30, the first substrate F1, together with the first separation layer F2, is separated from the first layer F3 to be separated (see FIG. 9C). Consequently, the first remaining portion 80a including the first layer F3 to be separated, the bonding layer 30 whose one surface is in contact with the first layer F3 to be separated, and the base S5 in contact with the other surface of the bonding layer 30 is obtained.

The separation may be performed while the vicinity of the interface between the first separation layer F2 and the first layer F3 to be separated is irradiated with ions to remove static electricity. Specifically, the ions may be generated by an ionizer.

Furthermore, when the first layer F3 to be separated is separated from the first separation layer F2, a liquid is injected into the interface between the first separation layer F2 and the first layer F3 to be separated. Alternatively, a liquid may be ejected and sprayed by a nozzle 99. For example, as the injected liquid or the sprayed liquid, water, a polar solvent, or the like can be used.

By injecting the liquid, an influence of static electricity and the like generated with the separation can be reduced. Alternatively, the separation may be performed while a liquid that dissolves the separation layer is injected.

In particular, in the case where a film containing tungsten oxide is used as the first separation layer F2, the first layer F3 to be separated is preferably separated while a liquid containing water is injected or sprayed because a stress applied to the first layer F3 to be separated due to the separation can be reduced.

<<Third Step>>

A first adhesive layer 31 is formed on the first remaining portion 80a (see FIGS. 9D-1 and 9D-2), and the first remaining portion 80a is bonded to a first support 41 with the first adhesive layer 31. Consequently, the stack 81 is obtained from the first remaining portion 80a.

Figures 1, 9E:
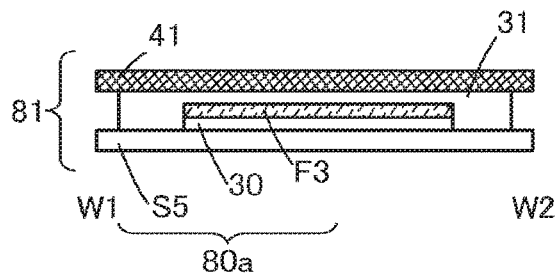
Figures 2, 9E:
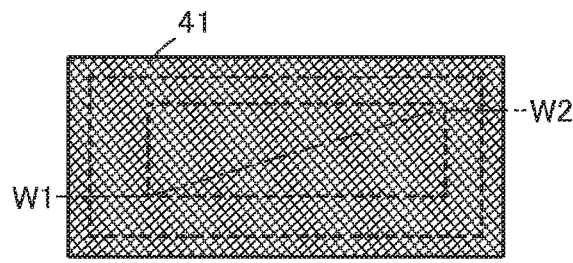

Specifically, the stack 81 including the first support 41, the first adhesive layer 31, the first layer F3 to be separated, the bonding layer 30 whose one surface is in contact with the first layer F3 to be separated, and the base S5 in contact with the other surface of the bonding layer 30 is obtained (see FIGS. 9E-1 and 9E-2).

To form the bonding layer 30, any of a variety of methods can be used. For example, the bonding layer 30 can be formed with a dispenser, by a screen printing method, or the like. The bonding layer 30 is cured by a method selected in accordance with its material. For example, when a light curable adhesive is used for the bonding layer 30, light including light of a predetermined wavelength is emitted.

This embodiment can be combined with any of the other embodiments described in this specification as appropriate.

Embodiment 4

In this embodiment, a method of manufacturing a stack that can be used in the manufacture of the functional panel of one embodiment of the present invention will be described with reference to FIGS. 10A-1 and 10A-2, FIGS. 10B-1 and 10B-2, FIG. 10C, FIGS. 10D-1 and 10D-2, FIGS. 10E-1 and 10E-2, FIGS. 11A-1 and 11A-2, FIG. 11B, FIG. 11C, FIGS. 11D-1 and 11D-2, and FIGS. 11E-1 and 11E-2.

FIGS. 10A-1 to 10E-2 and FIGS. 11A-1 to 11E-2 are schematic views illustrating a process of manufacturing the stack. Cross-sectional views illustrating structures of a processed member and the stack are shown on the left side of FIGS. 10A-1 to 10E-2 and FIGS. 11A-1 to 11E-2, and top views corresponding to the cross-sectional views except FIG. 10C and FIGS. 11B and 11C are shown on the right side.

<Method of Manufacturing Stack>

A method of manufacturing a stack 92 from a processed member 90 will be described with reference to FIGS. 10A-1 to 10E-2 and FIGS. 11A-1 to 11E-2.

The processed member 90 is different from the processed member 80 in that the other surface of the bonding layer 30 is in contact with one surface of a second layer S3 to be separated.

Specifically, the difference is that a stack including the second substrate S1, a second separation layer S2 over the second substrate S1, and the second layer S3 to be separated whose other surface is in contact with the second separation layer S2 is provided instead of the base S5, and that one surface of the second layer S3 to be separated is in contact with the other surface of the bonding layer 30, in the processed member 90.

Figures 1, 10A:
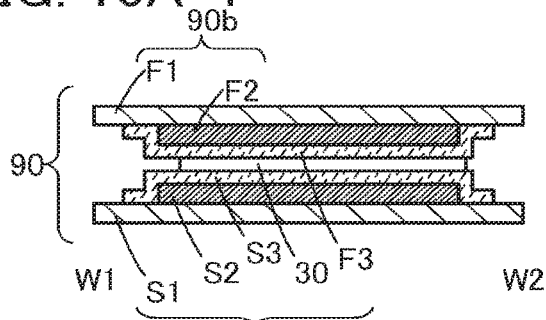
Figures 2, 10A:
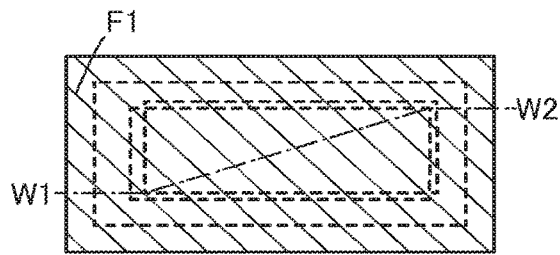

In the processed member 90, the first substrate F1, the first separation layer F2, the first layer F3 to be separated whose one surface is in contact with the first separation layer F2, the bonding layer 30 whose one surface is in contact with the other surface of the first layer F3 to be separated, the second layer S3 to be separated whose one surface is in contact with the other surface of the bonding layer 30, the second separation layer S2 whose one surface is in contact with the other surface of the second layer S3 to be separated, and the second substrate S1 are placed in this order see FIGS. 10A-1 and 10A-2).

Note that the detailed structure of the processed member 90 will be described in Embodiment 5.

<<First Step>>

Figures 1, 10B:
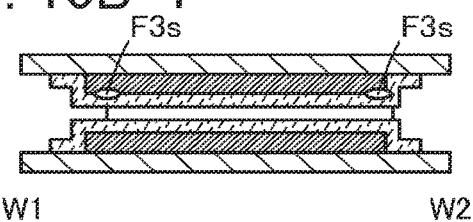
Figures 2, 10B:
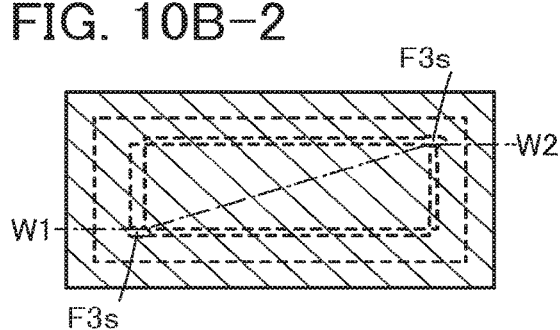
Figure 10C:
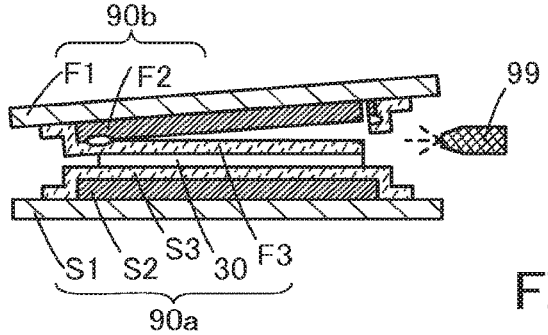
Figures 1, 10D:
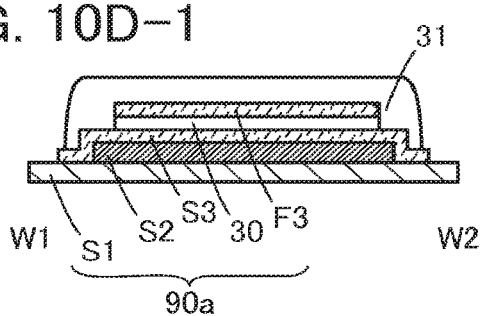
Figures 2, 10D:
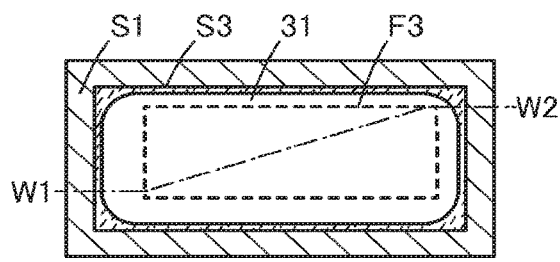

The processed member 90 in which the separation starting points F3s are formed in the vicinity of the edges of the bonding layer 30 is prepared (see FIGS. 10B-1 and 10B-2).

The separation starting point F3s is formed by separating part of the first layer F3 to be separated, from the first substrate F1.

For example, part of the first layer F3 to be separated can be separated from the separation layer F2 by inserting a sharp tip into the first layer F3 to be separated, from the first substrate F1 side, or by a method using a laser or the like (e.g., a laser ablation method). Thus, the separation starting point F3s can be formed.

<<Second Step>>

One surface layer 90b of the processed member 90 is separated. As a result, a first remaining portion 90a is obtained from the processed member 90.

Specifically, from the separation starting point F3s formed in the vicinity of the edge of the bonding layer 30, the first substrate F1, together with the first separation layer F2, is separated from the first layer F3 to be separated (see FIG. 10C). Consequently, the first remaining portion 90a in which the first layer F3 to be separated, the bonding layer 30 whose one surface is in contact with the first layer F3 to be separated, the second layer S3 to be separated whose one surface is in contact with the other surface of the bonding layer 30, the second separation layer S2 Whose one surface is in contact with the other surface of the second layer S3 to be separated, and the second substrate S1 are placed in this order is obtained.

Note that the separation may be performed while the vicinity of the interface between the second separation layer S2 and the second layer S3 to be separated is irradiated with ions to remove static electricity. Specifically, the ions may be generated by an ionizer.

Furthermore, when the second layer S3 to be separated is separated from the second separation layer S2, a liquid is injected into the interface between the second separation layer S2 and the second layer S3 to be separated. Alternatively, a liquid may be ejected and sprayed by a nozzle 99. For example, as the liquid to be injected or the liquid to be sprayed, water, a polar solvent, or the like can be used.

By injecting the liquid, an influence of static electricity and the like generated with the separation can be reduced. Alternatively, the separation may be performed while a liquid that dissolves the separation layer is injected.

In particular, in the case where a film containing tungsten oxide is used as the second separation layer S2, the second layer S3 to be separated is preferably separated while a liquid containing water is injected or sprayed because a stress applied to the second layer S3 to be separated due to the separation can be reduced.

<<Third Step>>

A first adhesive layer 31 is formed on the first remaining portion 90a (see FIGS. 10D-1 and 10D-2), and the first remaining portion 90a is bonded to a first support 41 with the first adhesive layer 31. Consequently, a stack 91 is obtained from the first remaining portion 90a.

Figures 1, 10E:
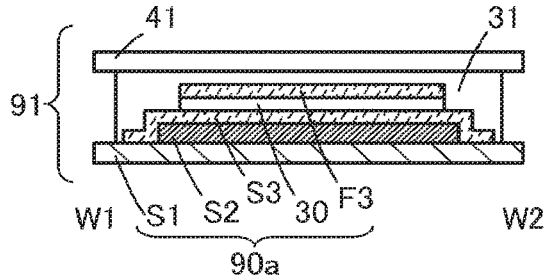
Figures 2, 10E:
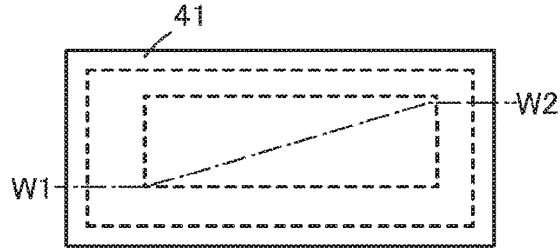

Specifically, the stack 91 in which the first support 41, the first adhesive layer 31, the first layer F3 to be separated, the bonding layer 30 whose one surface is in contact with the first layer F3 to be separated, the second layer S3 to be separated whose one surface is in contact with the other surface of the bonding layer 30, the second separation layer S2 whose one surface is in contact with the other surface of the second layer S3 to be separated, and the second substrate S1 are placed in this order is obtained (see FIGS. 10E-1 and 10E-2).

<<Fourth Step>>

Part of the second layer S3 to be separated in the vicinity of the edge of the first adhesive layer 31 of the stack 91 is separated from the second substrate S1 to form a second separation starting point 91s.

For example, the first support 41 and the first adhesive layer 31 are cut from the first support 41 side, and part of the second layer S3 to be separated is separated from the second substrate S1 along an edge of the first adhesive layer 31 which is newly formed.

Figures 1, 11A:
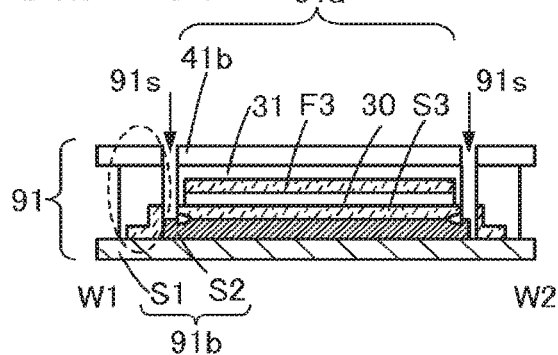
Figures 2, 11A:
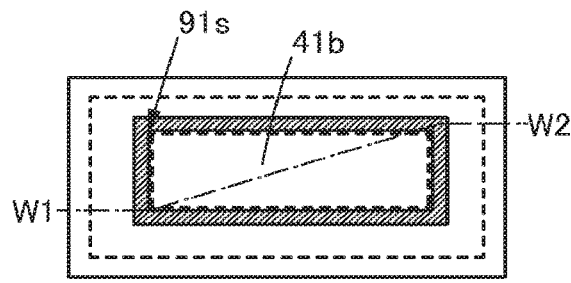
Figure 11B:
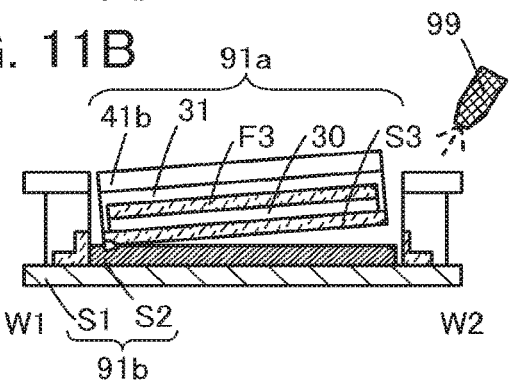
Figure 11C:
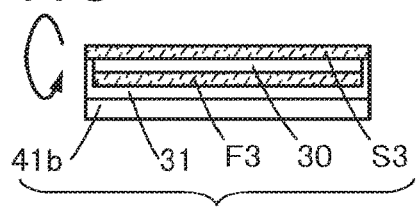

Specifically, the first adhesive layer 31 and the first support 41 in a region which is over the second separation layer S2 and in which the second layer S3 to be separated is provided are cut with a blade or the like including a sharp tip, and along a newly formed edge of the first adhesive layer 31, the second layer S3 to be separated is partly separated from the second substrate S1 (see FIGS. 11A-1 and 11A-2).

Consequently, the separation starting points 91s are formed in the vicinity of newly formed edges of the first support 41b and the first adhesive layer 31.

<<Fifth Step>>

A second remaining portion 91a is separated from the stack 91. As a result, the second remaining portion 91a is obtained from the stack 91 (see FIG. 11C).

Specifically, from the separation starting point 91s formed in the vicinity of the edge of the first adhesive layer 31, the second substrate S1, together with the second separation layer S2, is separated from the second layer S3 to be separated. Consequently, the second remaining portion 91a in which the first support 41b, the first adhesive layer 31, the first layer F3 to be separated, the bonding layer 30 whose one surface is in contact with the first layer F3 to be separated, and the second layer S3 to be separated whose one surface is in contact with the other surface of the bonding layer 30 are placed in this order is obtained.

Note that the separation may be performed while the vicinity of the interface between the second separation layer S2 and the second layer S3 to be separated is irradiated with ions to remove static electricity. Specifically, the ions may be generated by an ionizer.

Furthermore, when the second layer S3 to be separated is separated from the second separation layer S2, a liquid is injected into the interface between the second separation layer S2 and the second layer S3 to be separated. Alternatively, a liquid may be ejected and sprayed by a nozzle 99. For example, as the liquid to be injected or the liquid to be sprayed, water, a polar solvent, or the like can be used.

By injecting the liquid, an influence of static electricity and the like generated with the separation can be reduced. Alternatively, the separation may be performed while a liquid that dissolves the separation layer is injected.

In particular, in the case where a film containing tungsten oxide is used as the second separation layer S2, the second layer S3 to be separated is preferably separated while a liquid containing water is injected or sprayed because a stress applied to the second layer S3 to be separated due to the separation can be reduced.

<<Sixth Step>>

Figures 1, 11D:
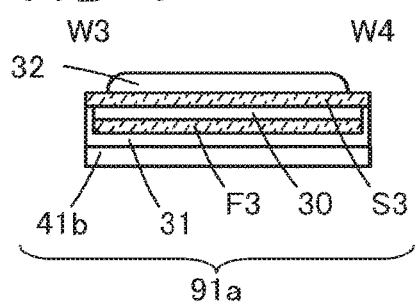
Figures 2, 11D:
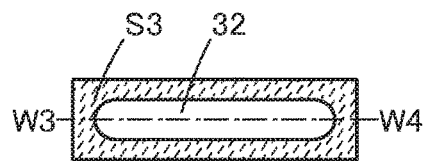
Figures 1, 11E:
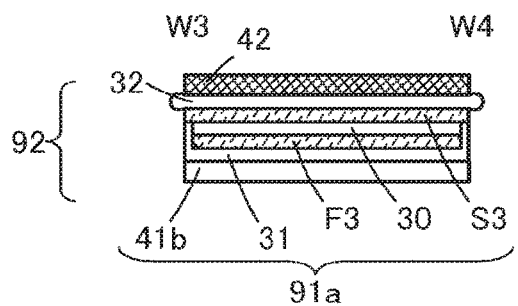
Figures 2, 11E:
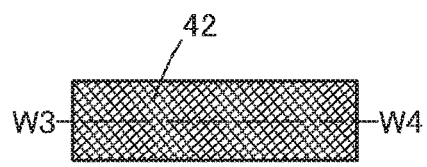

A second adhesive layer 32 is formed on the second remaining portion 91a (see FIGS. 11D-1 and 11D-2).

The second remaining portion 91a is bonded to the second support 42 with the second adhesive layer 32. Consequently, a stack 92 is obtained from the second remaining portion 91a (see FIGS. 11E-1 and 11E-2).

Specifically, the stack 92 in which first support 41b, the first adhesive layer 31, the first layer F3 to be separated, the bonding layer 30 whose one surface is in contact with the first layer F3 to be separated, the second layer S3 to be separated whose one surface is in contact with the other surface of the bonding layer 30, the second adhesive layer 32, and the second support 42 are placed in this order is obtained.

<Method of Manufacturing Stack Including Opening Portion in Support>

A method of manufacturing a stack including an opening portion in a support will be described with reference to FIGS. 12A-1 and 12A-2, FIGS. 12B-1 and 12B-2, FIGS. 12C-1 and 12C-2, and FIGS. 12D-1 and 12D-2.

FIGS. 12A-I to 12D-2 illustrate the method of manufacturing a stack including an opening portion which exposes part of a layer to be separated in a support.

Cross-sectional views illustrating structures of the stack are shown on the left side of FIGS. 12A-1 to 12D-2, and top views corresponding to the cross-sectional views are shown on the right side.

FIGS. 12A-1 to 12B-2 illustrate a method of manufacturing a stack 92c including an opening portion by using a second support 42b that is smaller than the first support 41b.

FIGS. 12C-1 to 12D-2 illustrate a method of manufacturing a stack 92d including an opening portion formed in the second support 42.

Example 1 of Method of Manufacturing Stack Including Opening Portion in Support

This method of manufacturing a stack has the same steps as the above except that the second support 42b that is smaller than the first support 41b is used instead of the second support 42 in the sixth step. By this method, a stack in which part of the second layer S3 to be separated is exposed can be manufactured (see FIGS. 12A-1 and 12A-2).

As the second adhesive layer 32, a liquid adhesive can be used. Alternatively, an adhesive whose fluidity is inhibited and which is formed in a single wafer shape in advance (also referred to as a sheet-like adhesive can be used. By using the sheet-like adhesive, the amount of part of the adhesive layer 32 which extends beyond the second support 42b can be small. In addition, the adhesive layer 32 can have a uniform thickness easily.

Figures 1, 12A:
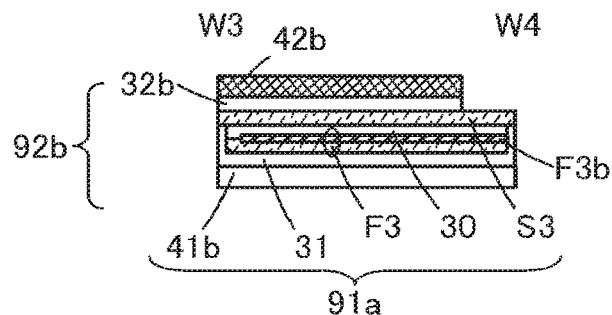
Figures 2, 12A:
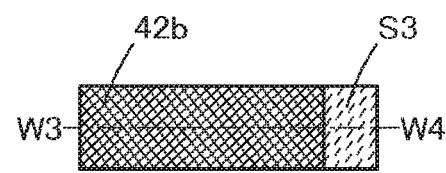
Figures 1, 12B:
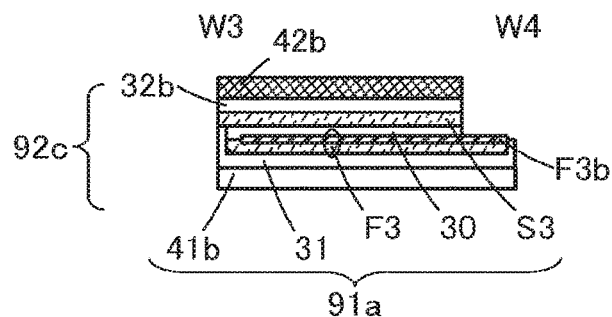
Figures 2, 12B:
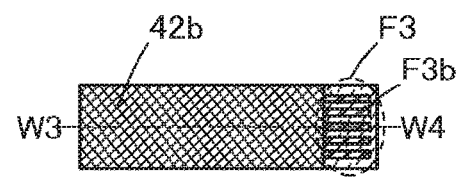
Figures 1, 12C:
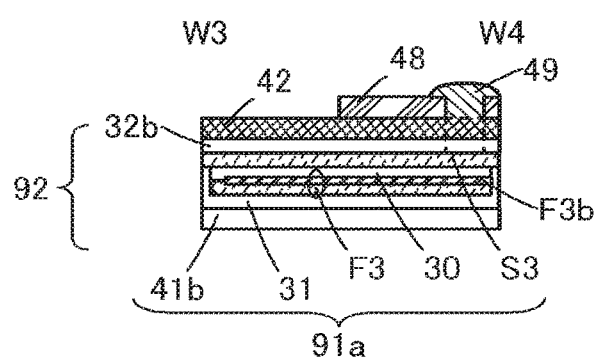
Figures 2, 12C:
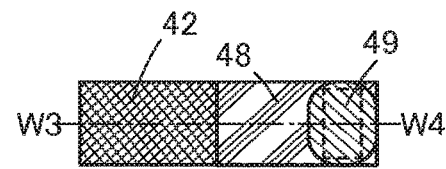

Part of the second layer S3 to be separated, which is exposed, may be cut off, such that the first layer F3 to be separated is exposed (see FIGS. 12B-1 and 12B-2).

Specifically, with a blade or the like which has a sharp tip, a slit is formed in the exposed second layer S3 to be separated. Then, for example, an adhesive tape or the like is attached to part of the exposed second layer S3 to be separated to concentrate stress near the slit, and the part of the exposed second layer S3 to be separated is separated together with the attached tape or the like, whereby the part of the second layer S3 to be separated can be selectively removed.

Moreover, a layer that can suppress the bonding power of the bonding layer 30 to the first layer F3 to be separated may be selectively formed on part of the first layer F3 to be separated. For example, a material that is not easily bonded to the bonding layer 30 may be selectively formed. Specifically, an organic material may be deposited into an island shape. Thus, part of the bonding layer 30 can be selectively removed together with the second layer S3 to be separated easily. As a result, the first layer F3 to be separated can be exposed.

Note that for example, in the case where the first layer F3 to be separated includes a functional layer and a conductive layer F3b electrically connected to the functional layer, the conductive layer F3b can be exposed in an opening portion in the second stack 92c. Thus, the conductive layer F3b exposed in the opening portion can be used as a terminal supplied with a signal.

As a result, the conductive layer F3b part of which is exposed in the opening portion can be used as a terminal that can extract a signal supplied though the functional layer, or can be used as a terminal to which a signal supplied to the functional layer can be supplied by an external device.

Example 2 of Method of Manufacturing Stack Including Opening Portion in Support

A mask 48 including an opening portion formed to overlap with an opening portion formed in the second support 42 is formed on the stack 92. Next, a solvent 49 is dropped into the opening portion in the mask 48. Thus, with the solvent 49, the second support 42 exposed in the opening portion in the mask 48 can be swelled or dissolved (see FIGS. 12C-1 and 12C-2).

After the extra solvent 49 is removed, stress is applied by, for example, rubbing the second support 42 exposed in the opening portion in the mask 48. Thus, the second support 42 or the like in a region that overlaps with the opening portion in the mask 48 can be removed.

Figures 1, 12D:
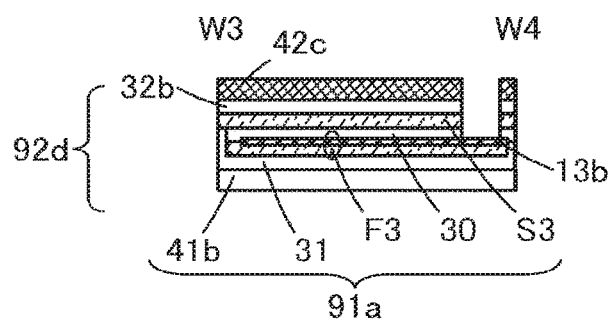
Figures 2, 12D:

Moreover, with a solvent with which the bonding layer 30 is swelled or dissolved, the first layer F3 to be separated can be exposed (see FIGS. 12D-1 and 12D-2).

This embodiment can be combined with any of the other embodiments described in this specification as appropriate.

Embodiment 5

In this embodiment, a structure of a processed member that can be processed into the functional panel of one embodiment of the present invention will be described with reference to FIGS. 13A-1 and 13A-2 and FIGS. 133-1 and 133-2.

FIGS. 13A-1 to 13B-2 are schematic views illustrating a structure of a processed member that can be processed into the stack.

Figures 1, 13A:
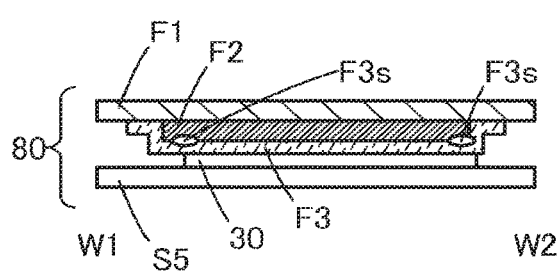
Figures 2, 13A:
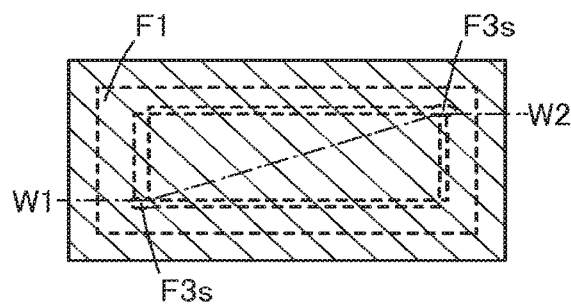

FIG. 13A-1 is a cross-sectional view illustrating a structure of the processed member 80 which can be processed into the stack, and FIG. 13A-2 is a top view corresponding to the cross-sectional view.

Figures 1, 13B:
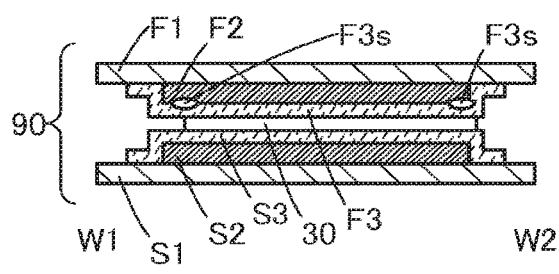
Figures 2, 13B:
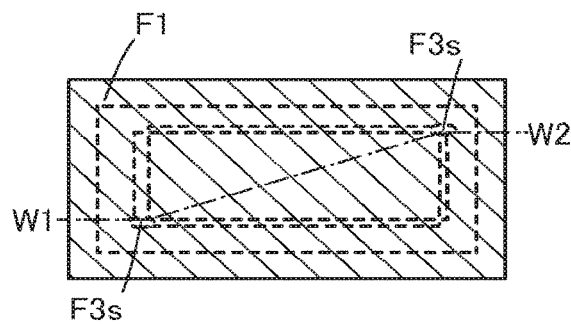

FIG. 13B-1 is a cross-sectional view illustrating a structure of the processed member 90 which can be processed into the stack, and FIG. 13B-2 is a top view corresponding to the cross-sectional view.

Structural Example 1 of Processed Member

The processed member 80 includes the first substrate F1, the first separation layer F2 on the first substrate F1, the first layer F3 to be separated whose one surface is in contact with the first separation layer F2, the bonding layer 30 whose one surface is in contact with the other surface of the first layer F3 to be separated, and the base S5 in contact with the other surface of the bonding layer 30 (see FIGS. 13A-1 and 13A-2).

Note that the separation starting points F3s may be formed in the vicinity of the edges of the bonding layer 30.

<<First Substrate>>

There is no particular limitation on the first substrate F1 as long as it has heat resistance high enough to withstand a manufacturing process and a thickness and a size that allow the first substrate F1 to be placed in a manufacturing apparatus.

For the first substrate F1, an organic material, an inorganic material, a composite material of an organic material and an inorganic material, or the like can be used.

For example, an inorganic material such as glass, ceramic, or metal, can be used for the first substrate F1.

Specifically, non-alkali glass, soda-lime glass, potash glass, crystal glass, or the like can be used for the first substrate F1.

Specifically, a metal oxide film, a metal nitride film, a metal oxynitride film, or the like can be used for the first substrate F1. For example, silicon oxide, silicon nitride, silicon oxynitride, an alumina film, or the like can be used for the first substrate F1.

Specifically, SUS, aluminum, or the like can be used for the first substrate F1.

For example, an organic material such as a resin, a resin film, or a plastic can be used for the first substrate F1.

Specifically, a resin film or a resin plate of polyester, polyolefin, polyamide, polyimide, polycarbonate, an acrylic resin, or the like can be used for the first substrate F1.

For example, a composite material such as a resin film to which a metal plate, a thin glass plate, or a film of an inorganic material is attached can be used as the first substrate F1.

For example, a composite material formed by dispersing a fibrous or particulate metal, glass, inorganic material, or the like into a resin film can be used as the first substrate F1.

For example, a composite material formed by dispersing a fibrous or particulate resin, organic material, or the like into an inorganic material can be used as the first substrate F1.

For the first substrate F1, a single-layer material or a stacked-layer material in which a plurality of layers are stacked can be used. For example, a stacked-layer material in which a base, an insulating layer that prevents the diffusion of impurities contained in the base, and the like are stacked can be used for the first substrate F1.

Specifically, a stacked-layer material in which glass and one or a plurality of films that prevents the diffusion of impurities contained in the glass and that are selected from a silicon oxide film, a silicon nitride film, a silicon oxynitride film, and the like are stacked can be used for the first substrate F1.

Alternatively, a stacked-layer material including a resin and a film that prevents the diffusion of impurities passing through the resin, such as a silicon oxide film, a silicon nitride film, or a silicon oxynitride film, can be used for the first substrate F1.

<<First Separation Layer>>

The first separation layer F2 is provided between the first substrate F1 and the first layer F3 to be separated. In the vicinity of the first separation layer F2, a boundary where the first layer F3 to be separated can be separated from the first substrate F1 is formed. There is no particular limitation on the first separation layer F2 as long as it has heat resistance high enough to withstand the manufacturing process of the first layer F3 to be separated formed thereon.

For the first separation layer F2, for example, an inorganic material, an organic resin, or the like can be used.

Specifically, an inorganic material such as a metal containing an element selected from tungsten, molybdenum, titanium, tantalum, niobium, nickel, cobalt, zirconium, zinc, ruthenium, rhodium, palladium, osmium, iridium, and silicon, an alloy containing the element, or a compound containing the element can be used for the first separation layer F2.

Specifically, an organic material such as polyimide, polyester, polyolefin, polyimide, polycarbonate, or an acrylic resin can be used.

For example, a single-layer material or a stacked-layer material in which a plurality of layers are stacked can be used for the first separation layer F2.

Specifically, a material in which a layer containing tungsten and a layer containing an oxide of tungsten are stacked can be used for the first separation layer F2.

The layer containing an oxide of tungsten can be formed by a method in which another layer is stacked on a layer containing tungsten. Specifically, the layer containing an oxide of tungsten may be formed by a method in which silicon oxide, silicon oxynitride, or the like is stacked on a layer containing tungsten.

The layer containing an oxide of tungsten may be formed by subjecting a surface of a layer containing tungsten to thermal oxidation treatment, oxygen plasma treatment, nitrous oxide ($N_2O$) plasma treatment, treatment with a solution with high oxidizing power (e.g., ozone water), or the like.

Specifically, a layer containing polyimide can be used as the first separation layer F2. The layer containing polyimide has heat resistance high enough to withstand the various manufacturing steps required to form the first layer F3 to be separated.

For example, the layer containing polyimide has heat resistance of 200° C. or higher, preferably 250° C. or higher, more preferably 300° C. or higher, still more preferably 350° C. or higher.

By heating a film containing a monomer formed on the first substrate F1, a film containing polyimide obtained by condensation of the monomer can be obtained. Such a film can be used as the layer containing polyimide.

<<First Layer to be Separated>>

There is no particular limitation on the first layer F3 to be separated as long as it can be separated from the first substrate F1 and has heat resistance high enough to withstand the manufacturing process.

The boundary where the first layer F3 to be separated can be separated from the first substrate F1 may be formed between the first layer F3 to be separated and the first separation layer F2 or may be formed between the first separation layer F2 and the first substrate F1.

In the case where the boundary is formed between the first layer F3 to be separated and the first separation layer F2, the first separation layer F2 is not included in the stack. In the case where the boundary is formed between the first separation layer F2 and the first substrate F1, the first separation layer F2 is included in the stack.

An inorganic material, an organic material, a single-layer material, a stacked-layer material in which a plurality of layers are stacked, or the like can be used for the first layer F3 to be separated.

For example, an inorganic material such as a metal oxide film, a metal nitride film, or a metal oxynitride film can be used for the first layer F3 to be separated.

Specifically, silicon oxide, silicon nitride, silicon oxynitride, an alumina film, or the like can be used for the first layer F3 to be separated.

Specifically, a resin, a resin film, plastic, or the like can be used for the first layer F3 to be separated.

Specifically, a polyimide film or the like can be used for the first layer F3 to be separated.

For example, a material having a structure in which a functional layer having a region that overlaps with the first separation layer F2 and an insulating layer that is provided between the first separation layer F2 and the functional layer and can prevent the diffusion of impurities which impair the function of the functional layer are stacked can be used.

Specifically, a 0.7-mm-thick glass plate is used as the first substrate F1, and a stacked-layer material in which a 200-nm-thick silicon oxynitride film and a 30-nm-thick tungsten film are stacked in this order from the first substrate F1 side is used for the first separation layer F2. In addition, a film including a stacked-layer material in which a 600-nm-thick silicon oxynitride film and a 200-nm-thick silicon nitride film are stacked in this order from the first separation layer F2 side can be used as the first layer F3 to be separated. Note that a silicon oxynitride film refers to a film that includes more oxygen than nitrogen, and a silicon nitride oxide film refers to a film that includes more nitrogen than oxygen.

Specifically, instead of the above first layer F3 to be separated, a film including a stacked-layer material of a 600-nm-thick silicon oxynitride film, a 200-nm-thick silicon nitride film, a 200-nm-thick silicon oxynitride film, a 140-nm-thick silicon nitride oxide film, and a 100-nm-thick silicon oxynitride film stacked in this order from the first separation layer F2 side can be used as the first layer F3 to be separated.

Specifically, a stacked-layer material in which a polyimide film, a layer containing silicon oxide, silicon nitride, or the like and the functional layer are stacked in this order from the first separation layer F2 side can be used.

<<Functional Layer>>

The functional layer is included in the first layer F3 to be separated.

For example, a functional circuit, a functional element, an optical element, a functional film, or a layer including a plurality of elements selected from these can be used as the functional layer.

Specifically, a display element that can be used for a display device, a pixel circuit driving the display element, a driver circuit driving the pixel circuit, a color filter, a moisture-proof film, and the like, and a layer including two or more selected from these can be given.

<<Bonding Layer>>

There is no particular limitation on the bonding layer 30 as long as it bonds the first layer F3 to be separated and the base S5 to each other.

For the bonding layer 30, an inorganic material, an organic material, a composite material of an inorganic material and an organic material, or the like can be used.

For example, a glass layer with a melting point of 400° C. or lower, preferably 300° C. or lower, an adhesive, or the like can be used.

For example, an organic material such as a light curable adhesive, a reactive curable adhesive, a thermosetting adhesive, and/or an anaerobic adhesive can be used for the bonding layer 30.

Specifically, an adhesive containing an epoxy resin, an acrylic resin, a silicone resin, a phenol resin, a polyimide resin, an imide resin, a polyvinyl chloride (PVC) resin, a polyvinyl butyral (PVB) resin, and an ethylene vinyl acetate (EVA) resin, or the like can be used.

<<Base>>

There is no particular limitation on the base S5 as long as it has heat resistance high enough to withstand a manufacturing process and a thickness and a size that allow the base S5 to be placed in a manufacturing apparatus.

A material that can be used for the base S5 can be the same as that of the first substrate F1, for example.

<<Separation Starting Point>>

In the processed member 80, the separation starting point F3s may be formed in the vicinity of the edges of the bonding layer 30.

The separation starting point F3s is formed by separating part of the first layer F3 to be separated, from the first substrate F1.

Part of the first layer F3 to be separated can be separated from the separation layer F2 by inserting a sharp tip into the first layer F3 to be separated, from the first substrate F1 side, or by a method using a laser or the like (e.g., a laser ablation method). Thus, the separation starting point F3s can be formed.

Structural Example 2 of Processed Member

A structure of the processed member that can be the stack and is different from the above will be described with reference to FIGS. 13B-1 and 13B-2.

The processed member 90 is different from the processed member 80 in that the other surface of the bonding layer 30 is in contact with one surface of the second layer S3 to be separated instead of the base S5.

Specifically, the processed member 90 includes the first substrate F1 on which the first separation layer F2 and the first layer F3 to be separated whose one surface is in contact with the first separation layer F2 are formed, the second substrate S1 on which the second separation layer S2 and the second layer S3 to be separated whose other surface is in contact with the second separation layer S2 are formed, and the bonding layer 30 whose one surface is in contact with the other surface of the first layer F3 to be separated and whose other surface is in contact with the one surface of the second layer S3 to be separated (see FIGS. 13B-1 and 13B-2).

<<Second Substrate>>

As the second substrate S1, a substrate similar to the first substrate F1 can be used. Note that the second substrate S1 need not necessarily have the same structure as the first substrate F1.

<<Second Separation Layer>>

For the second separation layer S2, a structure similar to that of the first separation layer F2 can be used. For the second separation layer S2, a structure different from that of the first separation layer F2 can also be used.

<<Second Layer to be Separated>>

As the second layer S3 to be separated, a structure similar to that of the first layer F3 to be separated can be used. For the second layer S3 to be separated, a structure different from that of the first layer F3 to be separated can also be used.

Specifically, a structure may be employed in which the first layer F3 to be separated includes a functional circuit and the second layer S3 to be separated includes a functional layer that prevents the diffusion of impurities into the functional circuit.

Specifically, a structure may be employed in which the first layer F3 to be separated includes a light-emitting element that emits light to the second layer S3 to be separated, a pixel circuit driving the light-emitting element, and a driver circuit driving the pixel circuit, and the second layer S3 to be separated includes a color filter that transmits part of light emitted from the light-emitting element and a moisture-proof film that prevents the diffusion of impurities into the light-emitting element. Note that the processed member with such a structure can be used for a stack that can be used as a flexible display device.

This embodiment can be combined with any of the other embodiments in this specification as appropriate.

Embodiment 6

Figure 26:
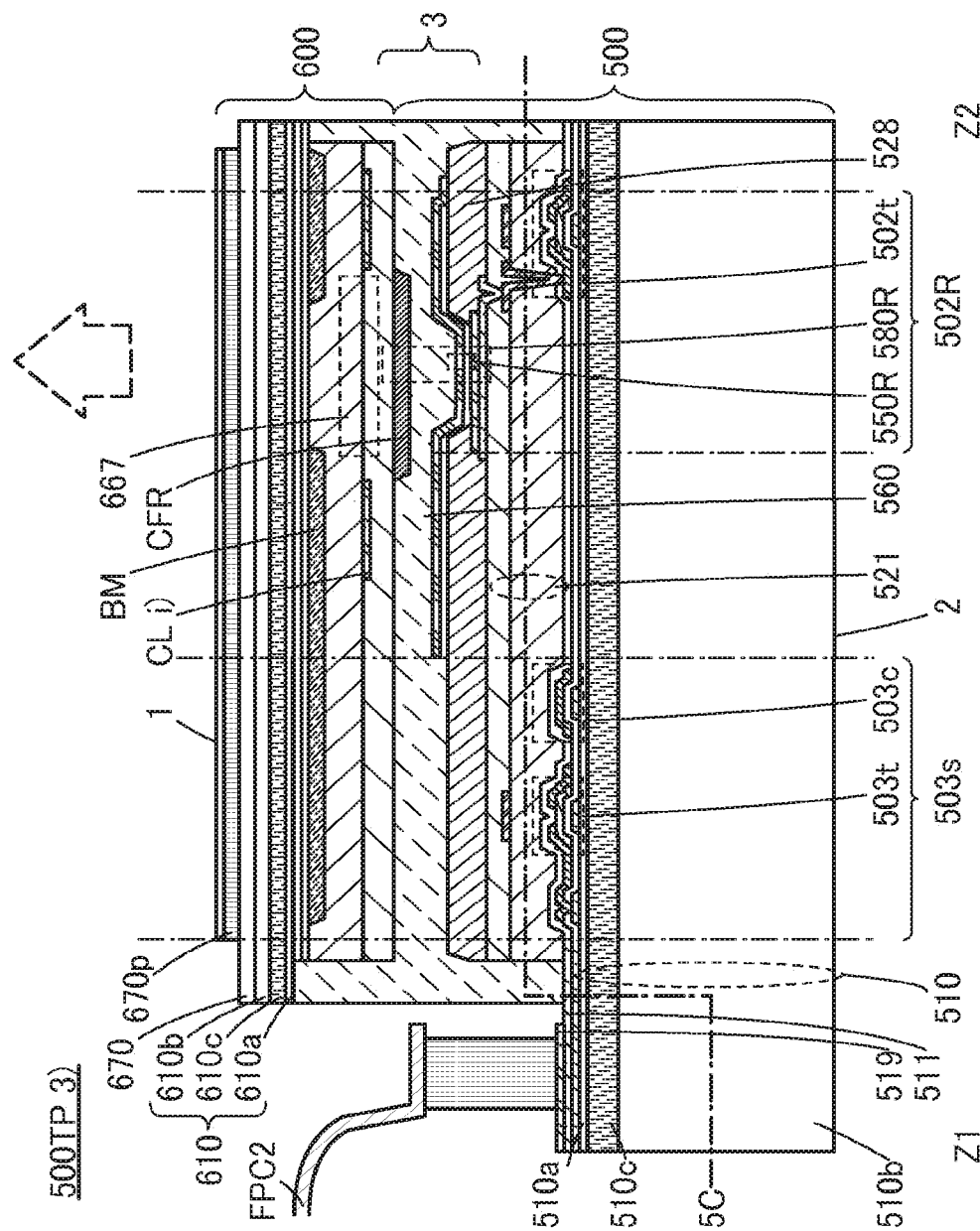
FIG. 26 illustrates an input/output device of one embodiment.
Figure 27:
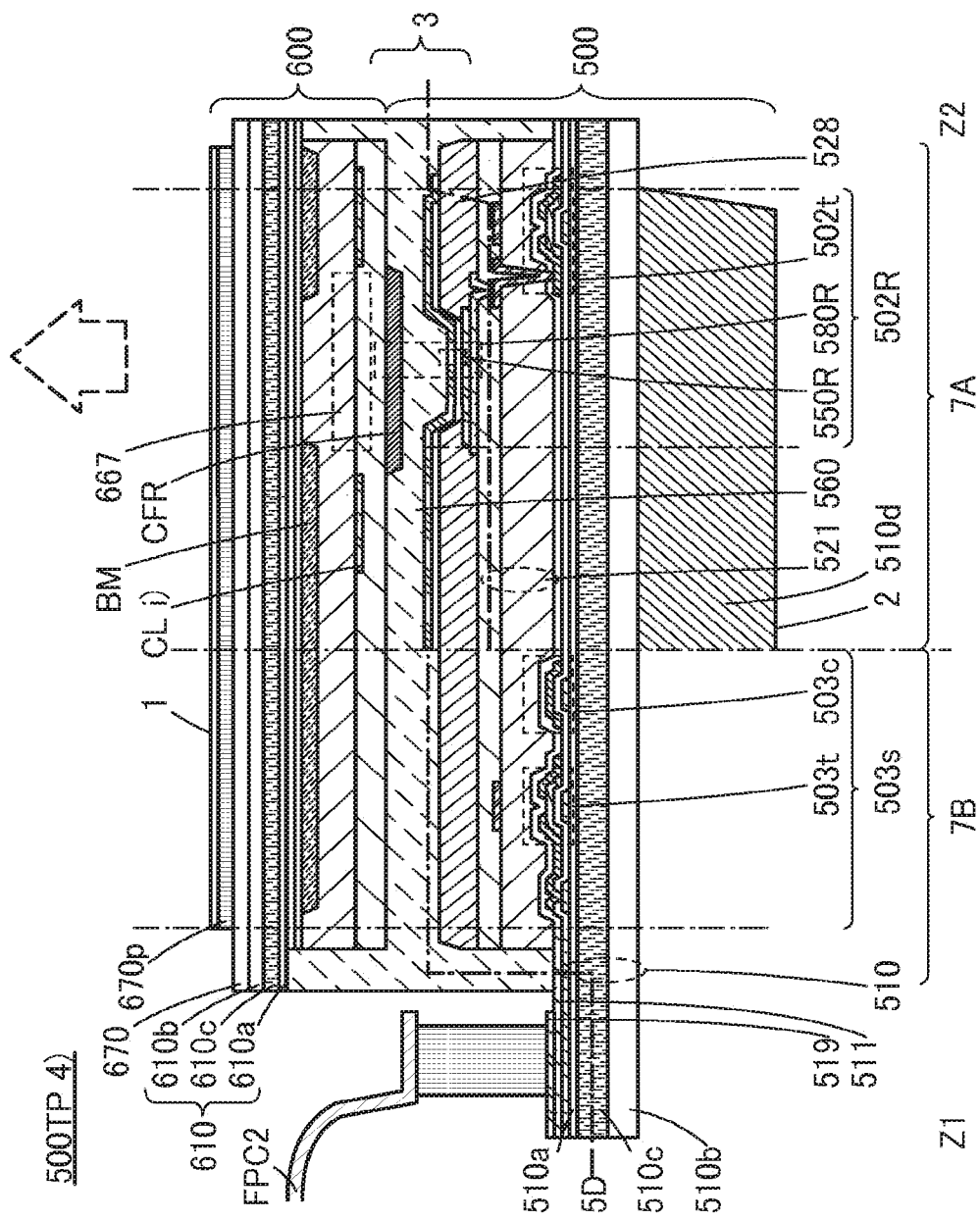
FIG. 27 illustrates an input/output device of one embodiment.

In this embodiment, the structure of an input/output device will be described as an example of the structure of a functional panel of one embodiment of the present invention, with reference to FIG. 14, FIGS. 154 to 15C, FIG. 24, FIG. 25. FIG. 26, and FIG. 27.

Figure 14:
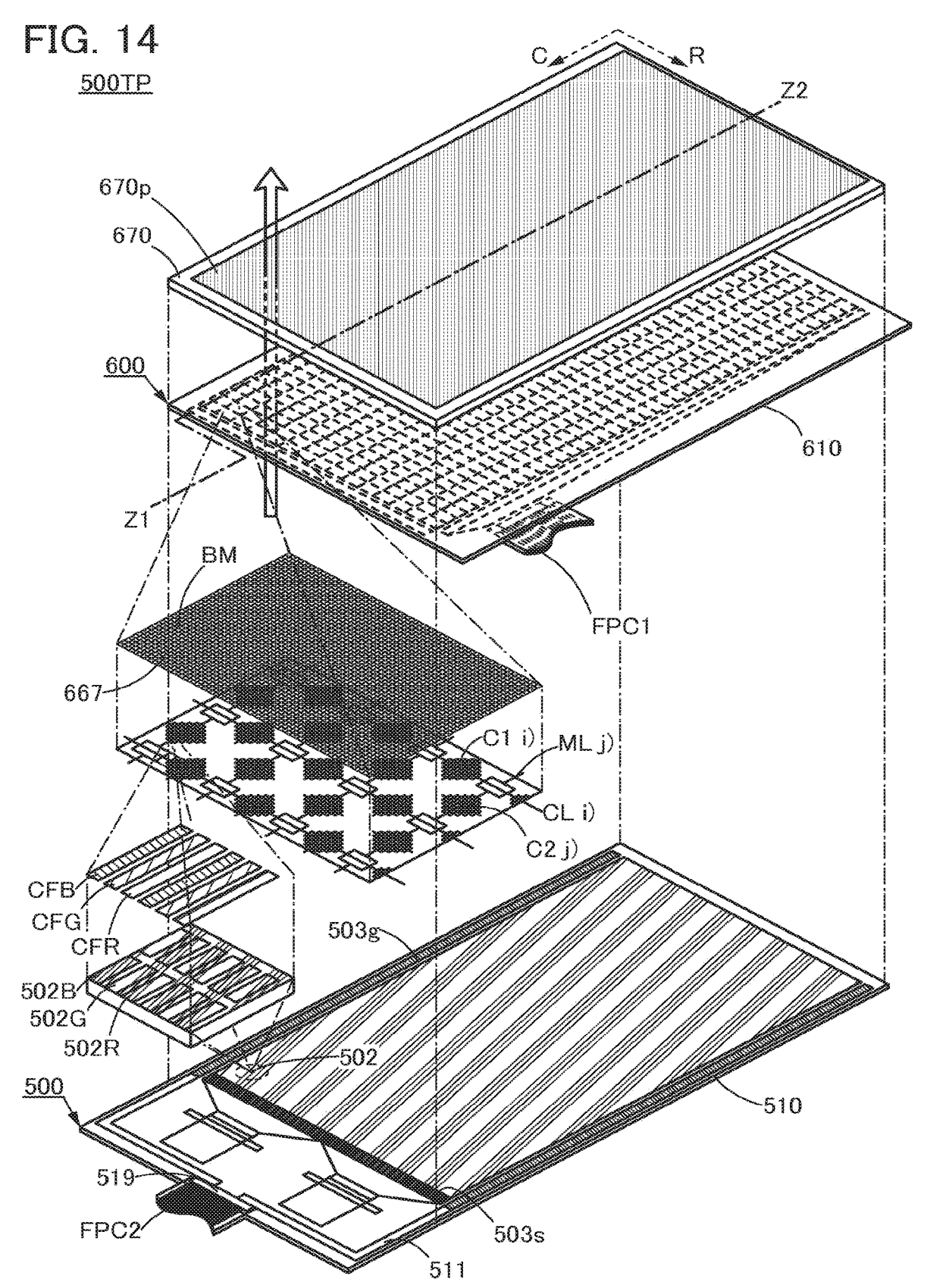

FIG. 14 is a projection view illustrating the structure of an input/output device 500TP of one embodiment of the present invention. Note that for convenience of description, part of a sensor panel 600 and part of a pixel 502 are enlarged.

Figure 15A:
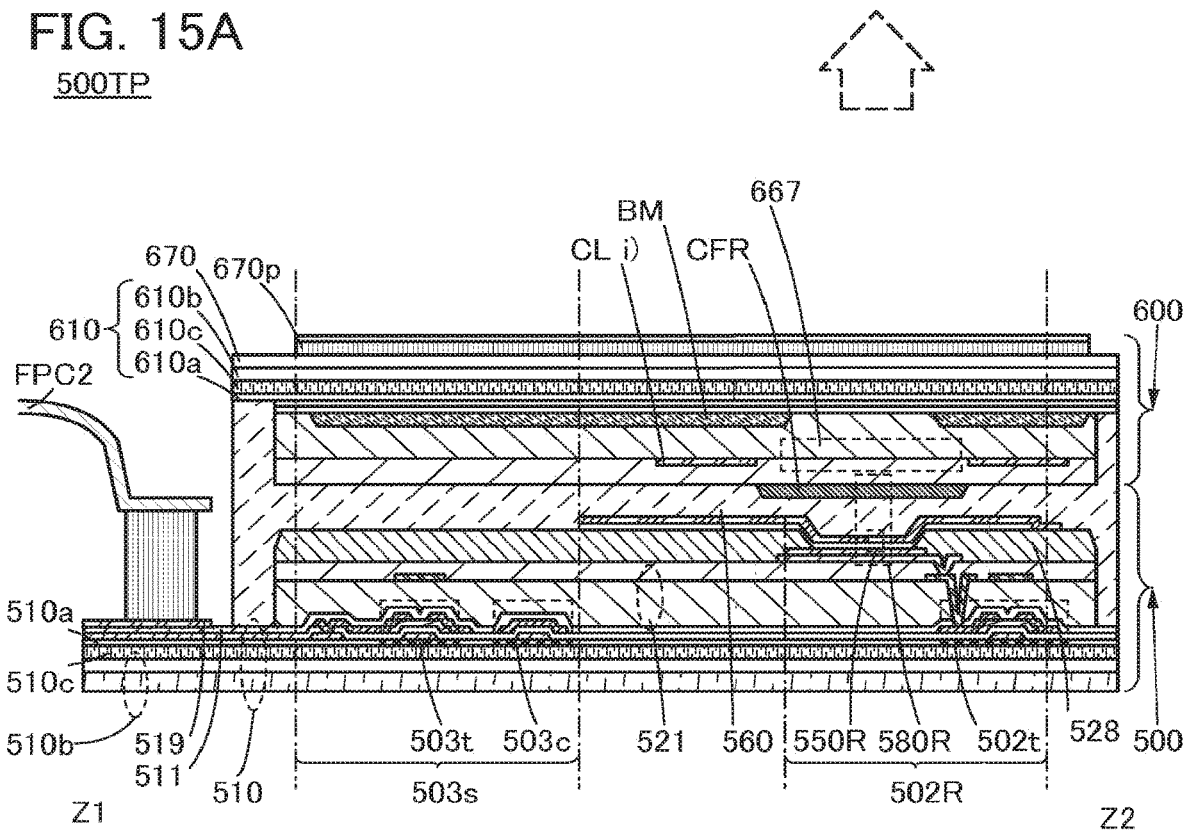
FIGS. 15A to 15C each illustrate an input/output device of one embodiment.
Figure 15B:
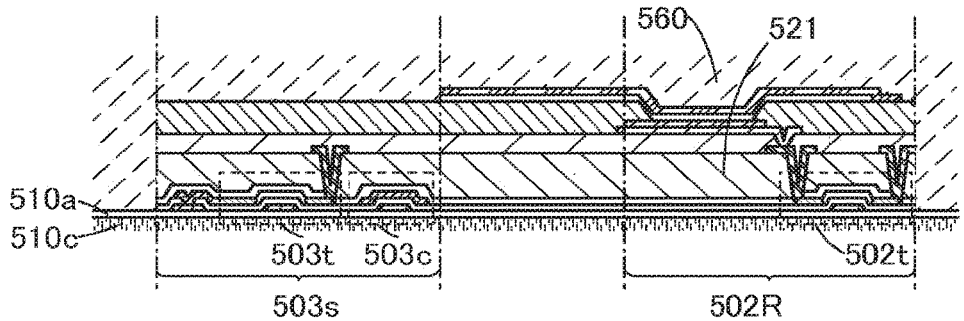
Figure 15C:
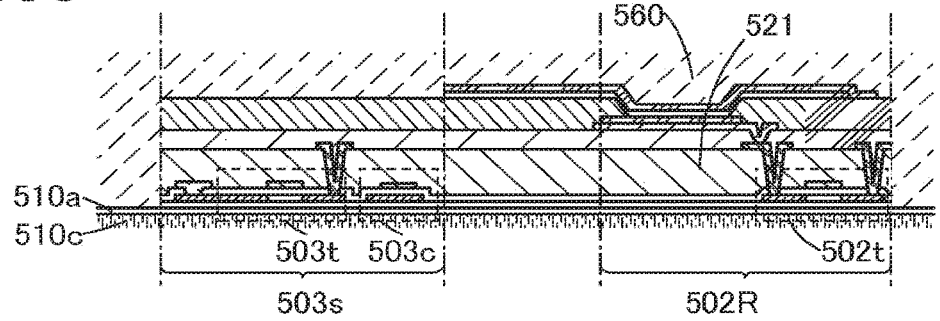

FIG. 15A is a cross-sectional view of a portion of the input/output device 500TP of one embodiment of the present invention in FIG. 14 taken along the line Z1-Z2. FIGS. 15B and 15C are each a cross-sectional view of a structure that can replace part of the structure shown in FIG. 15A.

Figure 24:
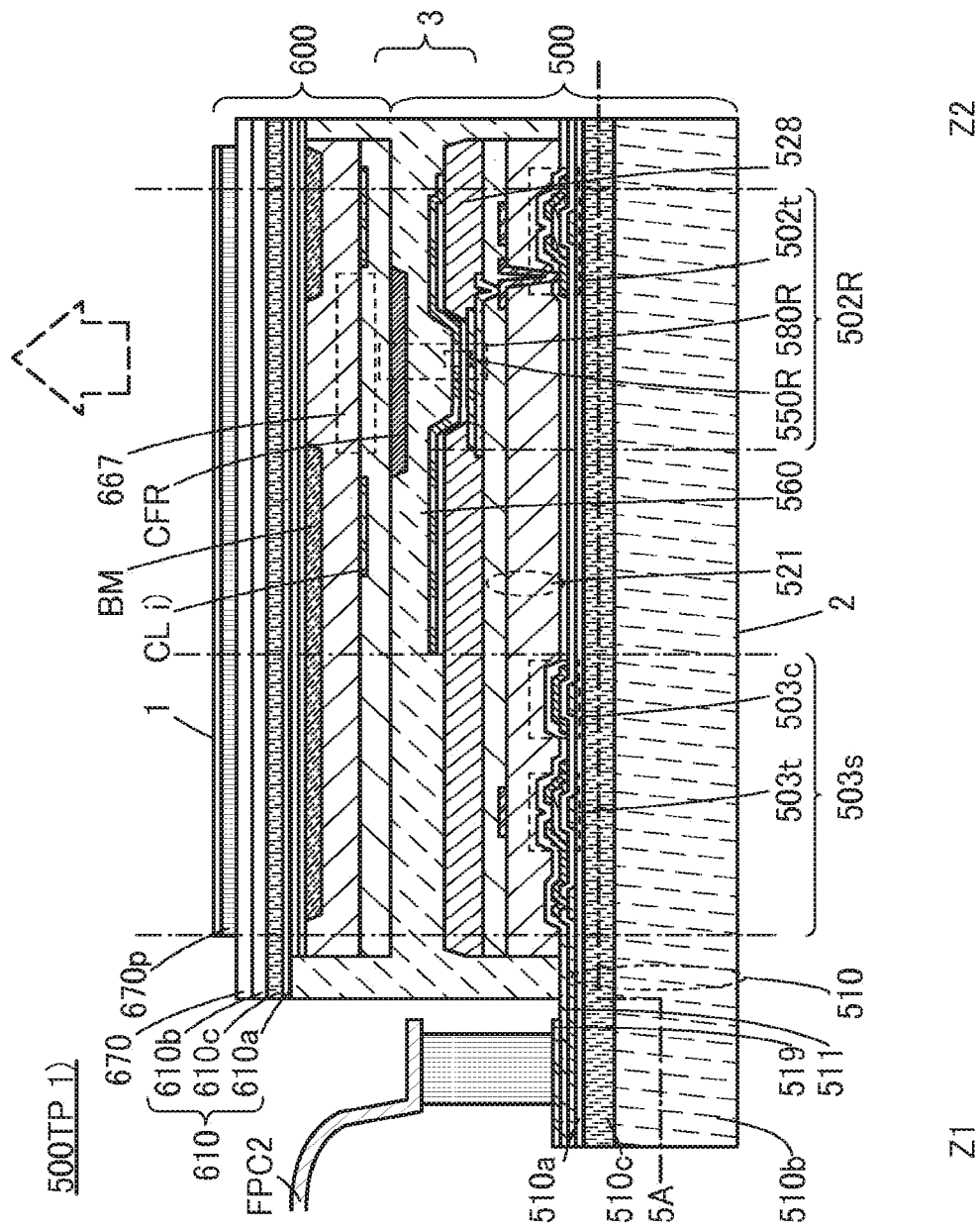
FIG. 24 illustrates an input/output device of one embodiment.

FIG. 24 is a cross-sectional view illustrating the structure of an input/output device 500TP(1) of one embodiment of the present invention, in which part of the structure shown in FIG. 15A is replaced.

Figure 25:
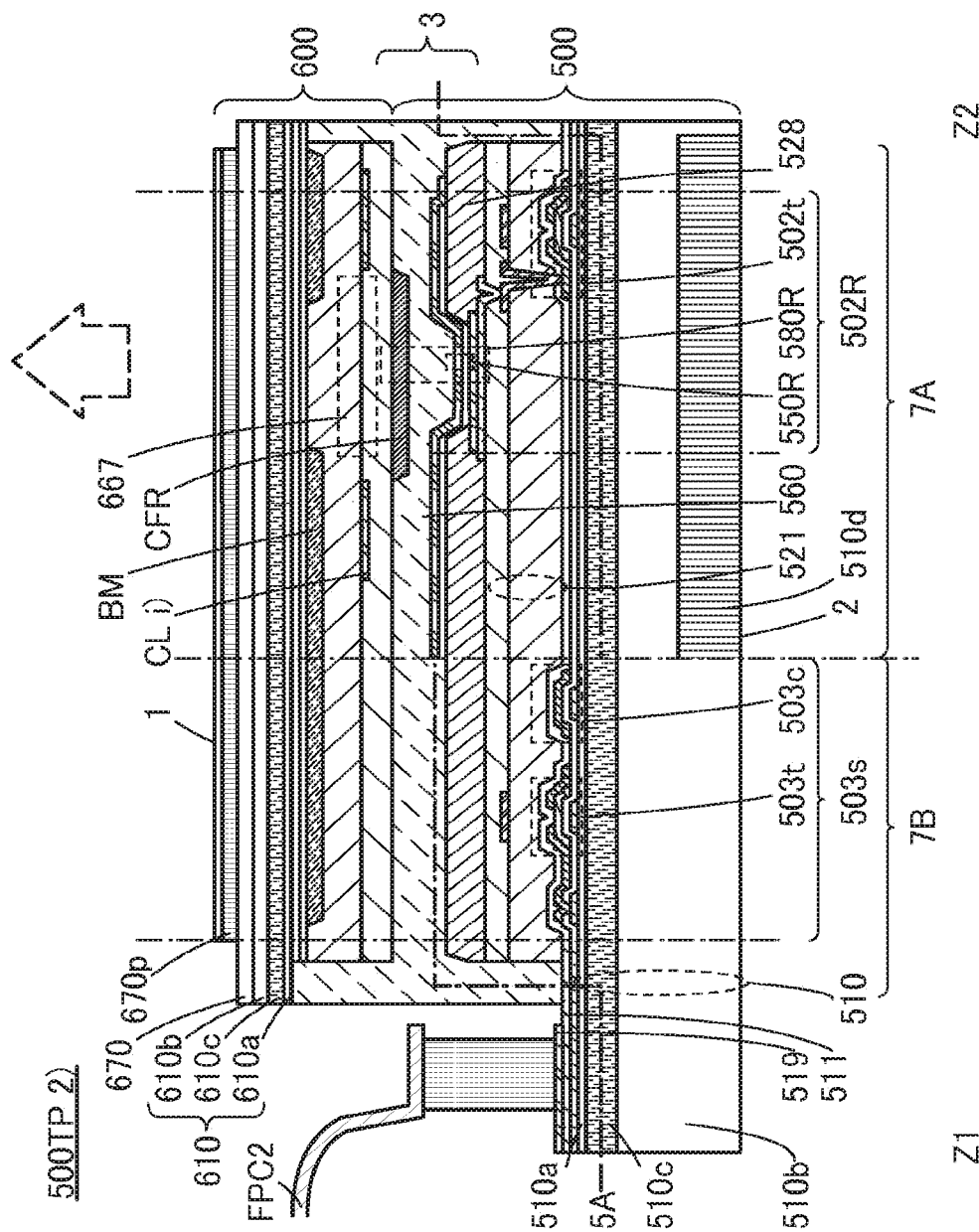
FIG. 25 illustrates an input/output device of one embodiment.

FIG. 25 is a cross-sectional view illustrating the structure of an input/output device 500TP(2) of one embodiment of the present invention, in which part of the structure shown in FIG. 15A is replaced.

FIG. 26 is a cross-sectional view illustrating the structure of an input/output device 500TP(3) of one embodiment of the present invention, in which part of the structure shown in FIG. 15A is replaced.

FIG. 27 is a cross-sectional view illustrating the structure of an input/output device 500TP(4) of one embodiment of the present invention, in which part of the structure shown in FIG. 15A is replaced.

Structural Example 1 of Input/Output Device

The input/output device 500TP described in this embodiment includes a display panel 500 and the sensor panel 600 overlapping with the display panel 500 (see FIG. 14).

The sensor panel 600 can be supplied with a control signal and supply a sensing signal. Further, the sensor panel 600 can be in a folded state with the first plane inside and in an unfolded state.

The sensor panel 600 includes a plurality of control lines including a control line CL(i) supplied with a control signal and extending in the row direction. The sensor panel 600 also includes a plurality of signal lines including a signal line ML(j) extending in the column direction and supplying a sensing signal, in addition, the sensor panel 600 includes a flexible base 610 supporting the control line CL(i) and the signal line ML(j).

The sensor panel 600 includes a first electrode C1($i$) electrically connected to the control line CL(i) and a second electrode C2($j$) electrically connected to the signal line ML(j) and including a portion not overlapping with the first electrode C1($i$).

The base 610 supports the first electrode C1($i$) and the second electrode C2($j$).

The display panel 500 includes the pixel 502.

The first electrode C1(*i*) or the second electrode C2(*j*) includes a net-like conductive film having opening portions 667 at positions overlapping with the pixels 502.

The input/output device 500TP described in this embodiment includes the sensor panel 600 and the display panel 500 that overlaps with the sensor panel 600 and can be folded and unfolded together with the sensor panel 600. The first electrode or the second electrode includes a net-like conductive film having opening portions at positions overlapping with the pixels of the display panel.

The sensor panel 600 of the input/output device 500TP can supply the sensing data together with the positional data, for example.

Specifically, a user of the input/output device 500TP can make various gestures (e.g., tap, drag, swipe, and pinch in) using his/her finger or the like that approaches or is in contact with the sensor panel 600 as a pointer.

The sensor panel 600 is capable of sensing approach or contact of a finger or the like to the sensor panel 600 and supplying sensing data including the obtained position, track, or the like.

An arithmetic unit judges whether or not supplied data satisfies a predetermined condition, and executes instructions associated with a predetermined gesture on the basis of a program or the like.

Thus, a user of the sensor panel 600 can make the predetermined gesture and make the arithmetic unit execute instructions associated with the predetermined gesture.

The display panel 500 of the input/output device 500TP has a function of being supplied with display data V from, for example, the arithmetic unit.

The input/output device 500TP can include the following structures in addition to the above structures.

A flexible printed circuit FPC1 may be electrically connected to the sensor panel 600 of the input/output device 500TP.

A flexible printed circuit FPC2 may be electrically connected to the display panel 500 of the input/output device 500TP.

The display panel 500 can include a driver circuit 503*g* or a driver circuit 503*s*.

The display panel 500 can include a wiring 511 or a terminal 519.

The input/output device 500TP can include a protective layer 670.

The input/output device 500TP can include an anti-reflection layer 670*p* having a region overlapping with the pixel 502.

Individual components included in the input/output device 500TP will be described below. Note that these components cannot be clearly distinguished and one component also serves as another component or include part of another component in some cases.

For example, the sensor panel 600 including the coloring layers overlapping with the plurality of opening portions 667 also serves as a color filter.

Further, for example, the input/output device 500TP in which the sensor panel 600 is provided over the display panel 500 serves as the sensor panel 600 and also the display panel 500. Note that the input/output device 500TP in which the sensor panel 600 is provided over the display panel 500 is also referred to as a touch panel.

<Overall Structure>

The input/output device 500TP described in this embodiment includes the sensor panel 600 or the display panel 500.

An example of a method for manufacturing a stack that can be used for manufacturing the input/output device 500TP will be described in detail in Embodiments 3 to 5.

<<Sensor Panel>>

The sensor panel 600 includes the control line CL(i), the signal line ML(j), or the base 610 (see FIG. 14).

The sensor panel 600 may be formed in such a manner that films for forming the sensor panel 600 are deposited over the base 610 and the films are processed.

Alternatively, the sensor panel 600 may be formed in such a manner that part of the sensor panel 600 is formed over another base, and the part is transferred to the base 610.

The sensor panel 600 senses an object which approaches or touches the sensor panel 600 and supplies a sensing signal. For example, the sensor panel 600 senses changes in capacitance, illuminance, magnetic force, a radio wave, pressure, or the like and supplies data based on the sensed physical quantity. Specifically, a capacitor, a photoelectric conversion element, a magnetic sensor element, a piezoelectric element, a resonator, or the like can be used as a sensor element.

Note that in the air, when a finger or the like whose dielectric constant is larger than that of the air is close to the conductive film, capacitance between the finger and the conductive film is changed. The sensor panel 600 can sense the change in capacitance and supply sensing data. Specifically, a conductive film, a capacitor one electrode of which is connected to the conductive film, and the like can be used.

For example, distribution of charge occurs between the conductive film and the capacitor owing to the change in capacitance, so that the voltage between the pair of electrodes of the capacitor is changed. This voltage change can be used as the sensing signal.

<<Wiring>>

The sensor panel 600 includes wirings. The wirings include the control line CL(i), the signal line ML(j), and the like.

A conductive material can be used for the wirings and the like.

For example, an inorganic conductive material, an organic conductive material, metal, conductive ceramic, or the like can be used for the wiring.

Specifically, a metal element selected from aluminum, gold, platinum, silver, chromium, tantalum, titanium, molybdenum, tungsten, nickel, iron, cobalt, yttrium, zirconium, palladium, and manganese; an alloy including any of the above metal elements; an alloy including any of the above metal elements in combination; or the like can be used for the wiring. In particular, one or more elements selected from aluminum, chromium, copper, tantalum, titanium, molybdenum, and tungsten are preferably included. In particular, an alloy of copper and manganese is suitably used in microfabrication with the use of a wet etching method.

Specifically, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, or the like can be used.

Specifically, an alloy film or a nitride film in which aluminum and one or more elements selected from titanium, tantalum, tungsten, molybdenum, chromium, neodymium, and scandium are combined can be used.

Alternatively, a conductive oxide such as indium oxide, indium tin oxide, indium zinc oxide, zinc oxide, or zinc oxide to which gallium is added can be used.

Alternatively, graphene or graphite can be used. A film including graphene can be formed, for example, by reducing a film containing graphene oxide. As a reducing method, a method using heat, a method using a reducing agent, or the like can be employed.

Alternatively, a conductive macromolecule can be used.

<<Base>>

There is no particular limitation on the base 610 as long as the base 610 has heat resistance high enough to withstand a manufacturing process and a thickness and a size that allow the base 610 to be placed in a manufacturing apparatus. In particular, use of a flexible material as the base 610 enables the sensor panel 600 to be folded or unfolded. Note that in the case where the sensor panel 600 is positioned on a side where the display panel 500 displays an image, a light-transmitting material is used for the base 610.

For the base 610, an organic material, an inorganic material, a composite material of an organic material and an inorganic material, or the like can be used.

For example, an inorganic material such as glass, ceramic, or metal can be used for the base 610.

Specifically, non-alkali glass, soda-lime glass, potash glass, crystal glass, or the like can be used for the base 610.

Specifically, a metal oxide film, a metal nitride film, a metal oxynitride film, or the like can be used for the base 610. For example, silicon oxide, silicon nitride, silicon oxynitride, an alumina film, or the like can be used for the base 610.

For example, an organic material such as a resin, a resin film, or plastic can be used for the base 610.

Specifically, a resin film or resin plate of polyester, polyolefin, polyamide, polyimide, polycarbonate, an acrylic resin, or the like can be used for the base 610.

For example, a composite material such as a resin film to which a thin glass plate or a film of an inorganic material is attached can be used as the base 610.

For example, a composite material formed by dispersing a fibrous or particulate metal, glass, inorganic material, or the like into a resin film can be used as the base 610.

For example, a composite material formed by dispersing a fibrous or particulate resin, organic material, or the like into an inorganic material can be used as the base 610.

A single-layer material or a stacked-layer material in which a plurality of layers are stacked can be used for the base 610. For example, a stacked-layer material including a base material and an insulating layer that prevents the diffusion of impurities contained in the base material can be used for the base 610.

Specifically, a stacked-layer material in which glass and one or a plurality of films that prevent the diffusion of impurities contained in the glass and that are selected from a silicon oxide film, a silicon nitride film, a silicon oxynitride film, and the like are stacked can be used for the base 610.

Alternatively, a stacked-layer material in which a resin and a film that prevents the diffusion of impurities contained in the resin, such as a silicon oxide film, a silicon nitride film, a silicon oxynitride film, and the like are stacked can be used for the base 610.

Specifically, a stack including a base 610*b* having flexibility, a barrier film 610*a* inhibiting the diffusion of impurities, and a resin layer 610*c* attaching the base 610*b* to the barrier film 610*a* can be used (see FIG. 15A).

<<Flexible Printed Circuit>>

The flexible printed circuit FPC1 supplies a timing signal, a power supply potential, and the like, and is supplied with a sensing signal (see FIG. 14).

<<Display Panel>>

The display panel 500 includes the pixel 502, scan lines, signal lines, or the base 510.

The display panel 500 may be formed in such a manner that films for forming the display panel 500 are deposited over the base 510 and the films are processed.

Alternatively, the display panel 500 may also be formed in such a manner that part of the display panel 500 is formed over another base and the part is transferred to the base 510.

<<Pixel>>

The pixel 502 includes a sub-pixel 502B, a sub-pixel 502G, and a sub-pixel 502R, and each sub-pixel includes a display element and a pixel circuit for driving the display element.

<<Circuit>>

An active matrix method in which an active element is included in a pixel or a passive matrix method in which an active element is not included in a pixel can be employed for the display panel 500.

A variety of active elements (non-linear elements) can be used as an active element (a non-linear element) in the active matrix method. For example, a transistor, a metal insulator metal (MIM), a thin film diode (TFD), or the like can be used. Since these elements can be formed with a smaller number of manufacturing steps, manufacturing cost can be reduced or yield can be improved. Alternatively, since the size of the element is small, the aperture ratio can be improved, so that power consumption can be reduced or higher luminance can be achieved.

A passive matrix method in which an active element (a non-linear element) is not used can also be used. Since an active element (a non-linear element) is not used, the manufacturing process can be simplified, whereby manufacturing cost can be reduced or yield can be improved. Alternatively, since an active element (a non-linear element) is not used, the aperture ratio can be improved, so that power consumption can be reduced or higher luminance can be achieved.

A transistor 502*t* can be used in the pixel circuit, for example (see FIG. 15A).

The display panel 500 includes an insulating film 521 covering the transistor 502*t*.

A film that is thicker than the height of unevenness caused by the structure of the pixel circuit can be used as the insulating film 521, whereby the unevenness caused by the pixel circuit can be covered.

A stacked-layer film including a film that can prevent the diffusion of impurities can be used as the insulating film 521, whereby decrease in reliability of the transistor 502*t* or the like due to the diffusion of impurities can be prevented.

<<Display Element>>

A variety of display elements can be used for the display panel 500. For example, display elements (electronic ink) that perform display by an electrophoretic method, an electronic liquid powder (registered trademark) method, an electrowetting method, or the like, MEMS shutter display elements, optical interference type MEMS display elements, and liquid crystal elements can be used.

Furthermore, a display element that can be used for a transmissive liquid crystal display, a transflective liquid crystal display, a reflective liquid crystal display, a direct-view liquid crystal display, or the like can be used.

Organic electroluminescent elements that emit light of different colors may be included in subpixels, for example.

An organic electroluminescent element that emits white light can be used, for example.

A light-emitting element 550R includes a lower electrode, an upper electrode, and a layer containing a light-emitting organic compound between the lower electrode and the upper electrode, for example.

The sub-pixel 502R includes a light-emitting module 580R. The sub-pixel 502R includes the light-emitting element 550S and the pixel circuit that can supply electric power to the light-emitting element 550R and includes a transistor 502t. The light-emitting module 580R includes the light-emitting element 550R and an optical element (e.g., the coloring layer CFR).

Note that to efficiently extract light having a predetermined wavelength, a microresonator structure may be provided in the light-emitting module 580R. Specifically, a layer containing a light-emitting organic compound may be provided between a film that reflects visible light and a film that semi-reflects and semi-transmits visible light so that light of a particular wavelength can be extracted efficiently.

The light-emitting module 580R includes the coloring layer CFR on the light extraction side. The coloring layer transmits light of a particular wavelength and is, for example, the coloring layer CFR that selectively transmits light of red, a coloring layer CFG that selectively transmits light of green, a coloring layer CFB that selectively transmits light of blue, or a coloring layer that selectively transmits light of yellow or the like. Note that other sub-pixels may be provided so as to overlap with the window portions, which are not provided with the coloring layers, so that light from the light-emitting element can be emitted without passing through the coloring layers.

The coloring layer CFR is positioned in a region overlapping with the light-emitting element 550R. Accordingly, part of light emitted from the light-emitting element 550R passes through the coloring layer CFR and is emitted to the outside of the light-emitting module 580R as indicated by an arrow in FIG. 15A.

A light-blocking layer BM is located so as to surround the coloring layer (e.g., the coloring layer CFR).

Note that in the case where a sealant 560 is provided on a side from which light is extracted, the sealant 560 may be in contact with the light-emitting element 550R and the coloring layer CFR.

The lower electrode is provided over the insulating film 521. A partition 528 that includes an opening portion overlapping with the lower electrode is provided. Note that part of the partition 528 overlaps with an end portion of the lower electrode.

The lower electrode and the upper electrode sandwich the layer containing a light-emitting organic compound to constitute the light-emitting element (e.g., the light-emitting element 550R). The pixel circuit supplies power to the light-emitting element.

Over the partition 528, a spacer that controls the gap between the base 610 and the base 510 is provided.

For a transflective liquid crystal display or a reflective liquid crystal display, some of or all of pixel electrodes function as reflective electrodes. For example, some or all of pixel electrodes are formed to contain aluminum, silver, or the like.

A memory circuit such as an SRAM can be provided below the reflective electrodes; whereby power consumption can be reduced. A structure suitable for employed display elements can be selected from among a variety of structures of pixel circuits.

<<Base>>

A flexible material can be used for the base 510. For example, a material which is similar to the material that can be used for the base 610 can be used for the base 510.

Note that in the case where the base 510 need not have a light-transmitting property, for example, a colored material, a material which does not have a light-emitting property, specifically, a resin colored with yellow or the like, SUS, aluminum, or the like, can be used.

A stack in which a flexible base 510b, a barrier film 510a that prevents the diffusion of impurities, and a resin layer 510c that bonds the barrier film 510a to the base 510b are stacked can be favorably used as the base 510, for example (see FIG. 15A).

<<Sealant>>

The sealant 560 bonds the base 610 to the base 510. A material with a refractive index higher than 1.1 can be used for the sealant 560, for example. In the case where light is extracted to the sealant 560 side, the sealant 560 also serves as an optical adhesive layer. For example, a material that can be used for the sealant 560 is a material whose refractive index is higher than that of air, preferably a material whose refractive index is higher than or equal to 1.1, further preferably a material whose refractive index is higher than or equal to 1.2.

Note that the pixel circuits or the light-emitting elements (e.g., the light-emitting element 550R) are provided between the base 510 and the base 610.

<<Structure of Driver Circuit>>

The driver circuit 503g supplies a selection signal. For example, the driver circuit 503g supplies a selection signal to the scan line (see FIG. 14).

The driver circuit 503s may be provided. The driver circuit 503s supplies an image signal.

A shift register, a flip flop circuit, a combination circuit, or the like can be used as the driver circuit 503g or the driver circuit 503s, for example.

A transistor 503t or a capacitor 503c can be included in the driver circuit 503s, for example.

Note that transistors used in the pixel circuit and the driver circuit can be formed in the same process and over the same substrate.

<<Wiring>>

The display panel 500 includes wirings such as scan lines, signal lines, and power supply lines. A variety of conductive films can be used. For example, a material similar to that of the conductive film that can be used in the sensor panel 600 can be used.

The display panel 500 includes a wiring 511 through which a signal can be supplied. The wiring. 511 is provided with a terminal 519. Note that the flexible printed circuit FPC2 through which a signal such as an image signal or a synchronization signal can be supplied is electrically connected to the terminal 519.

Note that a printed wiring board (PWB) may be attached to the flexible printed circuit FPC2.

<<Other Components>>

For example, a ceramic coat layer or a hard coat layer can be used as the protective layer 670. Specifically, a layer containing aluminum oxide or a layer containing a UV curable resin can be used. With such a protective layer, a scratch can be prevented from being made and the input/output device 500TP can be protected.

A circularly polarizing plate, for example, can be used as the anti-reflection layer 670p, whereby the intensity of outside light reflected by the input/output device 500TP can be reduced.

Modification Example of Input/Output Device

A variety of transistors can be used for the sensor panel 600 and/or the display panel 500.

A structure of the case in which bottom-gate transistors are included in the display panel 500 is illustrated in FIGS. 15A and 15B.

A semiconductor layer containing an oxide semiconductor, amorphous silicon, or the like, for example, can be used in the transistor 502t and the transistor 503t illustrated in FIG. 15A.

For example, a semiconductor layer containing polycrystalline silicon that is obtained by crystallization process such as laser annealing can be used in the transistor 502t and the transistor 503t illustrated in FIG. 15B.

A structure of the case in which top-gate transistors are included in the display panel 500 is illustrated in FIG. 15C.

A semiconductor layer containing polycrystalline silicon, a single crystal silicon film that is transferred from a single crystal silicon substrate, or the like, for example, can be used in the transistor 502t and the transistor 503t illustrated in FIG. 15C.

Structural Example 2 of Input/Output Device

The structure of the input/output device 500TP(1) of one embodiment of the present invention will be described with reference to FIG. 24.

The input/output device 500TP(1) includes a surface of a sensor panel 600, which corresponds to a first plane 1, a surface of a display panel 500, which corresponds to a second plane 2 that is opposite the first plane 1, a neutral plane 5A in a region between the first plane 1 and the second plane 2, a functional layer 3 at least a portion of which is in a region between the first plane 1 and the neutral plane 5A, and a support (a base 510 and a base 610) that supports the functional layer 3.

The functional layer 3 including a subpixel 502R is between the neutral plane 5A and the first plane 1.

A material having a higher rigidity than a base 610b is used for a base 510b, for example, whereby the neutral plane 5A can be closer to the base 510b. Then, the functional layer 3 including the subpixel 502R can be provided between the neutral plane 5A and the first plane 1.

Structural Example 3 of Input/Output Device

The structure of the input/output device 500TP(2) of one embodiment of the present invention will be described with reference to FIG. 25.

The input/output device 500TP(2) includes a first region 7A that overlaps with a portion of the functional layer 3 and a second region 7B adjacent to the first region 7A. A support includes a base 510d in a region between a second plane 2 in the first region 7A and the functional layer 3 and a base 510b in a region between the second plane 2 in the second region 7B and the functional layer 3. The base 510d has a higher rigidity than the base 510b.

Structural Example 4 of Input/Output Device

The structure of the input/output device 500TP(3) of one embodiment of the present invention will be described with reference to FIG. 26.

The input/output device 500TP(3) includes a first plane 1, a second plane 2 that is opposite the first plane 1, a middle plane 5C located in the middle of a region between the first plane 1 and the second plane 2, a functional layer 3 at least a portion of which is in a region between the first plane 1 and the middle plane 5C, and a support (a base 510 and a base 610) that supports the functional layer 3.

The functional layer 3 including a subpixel 502R is between the middle plane 5C and the first plane 1.

A portion of the input/output device 500TP(3) in a region between the first plane 1 and the middle plane 5C has a rigidity approximately equal to that of a portion of the input/output device 500TP(3) in a region between the second plane 2 and the middle plane 5C.

Structural Example 5 of Input/Output Device

The structure of the input/output device 500TP(4) of one embodiment of the present invention will be described with reference to FIG. 27.

The input/output device 500TP(4) includes a first region 7A that overlaps with a portion of a functional layer 3 and a second region 7B adjacent to the first region 7A. A support includes a base 510d in a region between a second plane 2 in the first region 7A and the functional layer 3 and a base 510b in a region between the second plane 2 in the second region 7B and the functional layer 3. The base 510d is thicker than the base 510b.

Structural Example 6 of Input/Output Device

The structure of an electrode that can be included in the sensor panel 600 of the input/output device 500TP of one embodiment of the present invention will be described with reference to FIGS. 18A to 18D, FIGS. 19A to 19D, FIGS. 20A to 20C, and FIGS. 21A to 21F. Specifically, the structure of an electrode that can be used as the first electrode C1(i) or the second electrode C2(j) will be described.

Figure 18A:
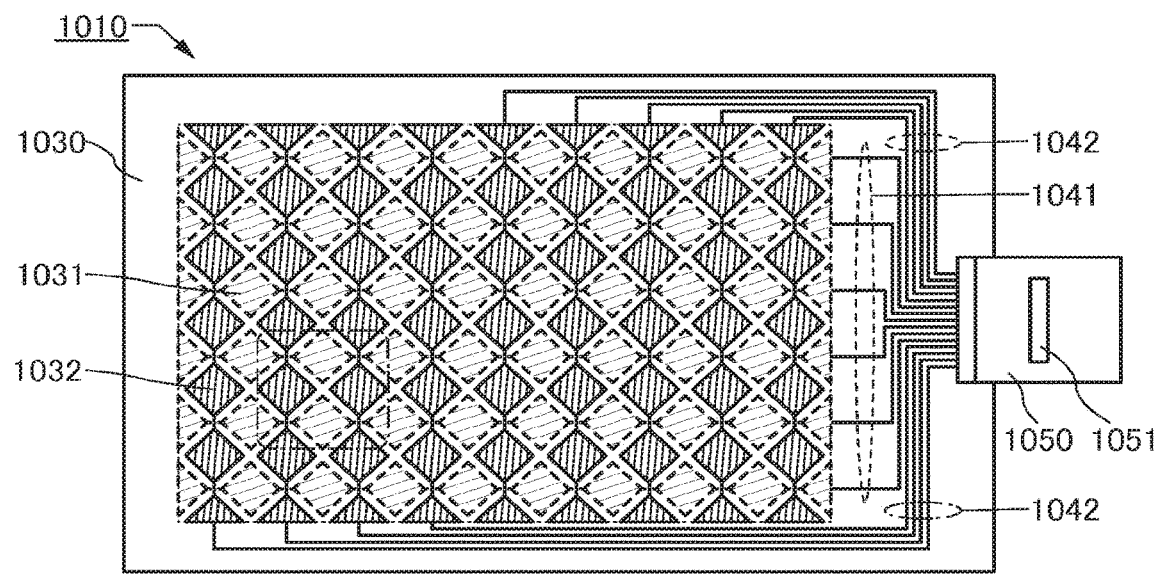
FIGS. 18A to 18D illustrates structures of a sensor panel of one embodiment.

FIG. 18A is a schematic top view of a sensor panel 1010. The sensor panel 1010 includes a plurality of electrodes 1031, a plurality of electrodes 1032, a plurality of wirings 1041, and a plurality of wirings 1042 over a substrate 1030. The substrate 1030 is provided with a flexible printed circuit (FPC) 1050 which is electrically connected to each of the plurality of wirings 1041 and the plurality of wirings 1042. FIG. 18A illustrates an example in which the FPC 1050 is provided with an IC 1051.

Figure 18B:
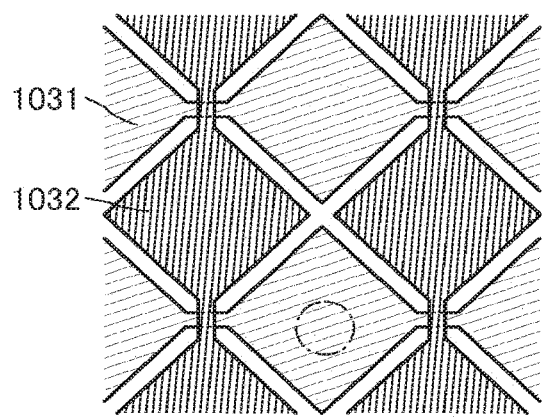

FIG. 18B shows an enlarged view of a region surrounded by a dashed dotted line in FIG. 18A. The electrodes 1031 are in the form of a series of rhombic electrode patterns aligned in a lateral direction in this figure. The rhombic electrode patterns aligned in a line are electrically connected to each other. The electrodes 1032 are also in the form of a series of rhombic electrode patterns aligned in a longitudinal direction in this figure and the rhombic electrode patterns aligned in a line are electrically connected to each other. Park of the electrode 1031 and part of the electrode 1032 overlap and intersect with each other. At this intersection portion, an insulator is sandwiched in order to avoid an electrical short-circuit between the electrode 1031 and the electrode 1032.

Figure 18C:
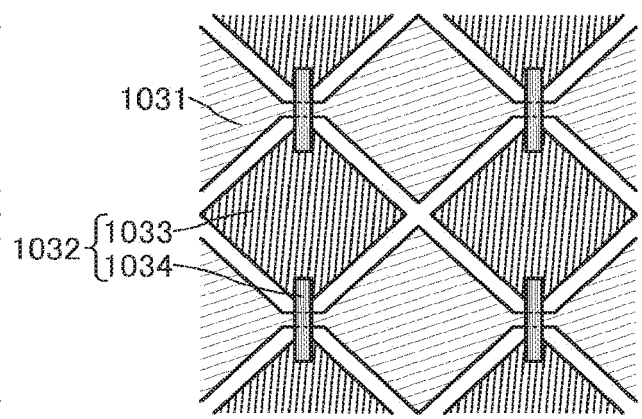

As shown in FIG. 18C, the electrodes 1032 may include a plurality of rhombic electrodes 1033 and bridge electrodes 1034. The electrodes 1033 are aligned in a longitudinal direction in this figure, and two adjacent electrodes 1033 are electrically connected to each other by the bridge electrode 1034. Such a structure allows the electrodes 1033 and the electrodes 1031 to be formed at the same time by processing the same conductive film. This can prevent variations in the thickness of these films, and can prevent the resistance value and the light transmittance of each electrode from varying from place to place. Note that although the electrodes 1032 include the bridge electrodes 1034 here, the electrodes 1031 may have such a structure.

Figure 18D:
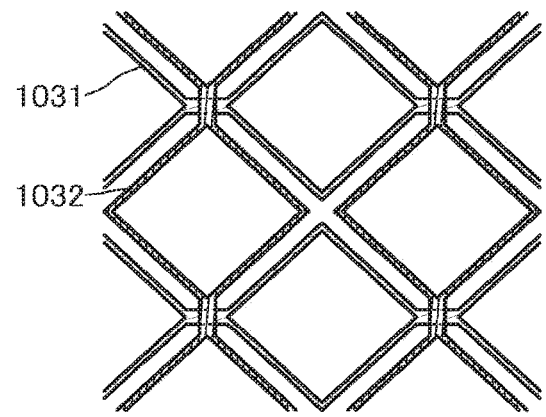

As shown in FIG. 18D, a design in which rhombic electrode patterns of the electrodes 1031 and 1032 shown in FIG. 18B are hollowed out and only edge portions are left may be used. At that time, when the electrodes 1031 and the electrodes 1032 are too small in width for the users to see, the electrodes 1031 and the electrodes 1032 can be formed using a light-blocking material such as a metal or an alloy, as described later. In addition, either the electrodes 1031 or the electrodes 1032 shown in FIG. 18D may include the above bridge electrodes 1034.

One of the electrodes 1031 is electrically connected to one of the wirings 1041. One of the electrodes 1032 is electrically connected to one of the wirings 1042. Here, either one of the electrode 1031 and the electrode 1032 corresponds to a row wiring, and the other corresponds to a column wiring.

A signal output from the IC 1051 is supplied to either of the electrodes 1031 and the electrodes 1032 through the wirings 1041 or the wirings 1042. Current (or a potential) flowing through either of the electrodes 1031 and the electrodes 1032 is input to the IC 1051 through the wirings 1041 or the wirings 1042.

When a touch panel is formed in such a manner that the sensor panel 1010 is stacked over a display surface of the display panel, a light-transmitting conductive material is preferably used for the electrodes 1031 and the electrodes 1032. In the case where a light-transmitting conductive material is used for the electrodes 1031 and the electrodes 1032 and light from the display panel is extracted through the electrodes 1031 or the electrodes 1032, it is preferable that a conductive film containing the same conductive material be arranged between the electrodes 1031 and the electrodes 1032 as a dummy pattern. When part of a space between the electrodes 1031 and the electrodes 1032 is filled with the dummy pattern in this manner, variation in light transmittance can be reduced. As a result, unevenness in luminance of light transmitted through the sensor panel 1010 can be reduced.

As a light-transmitting conductive material, a conductive oxide such as indium oxide, indium tin oxide, indium zinc oxide, zinc oxide, or zinc oxide to which gallium is added can be used. Note that a film including graphene may be used as well. The film including graphene can be formed, for example, by reducing a film containing graphene oxide. As a reducing method, a method with application of heat or the like can be employed.

Further, a metal film or an alloy film which is thin enough to have a light-transmitting property can be used. For example, a metal material such as gold, silver, platinum, magnesium, nickel, tungsten, chromium, molybdenum, iron, cobalt, copper, palladium, or titanium, or an alloy material containing any of these metal materials can be used. Alternatively, a nitride of the metal material or the alloy material (e.g., titanium nitride), or the like may be used. Alternatively, a stacked film in which two or more of conductive films containing the above materials are stacked may be used.

For the electrodes 1031 and the electrodes 1032, a conductive film that is processed to be thin enough to be invisible to the users may be used. Such a conductive film is processed into a lattice shape (a mesh shape), for example, which makes it possible to achieve both high conductivity and better viewability of the display device. It is preferable that the conductive film have a portion in which the width is greater than or equal to 30 nm and less than or equal to 100 μm, preferably greater than or equal to 50 nm and less than or equal to 50 μm, and further preferably greater than or equal to 50 nm and less than or equal to 20 μm. In particular, the conductive film having the pattern width of 10 μm or less is extremely difficult to be seen by the users, which is preferable.

Figure 19A:
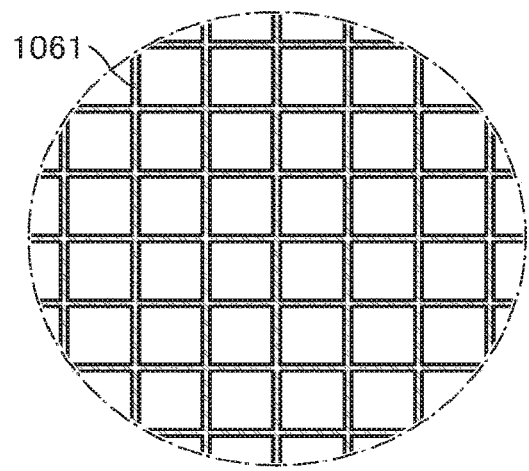
FIGS. 19A to 19D each illustrate a structure of an electrode of a sensor panel of one embodiment.

As examples, enlarged schematic views of part of the electrodes 1031 or the electrodes 1032 are shown in FIGS. 19A to 19D. FIG. 19A shows an example in which a lattice-shape conductive film 1061 is used. The conductive film 1061 is preferably placed so as not to overlap with the display element included in the display device because light from the display device is not blocked. In that case, it is preferable that the direction of the lattice be the same as the direction of the display element arrangement and that the pitch of the lattice be an integer multiple of the pitch of the display element arrangement.

Figure 19B:
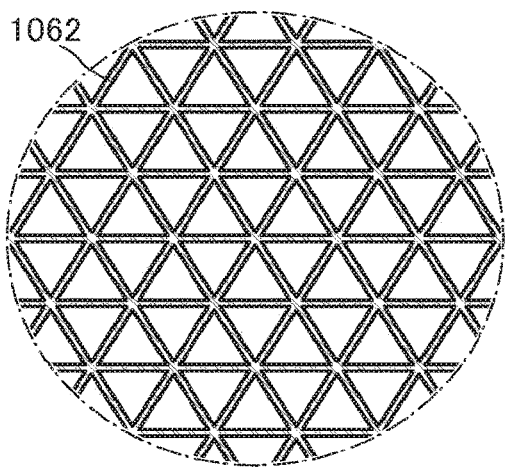

FIG. 19B shows an example of a lattice-shape conductive film 1062, which is processed so as to be provided with triangle openings. Such a structure makes it possible to further reduce the resistance compared with the structure shown in FIG. 19A.

Figure 19C:
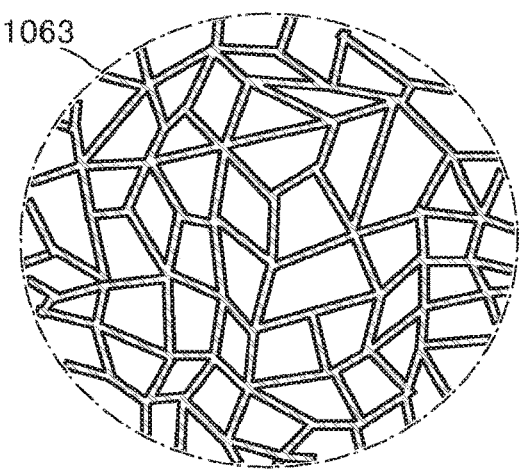

In addition, a conductive film 1063, which has an irregular pattern shape, may be used as shown in FIG. 19C. Such a structure can prevent generation of moire when overlapping with the display portion of the display device.

Figure 19D:
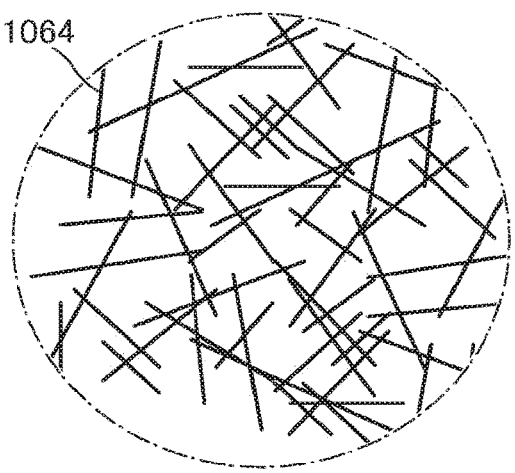

Conductive nanowires may be used for the electrodes 1031 and the electrodes 1032. FIG. 19D shows an example in which nanowires 1064 are used. The nanowires 1064 are dispersed at appropriate density so that adjacent nanowires are in contact with each other, which can form a two-dimensional network; therefore, a conductive film with extremely high light-transmitting property can be provided. For example, a nanowire which has a mean value of the diameters of greater than or equal to 1 nm and less than or equal to 100 nm, preferably greater than or equal to 5 nm and less than or equal to 50 nm, further preferably greater than or equal to 5 nm and less than or equal to 25 nm can be used. As the nanowire 1064, a metal nanowire such as an Ag nanowire, a Cu nanowire, and an Al nanowire, a carbon nanotube, or the like can be used. When using an Ag nanowire, for example, light transmittance of greater than or equal to 89% and a sheet resistance of greater than or equal to 40 ohm/square and less than or equal to 100 ohm/square can be achieved.

Although examples in which a plurality of rhombuses are aligned in one direction are shown in FIG. 18A and the like as top surface shapes of the electrodes 1031 and the electrodes 1032, the shapes of the electrodes 1031 and the electrodes 1032 are not limited thereto and can have various top surface shapes such as a belt shape (a rectangular shape), a belt shape having a curve, and a zigzag shape. In addition, although the above shows the electrodes 1031 and the electrodes 1032 that are arranged to be perpendicular to each other, they are not necessarily arranged to be perpendicular and the angle formed by two of the electrodes may be less than 90°.

FIGS. 20A to 20C illustrate examples in which electrodes 1036 and electrodes 1037, which have a top surface shape of thin lines, are used instead of the electrodes 1031 and the electrodes 1032. FIG. 20A shows an example in which linear electrodes 1036 and 1037 are arranged to form a lattice shape.

FIG. 20B shows an example in which the electrodes 1036 and the electrodes 1037 have a top surface shape of a zigzag shape. As shown in FIG. 20B, the electrodes 1036 and the electrodes 1037 are arranged so as not to cross the straight-line portions at the centers but so as to place the centers of the straight-line portions in different positions from each other; therefore, the length of closely facing parallel parts of the electrodes 1036 and the electrodes 1037 can be longer, mutual capacitance between the electrodes is increased, and the detection sensitivity is improved, which is preferable. Alternatively, as shown in FIG. 20C, the electrodes 1036 and the electrodes 1037 are arranged so as to have a design in which part of the straight-line portion of a zigzag shape is projected, which can increase the mutual capacitance between the electrodes because the length of the parts facing each other can be longer even when the centers of the straight-line portions are placed in the same position.

Figure 21A:
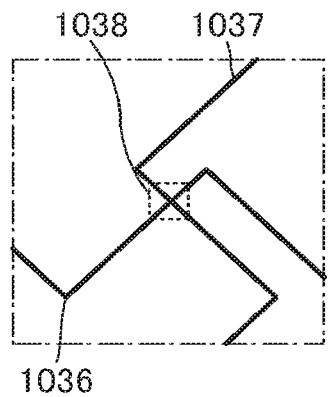
FIGS. 21A to 21F each illustrate structures of electrodes of a sensor panel of one embodiment.
Figure 21B:
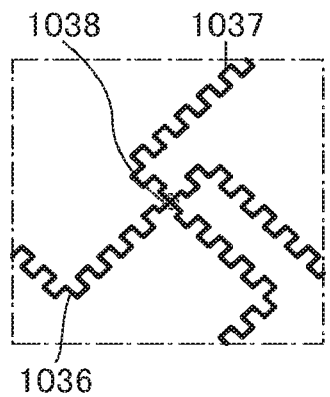
Figure 21C:
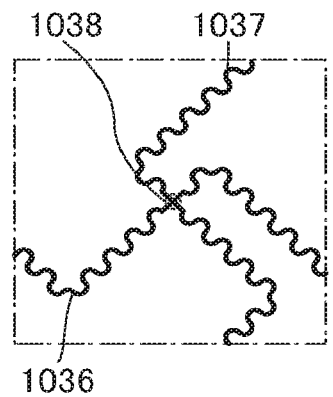
Figure 21D:
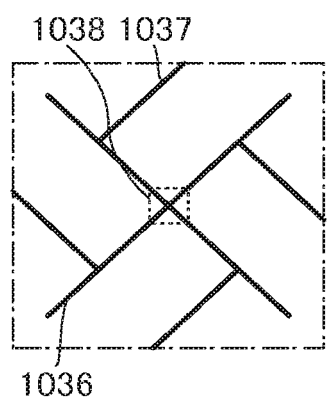
Figure 21E:
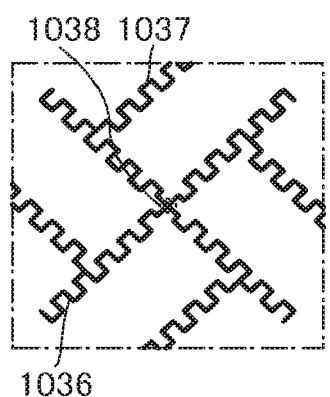
Figure 21F:
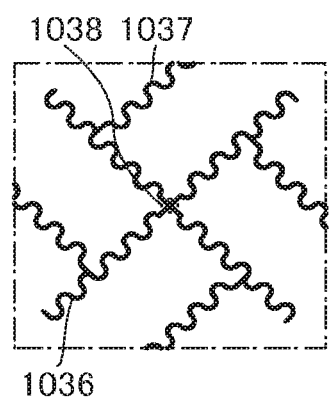

FIGS. 21A to 21C show enlarged views of a region surrounded by a dashed dotted line in FIG. 20B, and FIGS. 21D to 21F show enlarged views of a region surrounded by a dashed dotted line in FIG. 20C. In these drawings, the electrodes 1036, the electrodes 1037, and intersection portions 1038 at which the electrodes 1036 and the electrodes 1037 intersect are illustrated. The straight-line portions of the electrodes 1036 and the electrodes 1037 shown in FIGS. 21A and 21D may have a serpentine shape that meanders with angled corners as shown in FIGS. 21B and 21E or may have a serpentine shape that continuously meanders as shown in FIGS. 21C and 21F.

Structural Example 7 of Input/Output Device

A structure that can be used for the sensor panel 600 of the input/output device 500TP of one embodiment of the present invention will be described with reference to FIGS. 22A and 22B and FIGS. 23A and 23B. Specifically, the structure of an in-cell touch panel in which liquid crystal elements instead of light-emitting elements are used as display elements will be described.

Figure 22A:
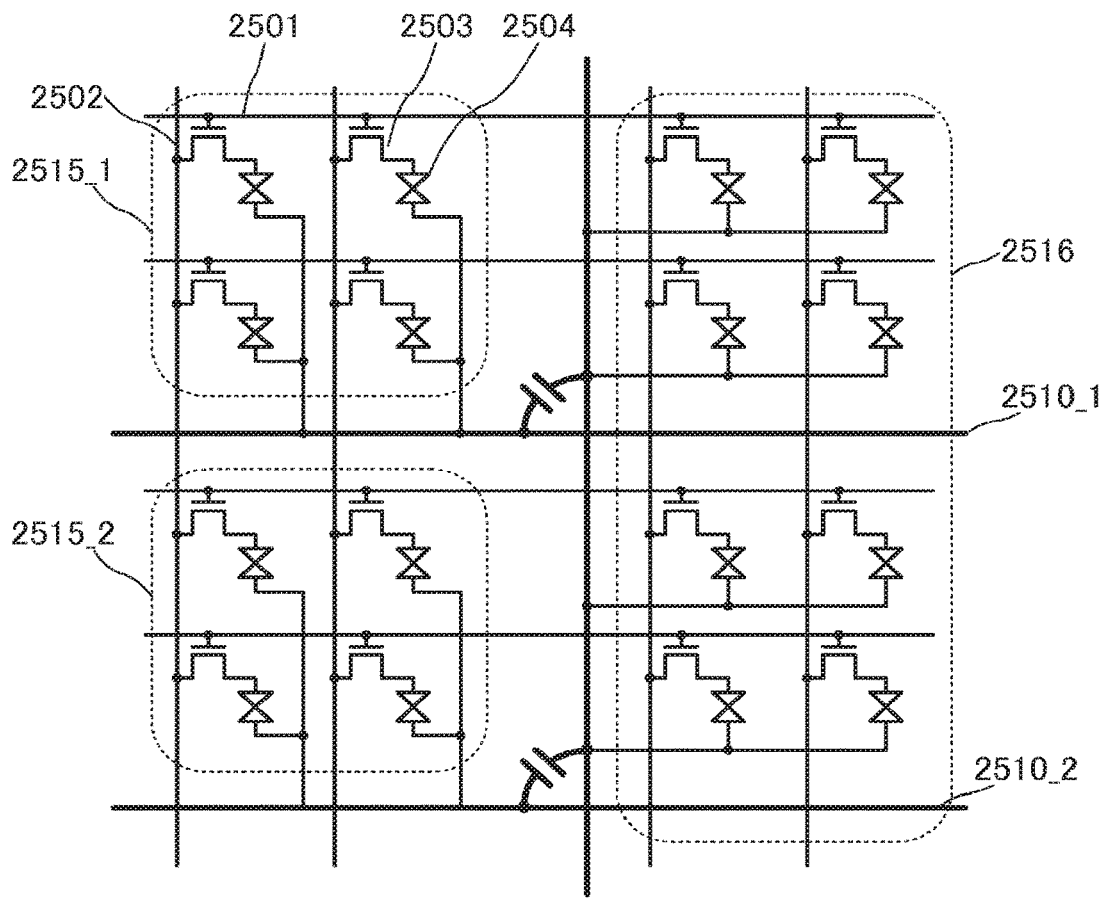
FIGS. 22A and 22B each illustrate a structure of a display panel of one embodiment.

FIG. 22A is an equivalent circuit diagram of part of a pixel circuit provided in the display portion of the touch panel described in this structural example.

Each pixel includes at least a transistor 2503 and a liquid crystal element 2504. In addition, a gate of the transistor 2503 is electrically connected to a wiring 2501 and one of a source and a drain of the transistor 2503 is electrically connected to a wiring 2502.

The pixel circuit includes a plurality of wirings extending in the X direction (e.g., a wiring 2510_1 and a wiring 2510_2) and a plurality of wirings extending in the Y direction (e.g., wirings 2511). These wirings are provided to intersect with each other, and capacitance is formed therebetween.

Among the pixels provided in the pixel circuit, ones of electrodes of the liquid crystal elements of some pixels adjacent to each other are electrically connected to each other to form one block. The block is classified into two types: an island-shaped block (e.g., a block 2515_1 or a block 2515_2) and a linear block (e.g., a block 2516) extending in the Y direction. Note that only part of the pixel circuit is illustrated in FIGS. 22A and 22B, and actually, these two kinds of blocks are repeatedly arranged in the X direction and the Y direction.

The wiring 2510_1 (or 2510_2) extending in the X direction is electrically connected to the island-shaped block 2515_1 (or the block 2515_2). Although not illustrated, the wiring 2510_1 extending in the X direction is electrically connected to a plurality of island-shaped blocks 2515_1 which are provided discontinuously along the X direction with the linear blocks therebetween. Further, the wiring 2511 extending in the Y direction is electrically connected to the linear block 2516.

Figure 22B:
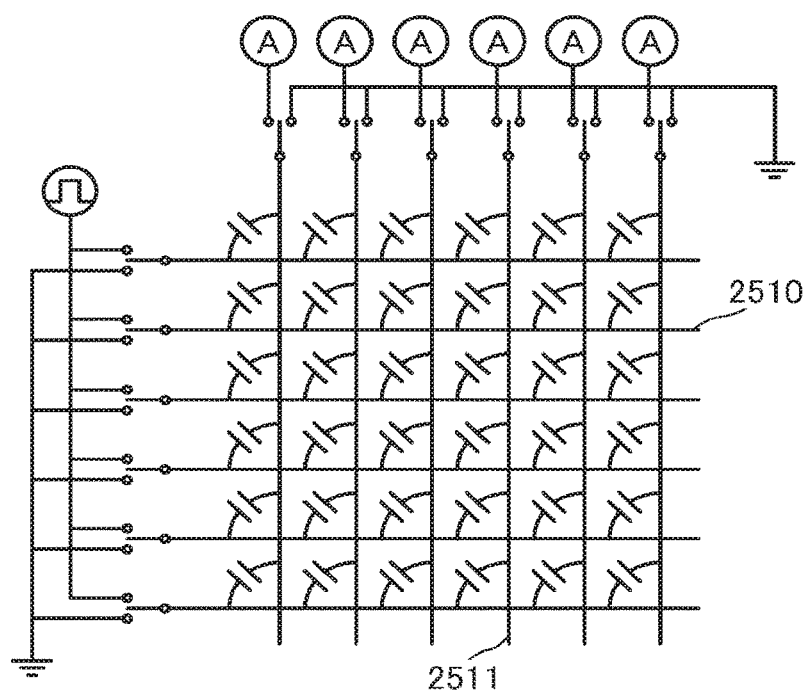

FIG. 22B is an equivalent circuit diagram illustrating the connection between a plurality of wirings 2510 extending in the X direction and the plurality of wirings 2511 extending in the Y direction. Input voltage or a common potential can be input to each of the wirings 2510 extending in the X direction. Further, a ground potential can be input to each of the wirings 2511 extending in the Y direction, or the wirings 2511 can be electrically connected to the detection circuit.

Operation of the above-described touchscreen will be described with reference to FIGS. 23A and 23B.

Here, one frame period is divided into a writing period and a detecting period.

The writing period is a period in which image data is written to a pixel, and the wirings 2510 (also referred to as gate lines) are sequentially selected. The detecting period is a period in which sensing is performed by a touch sensor, and the wirings 2510 extending in the X direction are sequentially selected and input voltage is input.

Figure 23A:
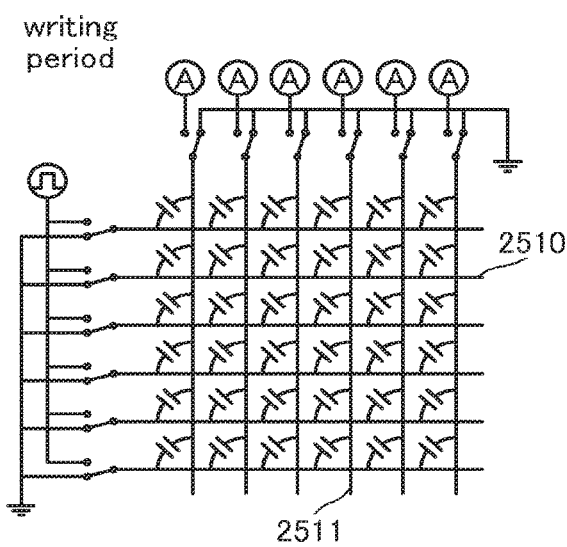
FIGS. 23A and 23B each illustrate a structure of a display panel of one embodiment.

FIG. 23A is an equivalent circuit diagram in the writing period. In the writing period, a common potential is input to both the wiring 2510 extending in the X direction and the wiring 2511 extending in the Y direction.

Figure 23B:
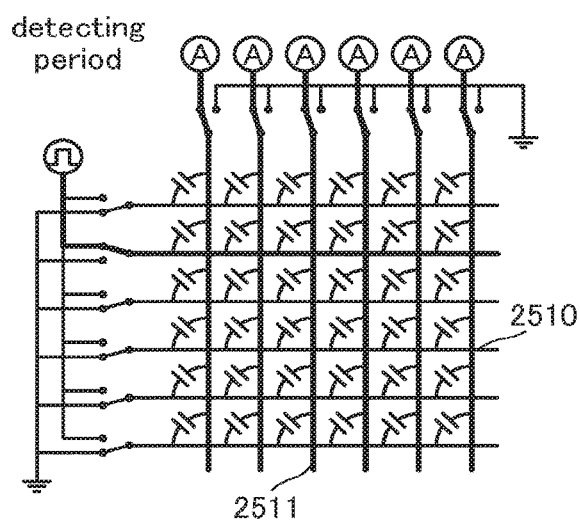

FIG. 23B is an equivalent circuit diagram at some point in time in the detecting period. In the detecting period, each of the wirings 2511 extending in the Y direction is electrically connected to the detection circuit. Input voltage is input to the wirings 2510 extending in the X direction which are selected, and a common potential is input to the wirings 2510 extending in the X direction which are not selected.

It is preferable that a period in which an image is written and a period in which sensing is performed by a touch sensor be separately provided as described above. Thus, a decrease in sensitivity of the touch sensor caused by noise generated when data is written to a pixel can be suppressed.

This embodiment can be combined with any of the other embodiments in this specification as appropriate.

Embodiment 71

In this embodiment, a structure of a data processor of one embodiment of the present invention will be described with reference to FIGS. 16A-1 to 16A-3, 16B-1 and 16B-2, and 16C-1 and 16C-2.

FIGS. 16A-1 to 16C-2 illustrate the data processors each of which is one embodiment of the present invention.

Figures 1, 16A:
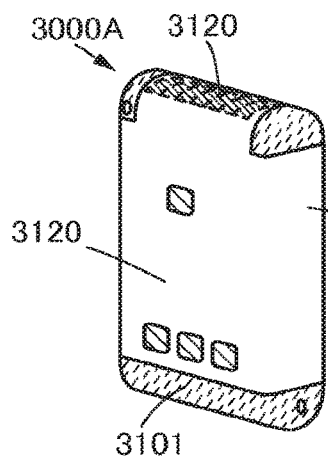
Figures 2, 16A:
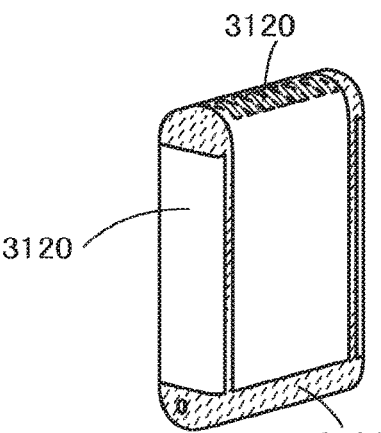
Figures 3, 16A:
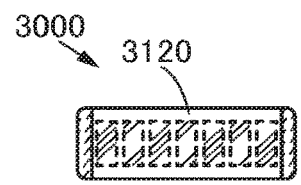

FIGS. 16A-1 to 16A-3 are projection views of a data processor of one embodiment of the present invention.

Figures 1, 16B:
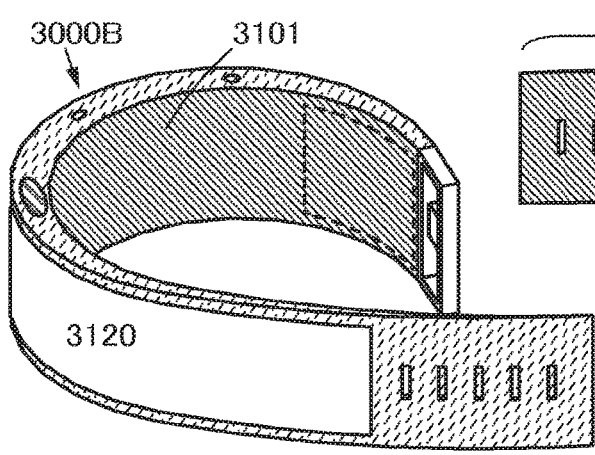
Figures 2, 16B:
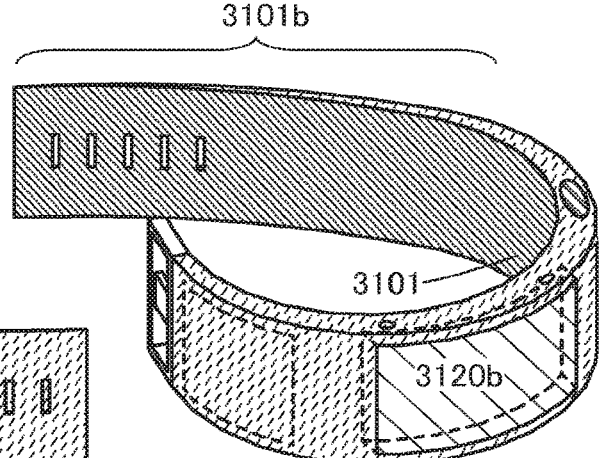

FIGS. 16B-1 and 16B-2 are projection views of a data processor of one embodiment of the present invention.

Figures 1, 16C:
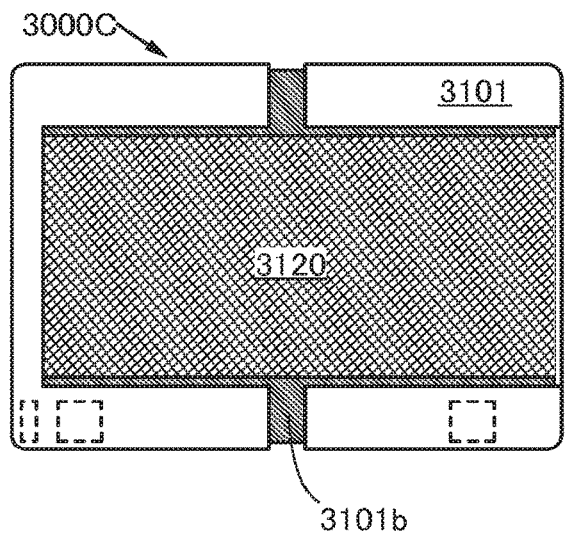
Figures 2, 16C:
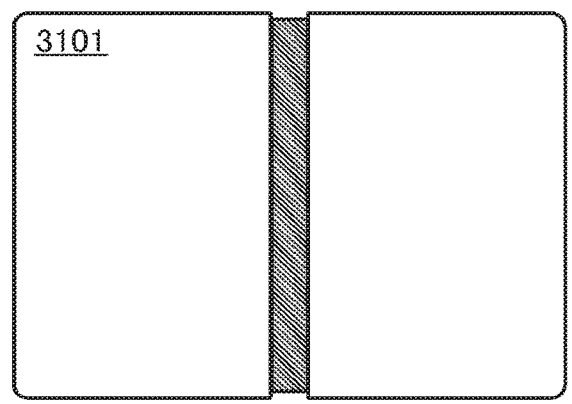

FIGS. 16C-1 and 16C-2 are a top view and a bottom view of a data processor of one embodiment of the present invention.

<<Data Processor A>>

A data processor 3000A includes an input/output portion 3120 and a housing 3101 supporting the input/output portion 3120 (see FIGS. 16A-1 to 16A-3).

The data processor 3000A further includes an arithmetic unit, a memory unit that stores a program to be executed by the arithmetic unit, and a power source such as a battery supplying power for driving the arithmetic unit.

Note that the housing 3101 houses the arithmetic unit, the memory unit, the battery, and the like.

The data processor 3000A can display information on its side surface and/or top surface.

A user of the data processor 3000A can supply operation instructions by using a finger in contact with the side surface and/or the top surface.

<<Data Processor B>>

A data processor 3000B includes an input/output portion 3120 and an input/output portion 3120b (see FIGS. 169-1 and 16B-2).

The data processor 3000B further includes a housing 3101 and a belt-shaped flexible housing 3101b that support the input/output portion 3120.

The data processor 3000B further includes the housing 3101 supporting the input/output portion 3120b.

The data processor 3000B further includes an arithmetic unit, a memory unit that stores a program to be executed by the arithmetic unit, and a power source such as a battery supplying power for driving the arithmetic unit.

Note that the housing 3101 houses the arithmetic unit, the memory unit, the battery, and the like.

The data processor 3000B can display information on the input/output portion 3120 supported by the housing 3101 and the belt-shaped flexible housing 3101b.

A user of the data processor 3000B can supply operation instructions by using a finger in contact with the input/output portion 3120.

<<Data Processor C>>

A data processor 3000C includes an input/output portion 3120 and housings 3101 and 3101b supporting the input/output portion 3120 (see FIGS. 16C-1 and 16C-2).

The input/output portion 3120 and the housing 3101b have flexibility.

The data processor 3000C further includes an arithmetic unit, a memory unit that stores a program to be executed by the arithmetic unit, and a power source such as a battery supplying power for driving the arithmetic unit.

Note that the housing 3101 houses the arithmetic unit, the memory unit, the battery, and the like.

The data processor 3000C can be folded in two at a portion of the housing 3101b.

This embodiment can be combined with any of the other embodiments in this specification as appropriate.

Example

In this example, the structures of the functional panels and the device which were fabricated as embodiments of the present invention and the characteristics of the functional panels will be described with reference to FIGS. 17A to 17D.

FIGS. 17A to 17D illustrate the structures of the functional panels and the device which are embodiments of the present invention.

Figure 17A:
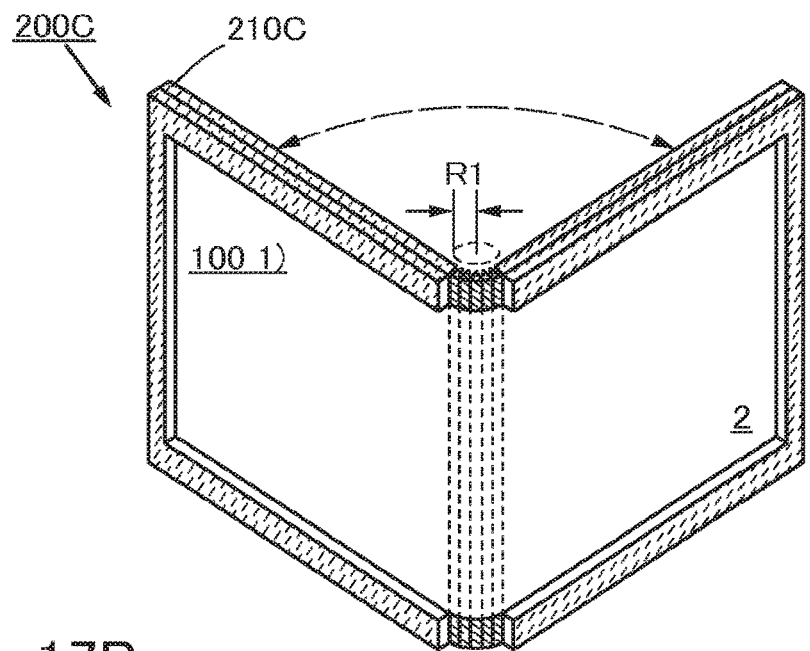
FIGS. 17A to 17D illustrate structures of a device and functional panels of examples.

FIG. 17A is a projection view schematically illustrating the structure of a device 200C.

Figure 17B:
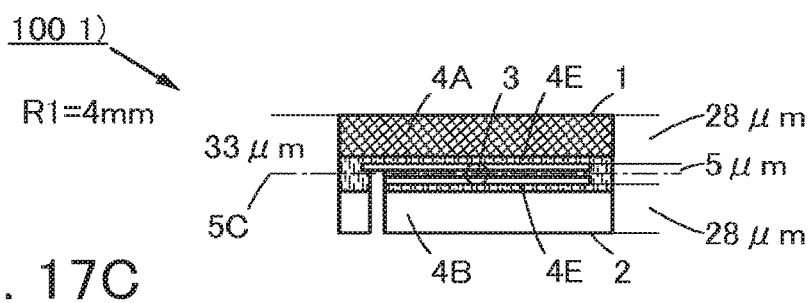

FIG. 17B is a cross-sectional view illustrating the structure of a functional panel 100(1) that was fabricated.

Figure 17C:
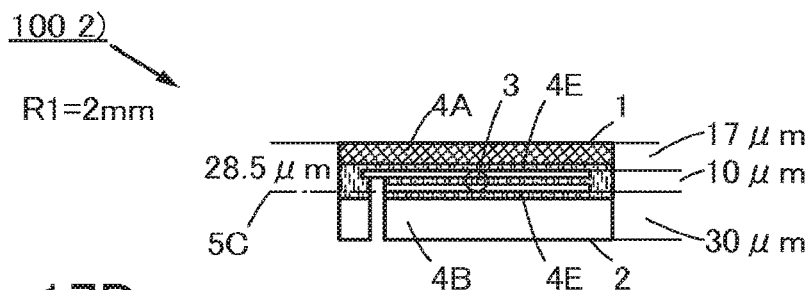

FIG. 17C is a cross-sectional view illustrating the structure of a functional panel 100(2) that was fabricated.

Figure 17D:
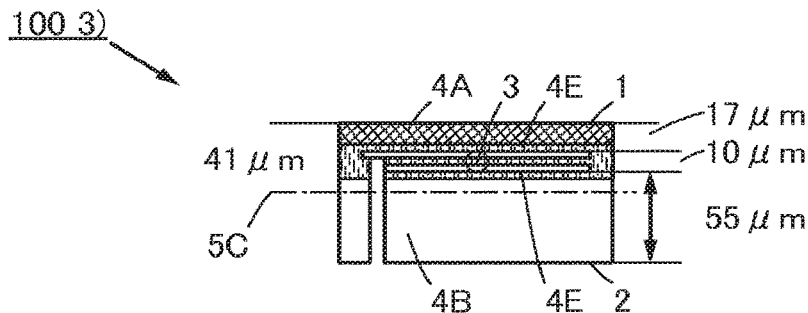

FIG. 17D is a cross-sectional view illustrating the structure of a functional panel 100(3) that was fabricated.

The fabricated functional panels each include a first plane 1, a second plane 2, a middle plane 5C, a functional layer 3, and a support. The functional panel is fixed to a frame 210C. The frame 210C can put the functional panel into a bent state with the first plane 1 inside.

The second plane 2 is opposite the first plane 1, and the middle plane 5C is located in the middle of a region between the first plane 1 and the second plane 2.

The functional layer 3 has a thickness of 20 μm. The functional layer 3 was positioned such that a portion thereof having a thickness greater than or equal to half of the thickness of the functional layer 3 was in a region between the first plane 1 and the middle plane 5C.

The functional layer 3 includes two functional layers that prevent the diffusion of impurities, a layer including a plurality of pixels arranged in a matrix, which is between the two functional layers, and a bonding layer that bonds the two functional layers together. An epoxy resin was used for the bonding layer.

The pixel includes a coloring layer, a light-emitting element that overlaps with the coloring layer, an epoxy resin that attaches the coloring layer to the light-emitting layer, and a pixel circuit for driving the light-emitting element. An organic EL element that emits white light toward the second plane 2 was used as the light-emitting element, and the coloring layer was positioned between the second plane 2 and the light-emitting element.

The support includes a member 4A, a member 4B, and a member 4E that attaches the member 4A to the member 4B. A portion of a surface of the member 4A is included in the first plane 1, and a portion of a surface of the member 4B is included in the second plane 2. The member 4E supports the functional layer 3 between the member 4A and the member 4B. Aromatic condensation polymeric films which were shaped by a biaxial stretching method were used as the member 4A and the ember 4B, and an epoxy resin was used for the member 4E.

Each of the fabricated functional panels was repeatedly bent to evaluate the reliability of the fabricated functional panel. Specifically, bending and unbending of the functional panel with the first plane 1 inside was repeated 100,000 times while the curvature radius was controlled not to be smaller than or equal to a predetermined value. Then, an image was displayed on the functional panel and the quality of the displayed image was evaluated. For example, whether or not a defect such as a line defect in the display or a so-called dark spot which is a circular region with low luminance occurs was examined.

In addition, the functional panels which had been bent 100,000 times were preserved under a predetermined environment for a predetermined period of time, and the reliability of the functional panels was evaluated. Specifically, each of the functional panels was preserved under an environment at 65° C. and 95% RH for 1,000 hours, then, an image was displayed on the functional panel after the preservation, and the quality of the displayed image was evaluated.

The structures of the fabricated functional panels 100(1) to 100(3), the curvature radius with which each functional panel was bent in the bending test, and the results of display quality evaluation after the bending test and the preservation test are shown in the table below. Specifically, each of the functional panels 100(1) to 100(3) has a structure in which a portion occupying half or more of the thickness of the functional layer 3 is between the middle plane 5C and the first plane 1.

TABLE 1

| | | Functional panel | | |
|---|---|---|---|---|
| | | 100(1) | 100(2) | 100(3) |
| Thickness/μm | Member 4A | 23 | 12 | 12 |
| | Member 4E | 5 | 5 | 5 |

TABLE 1-continued

|  | Functional panel | | |
|---|---|---|---|
|  | 100(1) | 100(2) | 100(3) |
| Functional layer 3 | 10 | 10 | 10 |
| Member 4E | 5 | 5 | 5 |
| Member 4B | 23 | 25 | 50 |
| Total thickness/µm | 66 | 57 | 82 |
| Distance between first plane to middle plane/µm | 33 | 28.5 | 41 |
| Proportion of portion of functional layer between middle plane 5C to first plane 1 to whole of functional layer | 50% | 100% | 100% |
| Curvature radius with which functional panel was bent in 100,000-time bending test | 4 mm | 2 mm | 5 mm |
| Display quality of functional panel after bending test and preservation test | Good | Good | Good |

Each of the functional panels was able to be repeatedly bent and unbent 100,000 times with a favorable curvature radius of 5 mm or less, without having a detect. The display quality after the bending test was good, and the display quality after the preservation test that followed the bending test was also good.

The functional panels that had been subjected to the 100,000-time bending test were preserved under a high-temperature and-humidity environment, and then an image was displayed on each of the functional panels. The results are shown in the table. Each of the functional panels was able to display the image with favorable quality, and decrease in display quality caused by the preservation was not found.

This example can be combined with any of the embodiments in this specification as appropriate.

For example, in this specification and the like, an explicit description "X and Y are connected" means that X and Y are electrically connected, X and Y are functionally connected, and X and Y are directly connected. Accordingly, another element may be provided between elements having a connection relation illustrated in drawings and texts, without being limited to a predetermined connection relation, for example, the connection relation illustrated in the drawings and the texts.

Here, X and Y each denote an object (e.g., a device, an element, a circuit, a wiring, an electrode, a terminal, a conductive film, a layer, or the like).

Examples of the case where X and Y are directly connected include the case where an element that allows an electrical connection between X and Y (e.g., a switch, a transistor, a capacitor, an inductor, a resistor, a diode, a display element, a light-emitting element, and a load) is not connected between X and Y, and the case where X and Y are connected without the element that allows the electrical connection between X and Y provided therebetween.

For example, in the case where X and Y are electrically connected, one or more elements that enable electrical connection between X and Y (e.g., a switch, a transistor, a capacitor, an inductor, a resistor, a diode, a display element, a light-emitting element, or a load) can be connected between X and Y. A switch is controlled to be on or off. That is, a switch is conducting or not conducting (is turned on or off) to determine whether current flows therethrough or not. Alternatively, the switch has a function of selecting and changing a current path. Note that the case where X and Y are electrically connected includes the case where X and Y are directly connected.

For example, in the case where X and Y are functionally connected, one or more circuits that enable functional connection between X and Y (e.g., a logic circuit such as an inverter, a NAND circuit, or a NOR circuit; a signal converter circuit such as a DA converter circuit, an AD converter circuit, or a gamma correction circuit; a potential level converter circuit such as a power supply circuit (e.g., a step-up circuit, or a step-down circuit) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, or a buffer circuit; a signal generation circuit; a memory circuit; and/or a control circuit) can be connected between X and Y. For example, even when another circuit is interposed between X and Y, X and Y are functionally connected if a signal output from X is transmitted to Y. Note that the case where X and Y are functionally connected includes the case where X and Y are directly connected and the case where X and Y are electrically connected.

Note that in this specification and the like, an explicit description "X and Y are electrically connected" means that X and Y are electrically connected (i.e., the case where X and Y are connected with another element or another circuit provided therebetween), X and Y are functionally connected (i.e., the case where X and Y are functionally connected with another circuit provided therebetween), and X and Y are directly connected (i.e., the case where X and Y are connected without another element or another circuit provided therebetween). That is, in this specification and the like, what is disclosed by the explicit description "X and Y are electrically connected" is the same as what is disclosed by the description "X and Y are connected".

Note that, for example, the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y, can be expressed by using any of the following expressions.

The expressions include, for example, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order"; "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order"; and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided to be connected in this order". When the connection order in a circuit configuration is defined by an expression similar to the above examples, a source (or a first terminal or the like)

and a drain (or a second terminal or the like) of a transistor can be distinguished from each other to specify the technical scope.

Other examples of the expressions include, "a source (or a first terminal or the like) of a transistor is electrically connected to X through at least a first connection path, the first connection path does not include a second connection path, the second connection path is a path between the source (or the first terminal or the like) of the transistor and a drain (or a second terminal or the like) of the transistor, Z1 is on the first connection path, the drain (or the second terminal or the like) of the transistor is electrically connected to Y through at least a third connection path, the third connection path does not include the second connection path, and Z2 is on the third connection path".

"a source (or a first terminal or the like) of a transistor is electrically connected to X through at least Z1 on a first connection path, the first connection path does not include a second connection path, the second connection path includes a connection path through the transistor, a drain (or a second terminal or the like) of the transistor is electrically connected to Y through at least Z2 on a third connection path, and the third connection path does not include the second connection path", and "a source (or a first terminal or the like) of a transistor is electrically connected to X through at least Z1 on a first electrical path, the first electrical path does not include a second electrical path, the second electrical path is an electrical path from the source (or the first terminal or the like) of the transistor to a drain (or a second terminal or the like) of the transistor, the drain (or the second terminal or the like) of the transistor is electrically connected to Y through at least Z2 on a third electrical path, the third electrical path does not include a fourth electrical path, and the fourth electrical path is an electrical path from the drain (or the second terminal or the like) of the transistor to the source (or the first terminal or the like) of the transistor". When the connection path in a circuit configuration is defined by an expression similar to the above examples, a source (or a first terminal or the like) and a drain (or a second terminal or the like) of a transistor can be distinguished from each other to specify the technical scope.

Note that these expressions are examples and there is no limitation on the expressions. Here, X, Y, Z1, and Z2 each denote an object (e.g., a device, an element, a circuit, a wiring, an electrode, a terminal, a conductive film, and a layer).

Even when independent components are electrically connected to each other in a circuit diagram, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

This application is based on Japanese Patent Application serial no. 2014-208884 filed with Japan Patent Office on Oct. 10, 2014, the entire contents of which are hereby incorporated by reference.

What is claimed is:

1. A display device comprising:
a first guide portion;
a second guide portion;
a hinge portion coupling the first guide portion and the second guide portion; and
a foldable display panel over the first guide portion, the hinge portion, and the second guide portion,
wherein the foldable display panel includes:
a first plane farther from the first guide portion, the hinge portion, and the second guide portion; and
a second plane closer to the first guide portion, the hinge portion, and the second guide portion,
wherein the foldable display panel includes:
a first film closer to the first plane than the second plane;
a second film closer to the second plane than the first plane, the second film being thinner than the first film and having a higher rigidity than the first film; and
a display element between the first film and the second film,
wherein each of the first film and the second film is bent, when the foldable display panel is bent, and
wherein the foldable display panel is configured to be bent with the first plane inside with a first curvature radius and bent with the second plane inside with a second curvature radius greater than the first curvature radius.

2. The display device according to claim 1, wherein each of the first guide portion and the second guide portion is less likely to be bent than the hinge portion.

3. The display device according to claim 1, wherein the first film and the second film have a region in contact with each other outside the display element.

4. A display device comprising:
a first guide portion;
a second guide portion;
a hinge portion coupling the first guide portion and the second guide portion; and
a foldable display panel over the first guide portion, the hinge portion, and the second guide portion,
wherein the foldable display panel includes:
a first film farther from the first guide portion, the hinge portion, and the second guide portion;
a second film closer to the first guide portion, the hinge portion, and the second guide portion, the second film being thinner than the first film and having a higher rigidity than the first film; and
a display element between the first film and the second film,
wherein each of the first film and the second film is bent, when the foldable display panel is bent,
wherein the hinge portion includes a first tapered part and a second tapered part, and
wherein each of the first tapered part and the second tapered part includes a first portion closer to the foldable display panel and a second portion farther from the foldable display panel so that a space between the second portion of the first tapered part and the second portion of the second tapered part is narrowed or eliminated when the foldable display panel is unfolded, and the space is widened when the foldable display panel is folded.

5. The display device according to claim 4, wherein each of the first guide portion and the second guide portion is less likely to be bent than the hinge portion.

6. The display device according to claim 4, wherein the first film and the second film have a region in contact with each other outside the display element.

7. A display device comprising:
a first guide portion;
a second guide portion;
a hinge portion coupling the first guide portion and the second guide portion; and
a foldable display panel over the first guide portion, the hinge portion, and the second guide portion, wherein the foldable display panel includes:
  a first plane farther from the first guide portion, the hinge portion, and the second guide portion; and
  a second plane closer to the first guide portion, the hinge portion, and the second guide portion,
wherein the foldable display panel includes:
  a first plastic film closer to the first plane than the second plane;
  a second plastic film closer to the second plane than the first plane, the second plastic film being thinner than the first plastic film and having a higher rigidity than the first plastic film; and
  an electroluminescent element between the first plastic film and the second plastic film,
wherein each of the first plastic film and the second plastic film is bent, when the foldable display panel is bent, and
wherein the foldable display panel is configured to be bent with the first plane inside with a first curvature radius and bent with the second plane inside with a second curvature radius greater than the first curvature radius.

8. The display device according to claim 7, wherein each of the first guide portion and the second guide portion is less likely to be bent than the hinge portion.

9. The display device according to claim 7, wherein the first plastic film and the second plastic film have a region in contact with each other outside the electroluminescent element.

10. A display device comprising:
  a first guide portion;
  a second guide portion;
  a hinge portion coupling the first guide portion and the second guide portion; and
  a foldable display panel over the first guide portion, the hinge portion, and the second guide portion,
wherein the foldable display panel includes:
  a first plastic film farther from the first guide portion, the hinge portion, and the second guide portion;
  a second plastic film closer to the first guide portion, the hinge portion, and the second guide portion, the second plastic film being thinner than the first plastic film and having a higher rigidity than the first plastic film; and
  an electroluminescent element between the first plastic film and the second plastic film,
wherein each of the first plastic film and the second plastic film is bent, when the foldable display panel is bent,
wherein the hinge portion includes a first tapered part and a second tapered part, and
wherein each of the first tapered part and the second tapered part includes a first portion closer to the foldable display panel and a second portion farther from the foldable display panel so that a space between the second portion of the first tapered part and the second portion of the second tapered part is narrowed or eliminated when the foldable display panel is unfolded, and the space is widened when the foldable display panel is folded.

11. The display device according to claim 10, wherein each of the first guide portion and the second guide portion is less likely to be bent than the hinge portion.

12. The display device according to claim 10, wherein the first plastic film and the second plastic film have a region in contact with each other outside the electroluminescent element.

* * * * *